US012795147B2

(12) United States Patent
Chen et al.

(10) Patent No.: US 12,795,147 B2
(45) Date of Patent: Nov. 10, 2026

(54) PICTURE PREDICTION METHOD AND RELATED APPARATUS

(71) Applicant: HUAWEI TECHNOLOGIES CO., LTD., Shenzhen (CN)

(72) Inventors: Huanbang Chen, Shenzhen (CN); Sixin Lin, Shenzhen (CN); Fan Liang, Guangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/257,144

(22) Filed: Jul. 1, 2025

(65) Prior Publication Data

US 2025/0392742 A1 Dec. 25, 2025

Related U.S. Application Data

(63) Continuation of application No. 18/628,367, filed on Apr. 5, 2024, now Pat. No. 12,382,081, which is a (Continued)

(30) Foreign Application Priority Data

Oct. 27, 2014 (CN) ......................... 201410584175.1

(51) Int. Cl.
*H04N 19/51* (2014.01)
*H04N 19/103* (2014.01)
(Continued)

(52) U.S. Cl.
CPC ........... *H04N 19/51* (2014.11); *H04N 19/103* (2014.11); *H04N 19/105* (2014.11);
(Continued)

(58) Field of Classification Search
CPC .... H04N 19/51; H04N 19/105; H04N 19/567; H04N 19/176; H04N 19/182;
(Continued)

(56) References Cited

U.S. PATENT DOCUMENTS

| | | | |
|---|---|---|---|
| 5,751,365 | A | 5/1998 | Yokoyama |
| 5,970,173 | A | 10/1999 | Lee et al. |

(Continued)

FOREIGN PATENT DOCUMENTS

| | | | |
|---|---|---|---|
| CN | 101350928 | A | 1/2009 |
| CN | 102273206 | A | 12/2011 |

(Continued)

OTHER PUBLICATIONS

Huang et al., "Control-Point Representation and Differential Coding Affine-Motion Compensation," IEEE Transactions on Circuits and Systems for Video Technology, vol. 23, No. 10, pp. 1651-1660, Institute of Electrical and Electronics Engineers, New York, New York (Oct. 2013).

(Continued)

*Primary Examiner* — Nam D Pham
(74) *Attorney, Agent, or Firm* — Leydig, Voit & Mayer, Ltd.

(57) ABSTRACT

A picture prediction method and a related apparatus are disclosed. A picture prediction method includes: determining K1 pixel samples in a picture block x, and determining a candidate motion information unit set corresponding to each pixel sample in the K1 pixel samples, where the candidate motion information unit set corresponding to each pixel sample includes at least one candidate motion information unit; determining a merged motion information unit set i including K1 motion information units, where each motion information unit in the merged motion information unit set i is selected from at least a part of motion informa- (Continued)

tion units in candidate motion information unit sets corresponding to different pixel samples in the K1 pixel samples; and predicting a pixel value of the picture block x by using a non-translational motion model and the merged motion information unit set i.

19 Claims, 11 Drawing Sheets

Related U.S. Application Data continuation of application No. 17/511,269, filed on Oct. 26, 2021, now Pat. No. 11,968,386, which is a continuation of application No. 16/845,161, filed on Apr. 10, 2020, now Pat. No. 11,172,217, which is a continuation of application No. 16/431,298, filed on Jun. 4, 2019, now Pat. No. 10,623,763, which is a continuation of application No. 15/463,850, filed on Mar. 20, 2017, now Pat. No. 10,440,380, which is a continuation of application No. PCT/CN2015/077295, filed on Apr. 23, 2015.

(51) Int. Cl.

| | |
|---|---|
| ***H04N 19/105*** | (2014.01) |
| ***H04N 19/147*** | (2014.01) |
| ***H04N 19/172*** | (2014.01) |
| ***H04N 19/176*** | (2014.01) |
| ***H04N 19/182*** | (2014.01) |
| ***H04N 19/537*** | (2014.01) |
| ***H04N 19/567*** | (2014.01) |

(52) U.S. Cl.

CPC ......... *H04N 19/147* (2014.11); *H04N 19/176* (2014.11); *H04N 19/182* (2014.11); *H04N 19/537* (2014.11); *H04N 19/567* (2014.11); *H04N 19/172* (2014.11)

(58) Field of Classification Search

CPC .. H04N 19/103; H04N 19/147; H04N 19/537; H04N 19/172

See application file for complete search history.

(56) References Cited

U.S. PATENT DOCUMENTS

| | | | |
|---|---|---|---|
| 6,735,249 | B1 | 5/2004 | Karczewicz et al. |
| 2006/0125956 | A1 | 6/2006 | Lee |
| 2010/0183071 | A1 | 7/2010 | Segall et al. |
| 2011/0211640 | A1 | 9/2011 | Kim et al. |
| 2011/0228853 | A1 | 9/2011 | Suzuki et al. |
| 2012/0106645 | A1 | 5/2012 | Lin et al. |
| 2012/0320968 | A1 | 12/2012 | Zheng et al. |
| 2013/0003850 | A1 | 1/2013 | Sugio et al. |
| 2014/0198856 | A1 | 7/2014 | Wu et al. |
| 2015/0288982 | A1 | 10/2015 | Kim et al. |

FOREIGN PATENT DOCUMENTS

| | | | |
|---|---|---|---|
| CN | 102883160 | A | 1/2013 |
| CN | 103024378 | A | 4/2013 |
| CN | 103891290 | A | 6/2014 |
| CN | 104363451 | A | 2/2015 |
| JP | H0951537 | A | 2/1997 |
| JP | H104555 | A | 1/1998 |
| JP | 2000350216 | A | 12/2000 |
| JP | 2010093646 | A | 4/2010 |
| WO | 1996029828 | A1 | 9/1996 |
| WO | 2014165555 | A1 | 10/2014 |

OTHER PUBLICATIONS

Huang et al., "Affine Skip and Direct Modes for Efficient Video Coding," 2012 IEEE Visual Communications and Image Processing, San Diego, California, Institute of Electrical and Electronic Engineers, New York, New York (Nov. 27-30, 2012).

Lei et al., "A Fast Coding Unit Decision Algorithm for HEVC," Computer Engineering, vol. 40, No. 3, pp. 270-273 (Mar. 2014).

Lin et al., "Improved Advanced Motion Vector Prediction," Joint Collaborative Team on Video Coding (JCT-VC) of ITU-T SG16 WP3 and ISO/IEC JTC1/SC29/WG11, 4th Meeting, Document JCTVC-D125, Daegu, Korea (Jan. 20-28, 2011).

"Series H: Audiovisual and Multimedia Systems; Infrastructure of audiovisual services—Coding of moving video; Advanced video coding for generic audiovisual services," Recommendation ITU-T H.264, pp. i-766, International Telecommunication Union, Geneva, Switzerland (Feb. 2014).

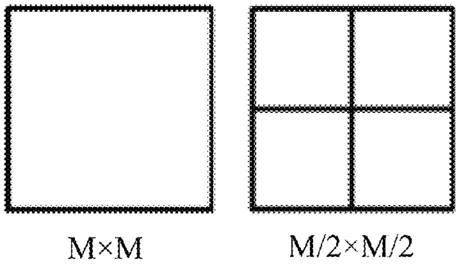
FIG. 1-a
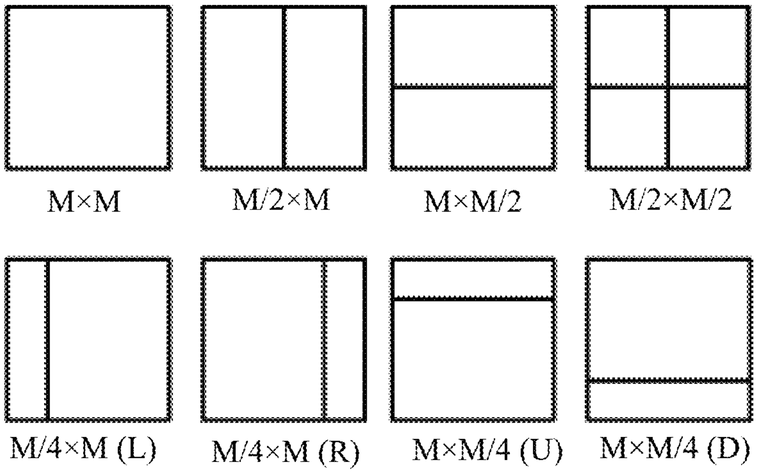
FIG. 1-b

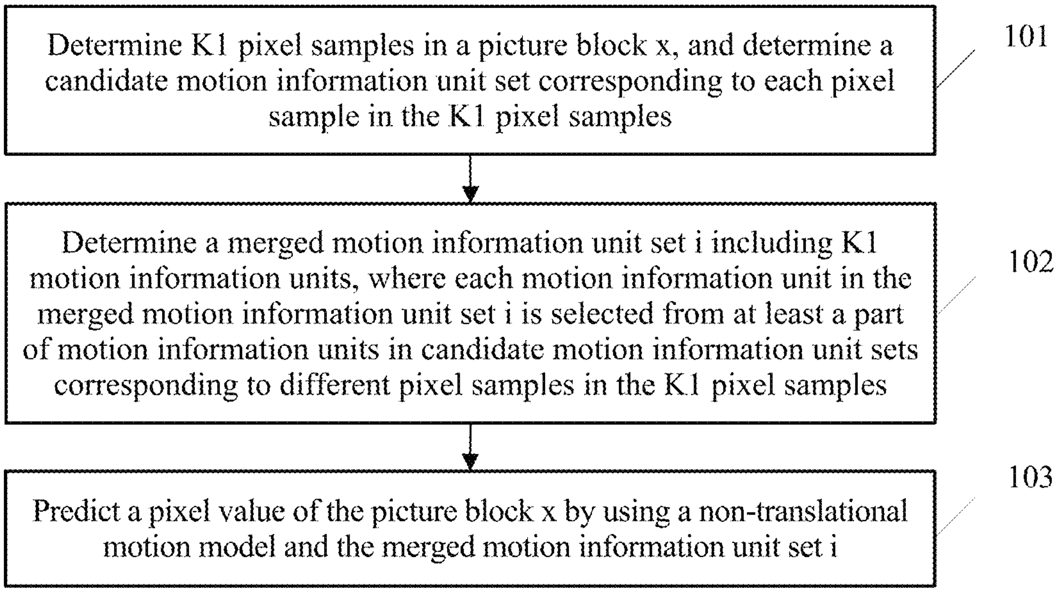
FIG. 1-c

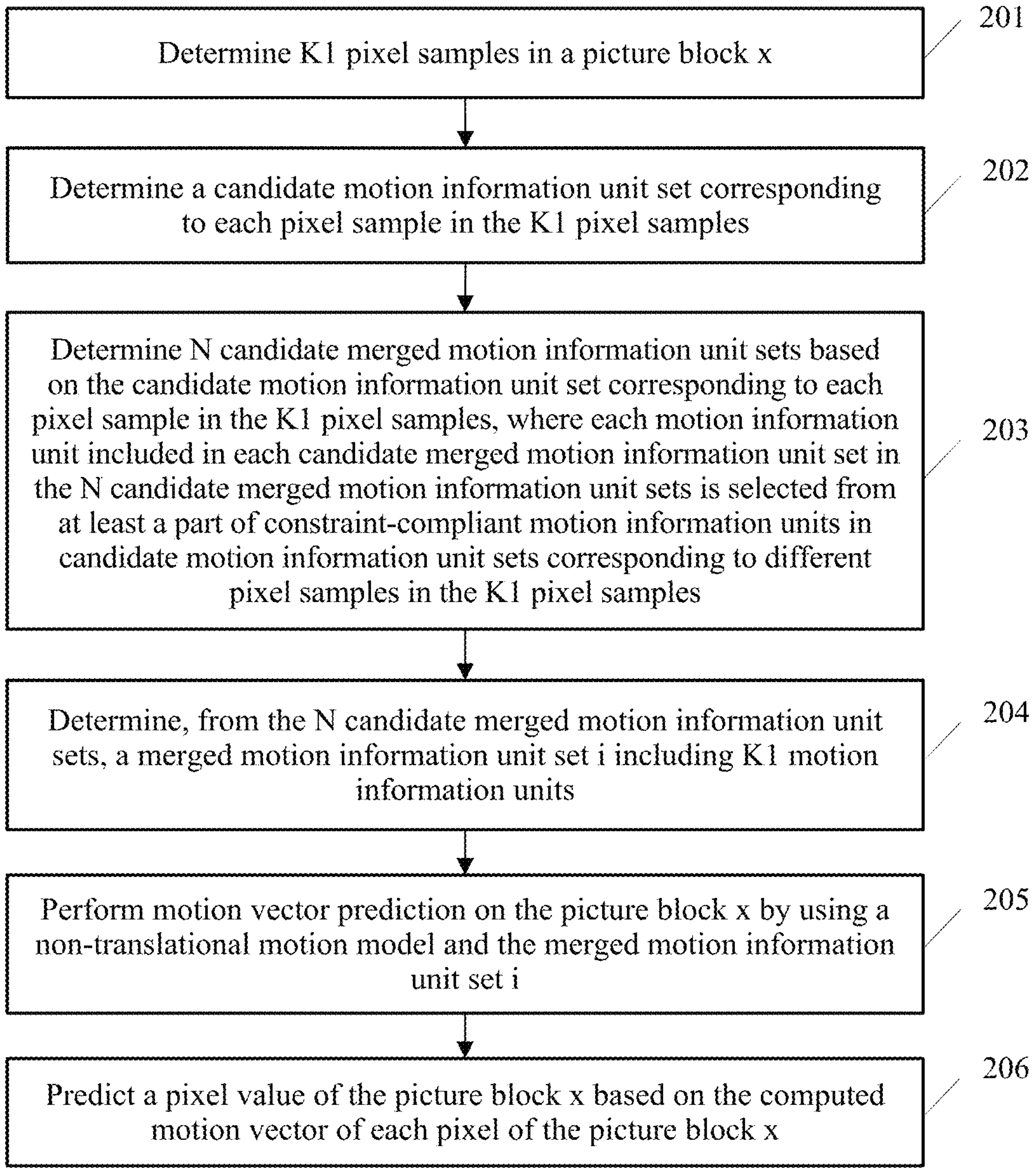
FIG. 2-a

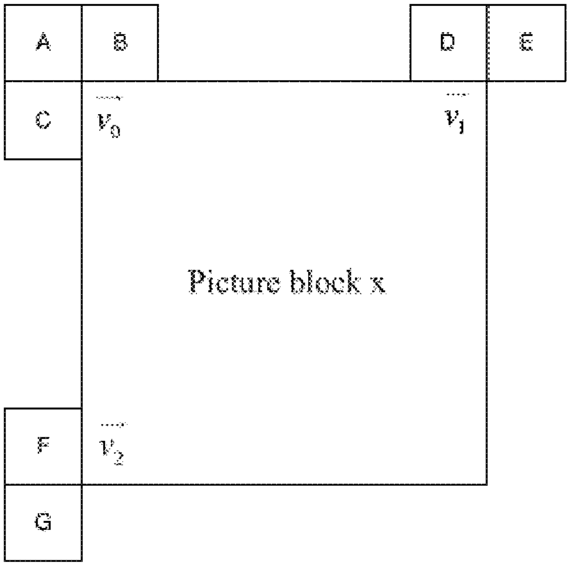
FIG. 2-b
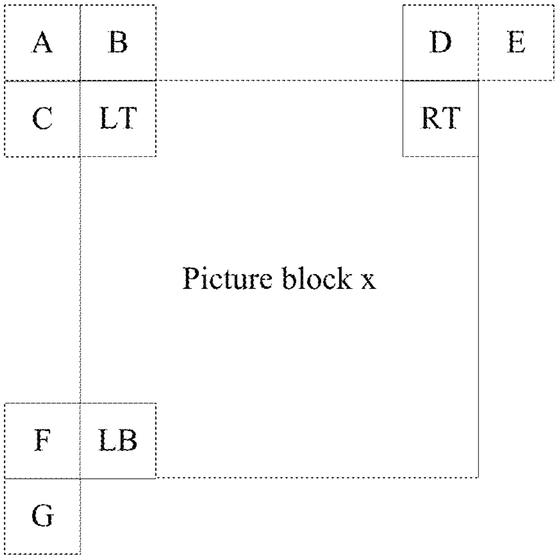
FIG. 2-c

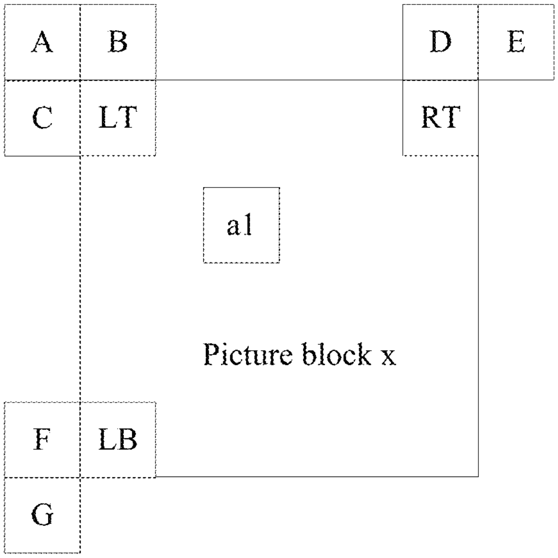
FIG. 2-d
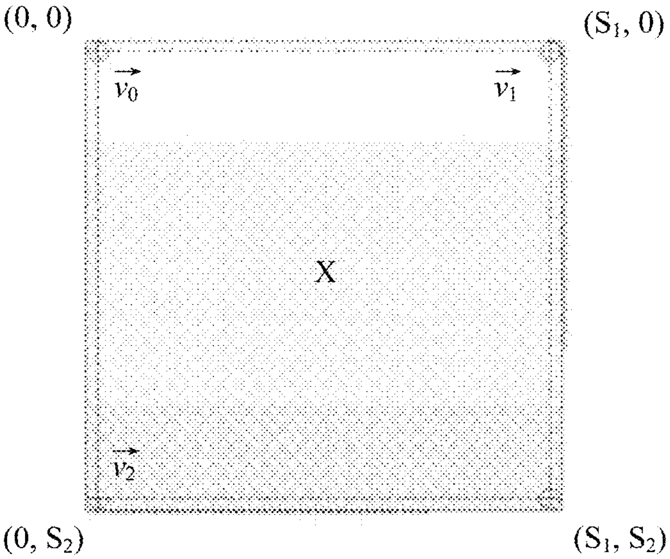
FIG. 2-e

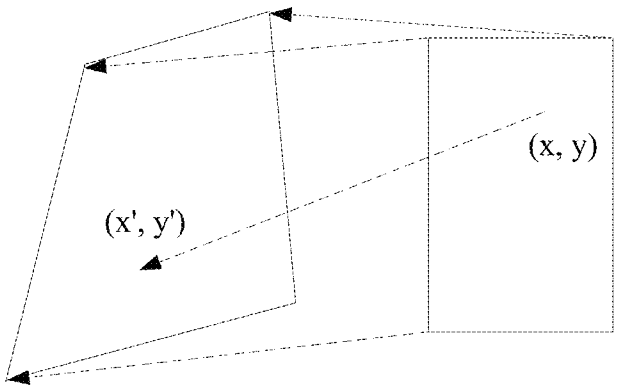
FIG. 2-f
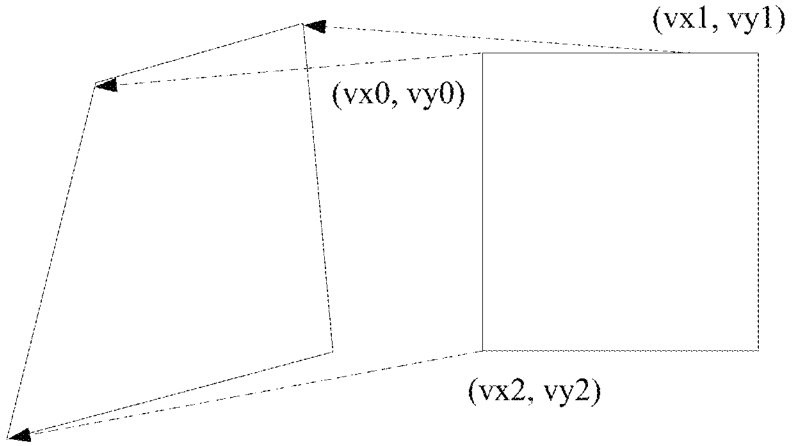
FIG. 2-g

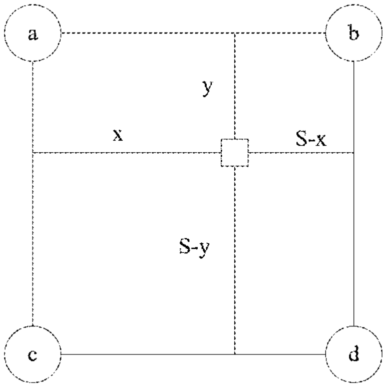
FIG. 2-h
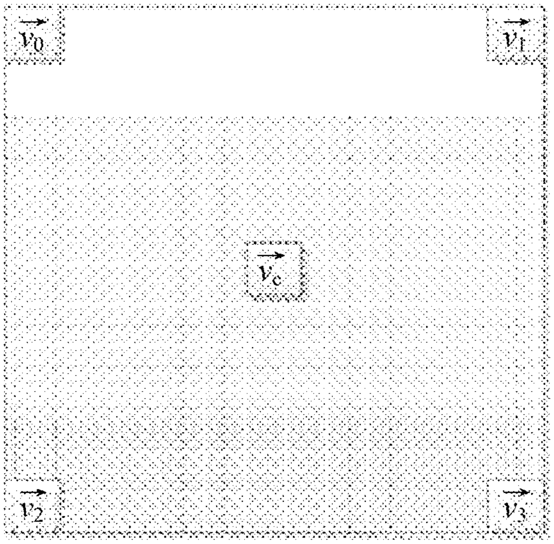
FIG. 2-i

PICTURE PREDICTION METHOD AND RELATED APPARATUS

CROSS-REFERENCE TO RELATED APPLICATIONS

This application is a continuation of U.S. patent application Ser. No. 18/628,367, filed on Apr. 5, 2024, which is a continuation of U.S. patent application Ser. No. 17/511,269, filed on Oct. 26, 2021, now U.S. Pat. No. 11,968,386, which is a continuation of U.S. patent application Ser. No. 16/845,161, filed on Apr. 10, 2020, now U.S. Pat. No. 11,172,217, which is a continuation of U.S. patent application Ser. No. 16/431,298, filed on Jun. 4, 2019, now U.S. Pat. No. 10,623,763, which is a continuation of U.S. patent application Ser. No. 15/463,850, filed on Mar. 20, 2017, now U.S. Pat. No. 10,440,380, which is a continuation of International Application No. PCT/CN2015/077295, filed on Apr. 23, 2015. The International Application claims priority to Chinese Patent Application No. 201410584175.1, filed on Oct. 27, 2014. All of the afore-mentioned patent applications are hereby incorporated by reference in their entireties.

TECHNICAL FIELD

The embodiments of the present application relates to the field of picture processing technologies, and in particular, to a picture prediction method and a related apparatus.

BACKGROUND

With development of photoelectric acquisition technologies and continuous increase of requirements for high-definition digital videos, an amount of video data is increasingly large. Due to limited heterogeneous transmission bandwidths and diversified video applications, higher requirements are continuously imposed on video coding efficiency. A task of developing a high efficiency video coding (HEVC) standard is initiated according to the requirements.

A basic principle of video compression coding is to use correlation between a space domain, a time domain, and a code word to remove redundancy as much as possible. Currently, a prevalent practice is to use a block-based hybrid video coding framework to implement video compression coding by performing steps of prediction (including intra-frame prediction and inter-frame prediction), transform, quantization, entropy coding, and the like. This coding framework shows high viability, and therefore, HEVC still uses this block-based hybrid video coding framework.

In various video coding/decoding solutions, motion estimation or motion compensation is a key technology that affects coding/decoding efficiency. In various conventional video coding/decoding solutions, it is assumed that motion of an object always meets a translational motion model, and that motion of every part of the entire object is the same. Basically, all conventional motion estimation or motion compensation algorithms are block motion compensation algorithms that are established based on the translational motion model. However, motion in the real world is diversified, and irregular motion such as scaling up/down, rotation, or parabolic motion is ubiquitous. Since the ninth decade of the last century, video coding experts have realized universality of irregular motion, and wished to introduce an irregular motion model (a non-translational motion model such as an affine motion model, a rotational motion model, or a scaling motion model) to improve video coding efficiency. However, computational complexity of conventional picture prediction performed based on a non-translational motion model is generally quite high.

SUMMARY

Embodiments of the present application provide a picture prediction method and a related apparatus, so as to reduce computational complexity of picture prediction performed based on a non-translational motion model.

A first aspect of the present application provides a picture prediction method, including:

- determining K1 pixel samples in a picture block x, and determining a candidate motion information unit set corresponding to each pixel sample in the K1 pixel samples, where the candidate motion information unit set corresponding to each pixel sample includes at least one candidate motion information unit, and K1 is an integer that is greater than or equal to 2;
- determining a merged motion information unit set i including K1 motion information units, where
- each motion information unit in the merged motion information unit set i is selected from at least a part of motion information units in candidate motion information unit sets corresponding to different pixel samples in the K1 pixel samples, and the motion information unit includes a motion vector whose prediction direction is forward and/or a motion vector whose prediction direction is backward; and
- predicting a pixel value of the picture block x by using a non-translational motion model and the merged motion information unit set i.

With reference to the first aspect, in a first possible implementation manner of the first aspect, the determining a merged motion information unit set i including K1 motion information units includes:

determining, from N candidate merged motion information unit sets, the merged motion information unit set i including the K1 motion information units, where each motion information unit included in each candidate merged motion information unit set in the N candidate merged motion information unit sets is selected from at least a part of constraint-compliant motion information units in the candidate motion information unit sets corresponding to different pixel samples in the K1 pixel samples, N is a positive integer, the N candidate merged motion information unit sets are different from each other, and each candidate merged motion information unit set in the N candidate merged motion information unit sets includes K1 motion information units.

With reference to the first possible implementation manner of the first aspect, in a second possible implementation manner of the first aspect, the N candidate merged motion information unit sets meet at least one of a first condition, a second condition, a third condition, a fourth condition, or a fifth condition, where

- the first condition includes that a motion mode of the picture block x indicated by a motion information unit in any candidate merged motion information unit set in the N candidate merged motion information unit sets is non-translational motion;
- the second condition includes that prediction directions of at least two motion information units in any candidate merged motion information unit set in the N candidate merged motion information unit sets are the same;
- the third condition includes that reference frame indexes corresponding to at least two motion information units in any candidate merged motion information unit set in the N candidate merged motion information unit sets are the same;

the fourth condition includes that an absolute value of a difference between horizontal components of two motion information units in any candidate merged motion information unit set in the N candidate merged motion information unit sets is less than or equal to a horizontal component threshold; and the fifth condition includes that an absolute value of a difference between vertical components of two motion information units in any candidate merged motion information unit set in the N candidate merged motion information unit sets is less than or equal to a vertical component threshold.

With reference to the first aspect or the first possible implementation manner of the first aspect or the second possible implementation manner of the first aspect, in a third possible implementation manner of the first aspect, the K1 pixel samples include at least two pixel samples in an upper left pixel sample, an upper right pixel sample, a lower left pixel sample, and a central pixel sample a1 of the picture block x, where the upper left pixel sample of the picture block x is an upper left vertex of the picture block x, or a pixel block in the picture block x and including an upper left vertex of the picture block x; the lower left pixel sample of the picture block x is a lower left vertex of the picture block x, or a pixel block in the picture block x and including a lower left vertex of the picture block x; the upper right pixel sample of the picture block x is an upper right vertex of the picture block x, or a pixel block in the picture block x and including an upper right vertex of the picture block x; and the central pixel sample a1 of the picture block x is a central pixel of the picture block x, or a pixel block in the picture block x and including a central pixel of the picture block x.

With reference to the third possible implementation manner of the first aspect, in a fourth possible implementation manner of the first aspect, a candidate motion information unit set corresponding to the upper left pixel sample of the picture block x includes motion information units of x1 pixel samples, where the x1 pixel samples include at least one pixel sample spatially adjacent to the upper left pixel sample of the picture block x and/or at least one pixel sample temporally adjacent to the upper left pixel sample of the picture block x, and x1 is a positive integer, where the x1 pixel samples include at least one of a pixel sample that has a same location as the upper left pixel sample of the picture block x, a pixel sample spatially adjacent to a left edge of the picture block x, a pixel sample spatially adjacent to an upper left of the picture block x, or a pixel sample spatially adjacent to an upper edge of the picture block x, in a video frame temporally adjacent to a video frame to which the picture block x belongs.

With reference to the third possible implementation manner of the first aspect or the fourth possible implementation manner of the first aspect, in a fifth possible implementation manner of the first aspect, a candidate motion information unit set corresponding to the upper right pixel sample of the picture block x includes motion information units of x2 pixel samples, where the x2 pixel samples include at least one pixel sample spatially adjacent to the upper right pixel sample of the picture block x and/or at least one pixel sample temporally adjacent to the upper right pixel sample of the picture block x, and x2 is a positive integer, where the x2 pixel samples include at least one of a pixel sample that has a same location as the upper right pixel sample of the picture block x, a pixel sample spatially adjacent to a right edge of the picture block x, a pixel sample spatially adjacent to an upper right of the picture block x, or a pixel sample spatially adjacent to the upper edge of the picture block x, in a video frame temporally adjacent to the video frame to which the picture block x belongs.

With reference to the third possible implementation manner of the first aspect or the fourth possible implementation manner of the first aspect or the fifth possible implementation manner of the first aspect, in a sixth possible implementation manner of the first aspect, a candidate motion information unit set corresponding to the lower left pixel sample of the picture block x includes motion information units of x3 pixel samples, where the x3 pixel samples include at least one pixel sample spatially adjacent to the lower left pixel sample of the picture block x and/or at least one pixel sample temporally adjacent to the lower left pixel sample of the picture block x, and x3 is a positive integer, where the x3 pixel samples include at least one of a pixel sample that has a same location as the lower left pixel sample of the picture block x, a pixel sample spatially adjacent to the left edge of the picture block x, a pixel sample spatially adjacent to a lower left of the picture block x, or a pixel sample spatially adjacent to a lower edge of the picture block x, in a video frame temporally adjacent to the video frame to which the picture block x belongs.

With reference to the third possible implementation manner of the first aspect or the fourth possible implementation manner of the first aspect or the fifth possible implementation manner of the first aspect or the sixth possible implementation manner of the first aspect, in a seventh possible implementation manner of the first aspect, a candidate motion information unit set corresponding to the central pixel sample a1 of the picture block x includes motion information units of x5 pixel samples, where one pixel sample in the x5 pixel samples is a pixel sample a2, where a location of the central pixel sample a1 in the video frame to which the picture block x belongs is the same as a location of the pixel sample a2 in a video frame adjacent to the video frame to which the picture block x belongs, and x5 is a positive integer.

With reference to any one of the first aspect or the first possible implementation manner of the first aspect to the seventh possible implementation manner of the first aspect, in an eighth possible implementation manner of the first aspect, the predicting a pixel value of the picture block x by using a non-translational motion model and the merged motion information unit set i includes: when motion vectors whose prediction directions are a first prediction direction in the merged motion information unit set i correspond to different reference frame indexes, performing scaling processing on the merged motion information unit set i, so that the motion vectors whose prediction directions are the first prediction direction in the merged motion information unit set i are scaled down to a same reference frame, and predicting the pixel value of the picture block x by using the non-translational motion model and a scaled merged motion information unit set i, where the first prediction direction is forward or backward; or the predicting a pixel value of the picture block x by using a non-translational motion model and the merged motion information unit set i includes:

when motion vectors whose prediction directions are forward in the merged motion information unit set i correspond to different reference frame indexes and motion vectors whose prediction directions are backward in the merged motion information unit set i correspond to different reference frame indexes, performing scaling processing on the merged motion information unit set i, so that the motion vectors whose prediction directions are forward in the merged motion information unit set i are scaled down to a same reference frame and that the motion vectors whose prediction directions are backward in the merged motion information unit set i are scaled down to a same reference frame, and predicting the pixel value of the picture block x by using the non-translational motion model and a scaled merged motion information unit set i.

With reference to any one of the first aspect or the first possible implementation manner of the first aspect to the eighth possible implementation manner of the first aspect, in a ninth possible implementation manner of the first aspect, the method further includes:

determining K2 pixel samples in a picture block y, and determining a candidate motion information unit set corresponding to each pixel sample in the K2 pixel samples, where K2 is an integer that is greater than 1, and the picture block y is spatially adjacent to the picture block x and the candidate motion information unit set corresponding to each pixel sample in the K2 pixel samples includes at least one candidate motion information unit;

determining a merged motion information unit set j including K2 motion information units; wherein a candidate motion information unit set corresponding to a pixel sample z1 in the K2 pixel samples includes a motion information unit a2, and the motion information unit a2 is obtained based on a motion information unit of a pixel sample z2, where the pixel sample z2 is a pixel sample in the picture block x and a distance between the pixel sample z2 and the pixel sample z1 is less than a threshold, or the pixel sample z2 is a pixel sample in the picture block x and a distance between the pixel sample z2 and the pixel sample z1 is shortest; and the K2 motion information units in the merged motion information unit set j are respectively selected from at least a part of constraint-compliant motion information units in the candidate motion information unit set corresponding to each pixel sample in the K2 pixel samples; and predicting a pixel value of the picture block y by using the non-translational motion model and the merged motion information unit set j.

With reference to any one of the first aspect or the first possible implementation manner of the first aspect to the ninth possible implementation manner of the first aspect, in a tenth possible implementation manner of the first aspect, the non-translational motion model is any one of the following models: an affine motion model, a parabolic motion model, a rotational motion model, a perspective motion model, a shearing motion model, a scaling motion model, or a bilinear motion model.

With reference to any one of the first aspect or the first possible implementation manner of the first aspect to the tenth possible implementation manner of the first aspect, in an eleventh possible implementation manner of the first aspect, the predicting a pixel value of the picture block x by using a non-translational motion model and the merged motion information unit set i includes:

obtaining a motion vector of each pixel in the picture block x through computation by using the non-translational motion model and the merged motion information unit set i, and determining a predicted pixel value of each pixel in the picture block x by using the obtained motion vector of each pixel in the picture block x; or obtaining a motion vector of each pixel block in the picture block x through computation by using the non-translational motion model and the merged motion information unit set i, and determining a predicted pixel value of each pixel in each pixel block in the picture block x by using the obtained motion vector of each pixel block in the picture block x.

With reference to any one of the first aspect or the first possible implementation manner of the first aspect to the eleventh possible implementation manner of the first aspect, in a twelfth possible implementation manner of the first aspect, the picture prediction method is applied to a video coding process, or the picture prediction method is applied to a video decoding process.

With reference to the twelfth possible implementation manner of the first aspect, in a thirteenth possible implementation manner of the first aspect, when the picture prediction method is applied to the video decoding process, the determining, from N candidate merged motion information unit sets, the merged motion information unit set i including the K1 motion information units, includes: determining, from the N candidate merged motion information unit sets, based on an identifier that is of the merged motion information unit set i and is obtained from a video bit stream, the merged motion information unit set i including the K1 motion information units.

With reference to the twelfth possible implementation manner of the first aspect, in a fourteenth possible implementation manner of the first aspect, when the picture prediction method is applied to the video coding process, the determining, from N candidate merged motion information unit sets, the merged motion information unit set i including the K1 motion information units, includes: determining, from the N candidate merged motion information unit sets, according to distortion or a rate distortion cost, the merged motion information unit set i including the K1 motion information units.

With reference to the twelfth possible implementation manner of the first aspect or the fourteenth possible implementation manner of the first aspect, in a fifteenth possible implementation manner of the first aspect, when the picture prediction method is applied to the video coding process, the method further includes: writing an identifier of the merged motion information unit set i into a video bit stream.

A second aspect of the present application provides a picture prediction apparatus, including:

a first determining unit, configured to determine K1 pixel samples in a picture block x, and determine a candidate motion information unit set corresponding to each pixel sample in the K1 pixel samples, where the candidate motion information unit set corresponding to each pixel sample includes at least one candidate motion information unit, and K1 is an integer that is greater than or equal to 2;

a second determining unit, configured to determine a merged motion information unit set i including K1 motion information units, where each motion information unit in the merged motion information unit set i is selected from at least a part of motion information units in candidate motion information unit sets corresponding to different pixel samples in the K1 pixel samples, and the motion information unit includes a motion vector whose prediction direction is forward and/or a motion vector whose prediction direction is backward; and a predicting unit, configured to predict a pixel value of the picture block x by using a non-translational motion model and the merged motion information unit set i.

With reference to the second aspect, in a first possible implementation manner of the second aspect, the second determining unit is specifically configured to determine, from N candidate merged motion information unit sets, the merged motion information unit set i including the K1 motion information units, where each motion information unit included in each candidate merged motion information unit set in the N candidate merged motion information unit sets is selected from at least a part of constraint-compliant motion information units in the candidate motion information unit sets corresponding to different pixel samples in the K1 pixel samples, N is a positive integer, the N candidate merged motion information unit sets are different from each other, and each candidate merged motion information unit set in the N candidate merged motion information unit sets includes K1 motion information units.

With reference to the first possible implementation manner of the second aspect, in a second possible implementation manner of the second aspect, the N candidate merged motion information unit sets meet at least one of a first condition, a second condition, a third condition, a fourth condition, or a fifth condition, where the first condition includes that a motion mode of the picture block x indicated by a motion information unit in any candidate merged motion information unit set in the N candidate merged motion information unit sets is non-translational motion;

the second condition includes that prediction directions of at least two motion information units in any candidate merged motion information unit set in the N candidate merged motion information unit sets are the same;

the third condition includes that reference frame indexes corresponding to at least two motion information units in any candidate merged motion information unit set in the N candidate merged motion information unit sets are the same;

the fourth condition includes that an absolute value of a difference between horizontal components of two motion information units in any candidate merged motion information unit set in the N candidate merged motion information unit sets is less than or equal to a horizontal component threshold; and the fifth condition includes that an absolute value of a difference between vertical components of two motion information units in any candidate merged motion information unit set in the N candidate merged motion information unit sets is less than or equal to a vertical component threshold.

With reference to the second aspect or the first possible implementation manner of the second aspect or the second possible implementation manner of the second aspect, in a third possible implementation manner of the second aspect, the K1 pixel samples include at least two pixel samples in an upper left pixel sample, an upper right pixel sample, a lower left pixel sample, and a central pixel sample a1 of the picture block x, where the upper left pixel sample of the picture block x is an upper left vertex of the picture block x, or a pixel block in the picture block x and including an upper left vertex of the picture block x; the lower left pixel sample of the picture block x is a lower left vertex of the picture block x, or a pixel block in the picture block x and including a lower left vertex of the picture block x; the upper right pixel sample of the picture block x is an upper right vertex of the picture block x, or a pixel block in the picture block x and including an upper right vertex of the picture block x; and the central pixel sample a1 of the picture block x is a central pixel of the picture block x, or a pixel block in the picture block x and including a central pixel of the picture block x.

With reference to the third possible implementation manner of the second aspect, in a fourth possible implementation manner of the second aspect, a candidate motion information unit set corresponding to the upper left pixel sample of the picture block x includes motion information units of x1 pixel samples, where the x1 pixel samples include at least one pixel sample spatially adjacent to the upper left pixel sample of the picture block x and/or at least one pixel sample temporally adjacent to the upper left pixel sample of the picture block x, and x1 is a positive integer, where the x1 pixel samples include at least one of a pixel sample that has a same location as the upper left pixel sample of the picture block x, a pixel sample spatially adjacent to a left edge of the picture block x, a pixel sample spatially adjacent to an upper left of the picture block x, or a pixel sample spatially adjacent to an upper edge of the picture block x, in a video frame temporally adjacent to a video frame to which the picture block x belongs.

With reference to the third possible implementation manner of the second aspect or the fourth possible implementation manner of the second aspect, in a fifth possible implementation manner of the second aspect, a candidate motion information unit set corresponding to the upper right pixel sample of the picture block x includes motion information units of x2 pixel samples, where the x2 pixel samples include at least one pixel sample spatially adjacent to the upper right pixel sample of the picture block x and/or at least one pixel sample temporally adjacent to the upper right pixel sample of the picture block x, and x2 is a positive integer, where the x2 pixel samples include at least one of a pixel sample that has a same location as the upper right pixel sample of the picture block x, a pixel sample spatially adjacent to a right edge of the picture block x, a pixel sample spatially adjacent to an upper right of the picture block x, or a pixel sample spatially adjacent to the upper edge of the picture block x, in a video frame temporally adjacent to the video frame to which the picture block x belongs.

With reference to the third possible implementation manner of the second aspect or the fourth possible implementation manner of the second aspect or the fifth possible implementation manner of the second aspect, in a sixth possible implementation manner of the second aspect, a candidate motion information unit set corresponding to the lower left pixel sample of the picture block x includes motion information units of x3 pixel samples, where the x3 pixel samples include at least one pixel sample spatially adjacent to the lower left pixel sample of the picture block x and/or at least one pixel sample temporally adjacent to the lower left pixel sample of the picture block x, and x3 is a positive integer, where the x3 pixel samples include at least one of a pixel sample that has a same location as the lower left pixel sample of the picture block x, a pixel sample spatially adjacent to the left edge of the picture block x, a pixel sample spatially adjacent to a lower left of the picture block x, or a pixel sample spatially adjacent to a lower edge of the picture block x, in a video frame temporally adjacent to the video frame to which the picture block x belongs.

With reference to the third possible implementation manner of the second aspect or the fourth possible implementation manner of the second aspect or the fifth possible implementation manner of the second aspect or the sixth possible implementation manner of the second aspect, in a seventh possible implementation manner of the second aspect, a candidate motion information unit set corresponding to the central pixel sample a1 of the picture block x includes motion information units of x5 pixel samples, where one pixel sample in the x5 pixel samples is a pixel sample a2, where a location of the central pixel sample a1 in the video frame to which the picture block x belongs is the same as a location of the pixel sample a2 in a video frame adjacent to the video frame to which the picture block x belongs, and x5 is a positive integer.

With reference to the third possible implementation manner of the second aspect or the fourth possible implementation manner of the second aspect or the fifth possible implementation manner of the second aspect or the sixth possible implementation manner of the second aspect or the seventh possible implementation manner of the second aspect, in an eighth possible implementation manner of the second aspect, the predicting unit is specifically configured to: when motion vectors whose prediction directions are a first prediction direction in the merged motion information unit set i correspond to different reference frame indexes, perform scaling processing on the merged motion information unit set i, so that the motion vectors whose prediction directions are the first prediction direction in the merged motion information unit set i are scaled down to a same reference frame, and predict the pixel value of the picture block x by using the non-translational motion model and a scaled merged motion information unit set i, where the first prediction direction is forward or backward; or the predicting unit is specifically configured to: when motion vectors whose prediction directions are forward in the merged motion information unit set i correspond to different reference frame indexes and motion vectors whose prediction directions are backward in the merged motion information unit set i correspond to different reference frame indexes, perform scaling processing on the merged motion information unit set i, so that the motion vectors whose prediction directions are forward in the merged motion information unit set i are scaled down to a same reference frame and that the motion vectors whose prediction directions are backward in the merged motion information unit set i are scaled down to a same reference frame, and predict the pixel value of the picture block x by using the non-translational motion model and a scaled merged motion information unit set i.

With reference to any one of the second aspect or the first possible implementation manner of the second aspect to the eighth possible implementation manner of the second aspect, in a ninth possible implementation manner of the second aspect, the predicting unit is specifically configured to obtain a motion vector of each pixel in the picture block x through computation by using the non-translational motion model and the merged motion information unit set i, and determine a predicted pixel value of each pixel in the picture block x by using the obtained motion vector of each pixel in the picture block x; or the predicting unit is specifically configured to obtain a motion vector of each pixel block in the picture block x through computation by using the non-translational motion model and the merged motion information unit set i, and determine a predicted pixel value of each pixel in each pixel block in the picture block x by using the obtained motion vector of each pixel block in the picture block x.

With reference to any one of the second aspect or the first possible implementation manner of the second aspect to the ninth possible implementation manner of the second aspect, in a tenth possible implementation manner of the second aspect, the first determining unit is further configured to determine K2 pixel samples in a picture block y, and determine a candidate motion information unit set corresponding to each pixel sample in the K2 pixel samples, where K2 is an integer that is greater than 1, the picture block y is spatially adjacent to the picture block x, and the candidate motion information unit set corresponding to each pixel sample in the K2 pixel samples includes at least one candidate motion information unit;

the second determining unit is further configured to determine a merged motion information unit set j including K2 motion information units, where a candidate motion information unit set corresponding to a pixel sample z1 in the K2 pixel samples includes a motion information unit a2, and the motion information unit a2 is obtained based on a motion information unit of a pixel sample z2, where the pixel sample z2 is a pixel sample in the picture block x and a distance between the pixel sample z2 and the pixel sample z1 is less than a threshold, or the pixel sample z2 is a pixel sample in the picture block x and a distance between the pixel sample z2 and the pixel sample z1 is shortest; and the K2 motion information units in the merged motion information unit set j are respectively selected from at least a part of constraint-compliant motion information units in the candidate motion information unit set corresponding to each pixel sample in the K2 pixel samples; and the predicting unit is further configured to predict a pixel value of the picture block y by using the non-translational motion model and the merged motion information unit set j.

With reference to any one of the second aspect or the first possible implementation manner of the second aspect to the tenth possible implementation manner of the second aspect, in an eleventh possible implementation manner of the second aspect, the non-translational motion model is any one of the following models: an affine motion model, a parabolic motion model, a rotational motion model, a perspective motion model, a shearing motion model, a scaling motion model, or a bilinear motion model.

With reference to any one of the second aspect or the first possible implementation manner of the second aspect to the eleventh possible implementation manner of the second aspect, in a twelfth possible implementation manner of the second aspect, the picture prediction apparatus is applied to a video coding apparatus, or the picture prediction apparatus is applied to a video decoding apparatus.

With reference to the twelfth possible implementation manner of the second aspect, in a thirteenth possible implementation manner of the second aspect, when the picture prediction apparatus is applied to the video coding apparatus, the second determining unit is specifically configured to determine, from the N candidate merged motion information unit sets, according to distortion or a rate distortion cost, the merged motion information unit set i including the K1 motion information units.

With reference to the twelfth possible implementation manner of the second aspect or the thirteenth possible implementation manner of the second aspect, in a fourteenth possible implementation manner of the second aspect, when the picture prediction apparatus is applied to the video coding apparatus, the predicting unit is further configured to write an identifier of the merged motion information unit set i into a video bit stream.

With reference to the twelfth possible implementation manner of the second aspect, in a fifteenth possible implementation manner of the second aspect, when the picture prediction apparatus is applied to the video decoding apparatus, the second determining unit is specifically configured to determine, from the N candidate merged motion information unit sets, based on an identifier that is of the merged motion information unit set i and is obtained from a video bit stream, the merged motion information unit set i including the K1 motion information units.

It can be seen that, in some technical solutions of the embodiments of the present application, a pixel value of the picture block x is predicted by using a non-translational motion model and a merged motion information unit set i, where each motion information unit in the merged motion information unit set i is selected from at least a part of motion information units in candidate motion information unit sets corresponding to different pixel samples in the K1 pixel samples. Because a selection range of the merged motion information unit set i is relatively small, a mechanism used in a conventional technology for screening out motion information units of K1 pixel samples only by performing a huge amount of computation in all possible candidate motion information unit sets corresponding to the K1 pixel samples is abandoned. This helps improve coding efficiency, also helps reduce computational complexity of picture prediction performed based on the non-translational motion model, further makes it possible to introduce the non-translational motion model into a video coding standard, and because the non-translational motion model is introduced, helps describe motion of an object more accurately, and therefore helps improve prediction accuracy.

BRIEF DESCRIPTION OF DRAWINGS

To describe the technical solutions in the embodiments of the present application or in the prior art more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 1-*a* is a schematic diagram of a prediction unit partition mode corresponding to intra-frame prediction according to an embodiment of the present application;

FIG. 1-*b* is a schematic diagram of several prediction unit partition modes corresponding to inter-frame prediction according to an embodiment of the present application;

FIG. 1-*c* is a schematic flowchart of a picture prediction method according to an embodiment of the present application;

FIG. 2-*a* is a schematic flowchart of another picture prediction method according to an embodiment of the present application;

FIG. 2-*b* to FIG. 2-*d* are schematic diagrams of several methods for determining candidate motion information unit sets of pixel samples according to an embodiment of the present application;

FIG. 2-*e* is a schematic diagram of vertex coordinates of a picture block x according to an embodiment of the present application;

FIG. 2-*f* and FIG. 2-*g* are schematic diagrams of affine motion of a pixel according to an embodiment of the present application;

FIG. 2-*h* is a schematic diagram of bilinear interpolation according to an embodiment of the present application;

FIG. 2-*i* is a schematic diagram of storage of a motion vector according to an embodiment of the present application;

DESCRIPTION OF EMBODIMENTS

Figure 3:
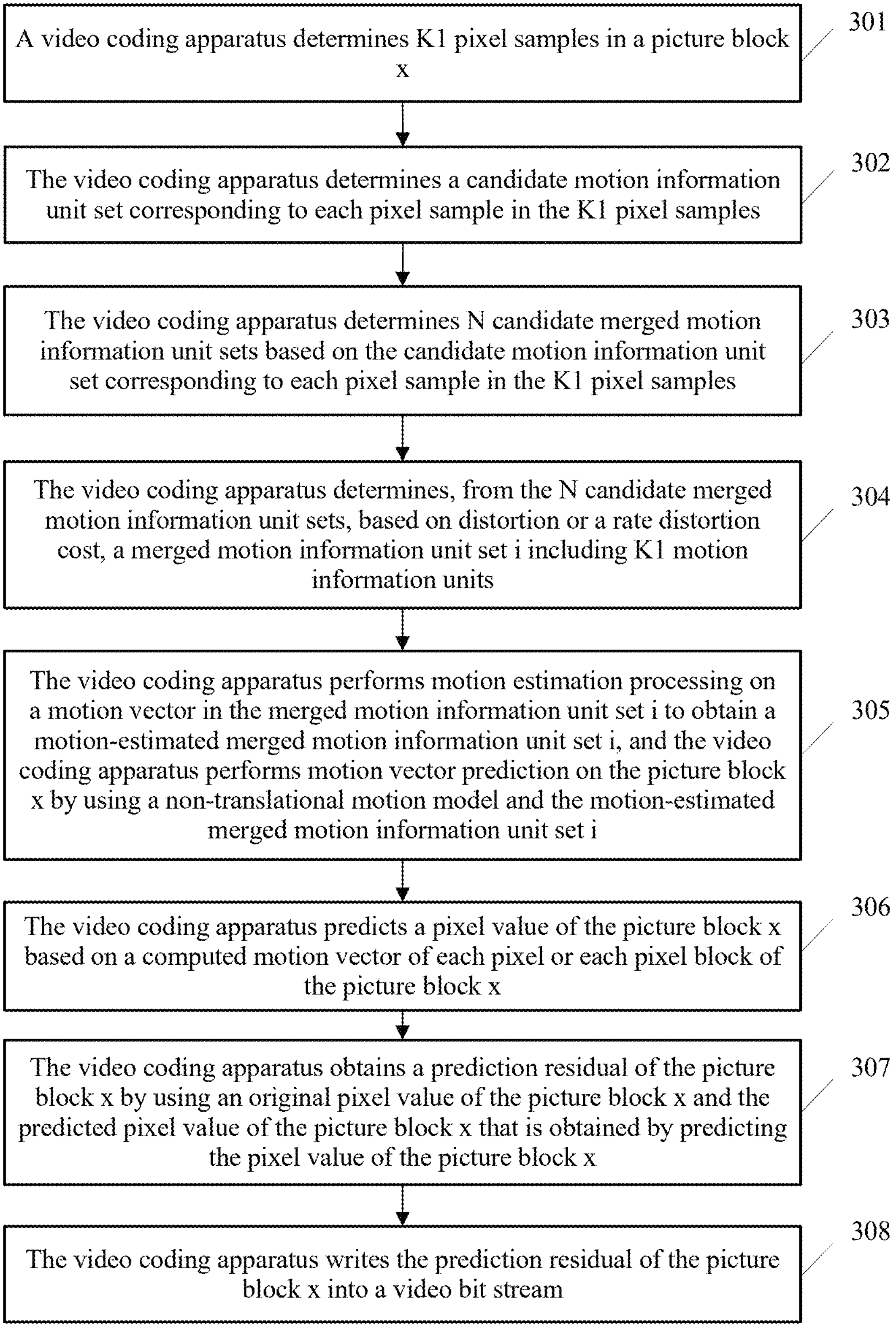
FIG. 3 is a schematic flowchart of another video coding method according to an embodiment of the present application.

Embodiments of the present application provide a picture prediction method and a related apparatus, so as to reduce computational complexity of picture prediction performed based on a non-translational motion model.

To make a person skilled in the art understand the technical solutions in the present application better, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The embodiments are hereinafter described in detail separately.

In the specification, claims, and accompanying drawings of the present application, the terms "first", "second", "third", "fourth", and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following first describes some concepts that may be involved in the embodiments of the present application.

In most coding frameworks, a video sequence includes a series of pictures, the pictures are further divided into slices, and the slices are further divided into blocks. Video coding is to perform coding processing from left to right and from top to bottom row by row starting from an upper left corner position of a picture by using a block as a unit. In some new video coding standards, the concept of a block is further extended. A macroblock (MB) is defined in the H.264 standard, and the MB may be further divided into multiple prediction blocks that may be used for predictive coding. In the HEVC standard, basic concepts such as a coding unit (CU), a prediction unit (PU), and a transform unit (TU) are used, and multiple units are classified according to functions, and a completely new tree structure is used for description. For example, the CU may be divided into smaller CUs according to a quadtree, and the smaller CUs may be further divided to form a quadtree structure. The PU and the TU also have similar tree structures. Regardless of whether a unit is a CU, a PU, or a TU, the unit belongs to the concept of a block in essence. The CU is similar to a macroblock (MB) or a coding block, and is a basic unit for partitioning and coding an picture. The PU may correspond to a prediction block, and is a basic unit for predictive coding. The CU is further divided into multiple PUs according to a partition mode. The TU may correspond to a transform block, and is a basic unit for transforming a prediction residual.

In the HEVC standard, a size of a coding unit may be 64×64, 32×32, 16×16, or 8×8. Coding units at each level may be further divided into prediction units of different sizes according to intra-frame prediction and inter-frame prediction. For example, as shown in FIG. 1-*a* and FIG. 1-*b*, FIG. 1-*a* illustrates a prediction unit partition mode corresponding to intra-frame prediction. FIG. 1-*b* illustrates several prediction unit partition modes corresponding to inter-frame prediction.

In a development and evolution process of a video coding technology, video coding experts figure out various methods to use temporal and spatial correlation between adjacent coding/decoding blocks to try to improve coding efficiency. In the H264 or advanced video coding (AVC) standard, a skip mode and a direct mode become effective tools for improving coding efficiency. Blocks of the two coding modes used when a bit rate is low can occupy more than a half of an entire coding sequence. When the skip mode is used, a motion vector of a current picture block can be derived by using adjacent motion vectors only by adding a skip mode flag to a bit stream, and a value of a reference block is directly copied according to the motion vector as a reconstructed value of the current picture block. In addition, when the direct mode is used, an encoder may derive the motion vector of the current picture block by using the adjacent motion vectors, and directly copy the value of the reference block according to the motion vector as a predicted value of the current picture block, and perform predictive coding on the current picture block by using the predicted value in the encoder. In the evolved HEVC standard, some new coding tools are introduced to further improve video coding efficiency. A merge mode and an advanced motion vector prediction (AMVP) mode are two important inter-frame prediction tools. In merge coding, motion information (including a motion vector (MV), a prediction direction, a reference frame index, and the like) of coded blocks near a current coding block is used to construct a candidate motion information set; through comparison, candidate motion information with highest coding efficiency may be selected as motion information of the current coding block, a predicted value of the current coding block is found from the reference frame, and predictive coding is performed on the current coding block; and at a same time, an index value indicating from which adjacent coded block the motion information is selected is written into a bit stream. When the advanced motion vector prediction mode is used, a motion vector of a adjacent coded block is used as a predicted value of a motion vector of the current coding block. A motion vector with highest coding efficiency may be selected and used to predict the motion vector of the current coding block, and an index value indicating which adjacent motion vector is selected may be written a video bit stream.

The following continues to discuss the technical solutions of the embodiments of the present application.

The following first describes a picture prediction method provided by an embodiment of the present application. The picture prediction method provided by this embodiment of the present application is performed by a video coding apparatus or a video decoding apparatus. The video coding apparatus or the video decoding apparatus may be any apparatus that needs to output or store a video, for example, a device such as a notebook computer, a tablet computer, a personal computer, a mobile phone, or a video server.

In an embodiment of a picture prediction method according to the present application, the picture prediction method includes: determining K1 pixel samples in a picture block x, and determining a candidate motion information unit set corresponding to each pixel sample in the K1 pixel samples, where K1 is an integer that is greater than or equal to 2, the candidate motion information unit set corresponding to each pixel sample includes at least one candidate motion information unit; determining a merged motion information unit set i including K1 motion information units, where each motion information unit in the merged motion information unit set i is selected from at least a part of motion information units in candidate motion information unit sets corresponding to different pixel samples in the K1 pixel samples, and the motion information unit includes a motion vector whose prediction direction is forward and/or a motion vector whose prediction direction is backward; and predicting a pixel value of the picture block x by using a non-translational motion model and the merged motion information unit set i.

Referring to FIG. 1-*c*, FIG. 1-*c* is a schematic flowchart of a picture prediction method according to an embodiment of the present application. As shown in FIG. 1-*c*, a picture prediction method provided by an embodiment of the present application may include the following steps:

101. Determine K1 pixel samples in a picture block x, and determine a candidate motion information unit set corresponding to each pixel sample in the K1 pixel samples.

The candidate motion information unit set corresponding to each pixel sample includes at least one candidate motion information unit.

K1 is an integer that is greater than 1. For example, K1 may be equal to 2, 3, 4, or another value.

The K1 pixel samples may be selected in various manners.

The pixel sample mentioned in each embodiment of the present application may be a pixel or a pixel block including at least two pixels.

The motion information unit mentioned in each embodiment of the present application may include a motion vector whose prediction direction is forward and/or a motion vector whose prediction direction is backward. That is, one motion information unit may include one motion vector or may include two motion vectors with different prediction directions.

If a prediction direction of a motion information unit is forward, it indicates that the motion information unit includes a motion vector whose prediction direction is forward but does not include a motion vector whose prediction direction is backward. If a prediction direction of a motion information unit is backward, it indicates that the motion information unit includes a motion vector whose prediction direction is backward but does not include a motion vector whose prediction direction is forward. If a prediction direction of a motion information unit is unidirectional, it indicates that the motion information unit includes a motion vector whose prediction direction is forward but does not include a motion vector whose prediction direction is backward, or it indicates that the motion information unit includes a motion vector whose prediction direction is backward but does not include a motion vector whose prediction direction is forward. If a prediction direction of a motion information unit is bidirectional, it indicates that the motion information unit includes a motion vector whose prediction direction is forward and a motion vector whose prediction direction is backward.

Optionally, in some possible implementation manners of the present application, the K1 pixel samples include at least two pixel samples in an upper left pixel sample, an upper right pixel sample, a lower left pixel sample, and a central pixel sample a1 of the picture block x. The upper left pixel sample of the picture block x is an upper left vertex of the picture block x, or a pixel block in the picture block x and including an upper left vertex of the picture block x; the lower left pixel sample of the picture block x is a lower left vertex of the picture block x, or a pixel block in the picture block x and including a lower left vertex of the picture block x; the upper right pixel sample of the picture block x is an upper right vertex of the picture block x, or a pixel block in the picture block x and including an upper right vertex of the picture block x; and the central pixel sample a1 of the picture block x is a central pixel of the picture block x, or a pixel block in the picture block x and including a central pixel of the picture block x.

If a pixel sample is a pixel block, a size of the pixel block is, for example, 2×2, 1×2, 4×2, 4×4, or another size.

102. Determine a merged motion information unit set i including K1 motion information units.

Each motion information unit in the merged motion information unit set i is selected from at least a part of motion information units in candidate motion information unit sets corresponding to different pixel samples in the K1 pixel samples. That is, any two motion information units in the merged motion information unit set i are selected from at least a part of motion information units in the candidate motion information unit sets corresponding to different pixel samples in the K1 pixel samples.

For example, it is assumed that K1 is equal to 3, where the K1 pixel samples include a pixel sample 001, a pixel sample 002, and a pixel sample 003. A candidate motion information unit set corresponding to the pixel sample 001 is a candidate motion information unit set 011. A candidate motion information unit set corresponding to the pixel sample 002 is a candidate motion information unit set 022. A candidate motion information unit set corresponding to the pixel sample 003 is a candidate motion information unit set 033. The merged motion information unit set i includes a motion information unit C01, a motion information unit C02, and a motion information unit C03. The motion information unit C01 may be selected from the candidate motion information unit set 011, the motion information unit C02 may be selected from the candidate motion information unit set 022, and the motion information unit C03 may be selected from the candidate motion information unit set 033. That is, any two motion information units in the motion information unit C01, the motion information unit C02, and the motion information unit C03 are selected from at least a part of motion information units in different candidate motion information unit sets in the candidate motion information unit set 011, the candidate motion information unit set 022, and the candidate motion information unit set 033. Scenarios in which K1 is equal to other values are deduced in the same way.

It may be understood that, assuming that the merged motion information unit set i includes the motion information unit C01, the motion information unit C02, and the motion information unit C03, where any motion information unit in the motion information unit C01, the motion information unit C02, and the motion information unit C03 may include a motion vector whose prediction direction is forward and/or a motion vector whose prediction direction is backward, the merged motion information unit set i may include three motion vectors (prediction directions of the three motion vectors may be forward or backward, or the three motion vectors may include two motion vectors whose prediction directions are forward and one motion vector whose prediction direction is backward, or may include one motion vector whose prediction direction is forward and two motion vectors whose prediction directions are backward); or may include four motion vectors (the four motion vectors may include two motion vectors whose prediction directions are forward and two motion vectors whose prediction directions are backward, or may include one motion vector whose prediction direction is forward and three motion vectors whose prediction directions are backward, or may include three motion vectors whose prediction directions are forward and one motion vector whose prediction direction is backward); or may include five motion vectors (the five motion vectors may include two motion vectors whose prediction directions are forward and three motion vectors whose prediction directions are backward, or may include three motion vectors whose prediction directions are forward and two motion vectors whose prediction directions are backward); or may include six motion vectors (the six motion vectors include three motion vectors whose prediction directions are forward and three motion vectors whose prediction directions are backward).

103. Predict a pixel value of the picture block x by using a non-translational motion model and the merged motion information unit set i.

The picture block x may be considered as a current picture block, and the current picture block may be a current coding block or a current decoding block.

Optionally, in some possible implementation manners of the present application, the non-translational motion model is any one of the following models: an affine motion model, a parabolic motion model, a rotational motion model, a perspective motion model, a shearing motion model, a scaling motion model, or a bilinear motion model. It may be understood that, the non-translational motion model is also not limited to the foregoing specific example.

It can be seen that, in the technical solution of this embodiment, a pixel value of the picture block x is predicted by using a non-translational motion model and a merged motion information unit set i, where each motion information unit in the merged motion information unit set i is selected from at least a part of motion information units in candidate motion information unit sets corresponding to different pixel samples in the K1 pixel samples. Because a selection range of the merged motion information unit set i is relatively small, a mechanism used in a conventional technology for screening out motion information units of K1 pixel samples only by performing a huge amount of computation in all possible candidate motion information unit sets corresponding to the K1 pixel samples is abandoned. This helps improve coding efficiency, also helps reduce computational complexity of picture prediction performed based on the non-translational motion model, further makes it possible to introduce the non-translational motion model into a video coding standard, and because the non-translational motion model is introduced, helps describe motion of an object more accurately, and therefore helps improve prediction accuracy.

The picture prediction method provided by this embodiment may be applied to a video coding process or may be applied to a video decoding process.

In an actual application, the merged motion information unit set i including the K1 motion information units may be determined in various manners.

Optionally, in some possible implementation manners of the present application, the determining a merged motion information unit set i including K1 motion information units may include: determining, from N candidate merged motion information unit sets, the merged motion information unit set i including the K1 motion information units, where each motion information unit included in each candidate merged motion information unit set in the N candidate merged motion information unit sets is selected from at least a part of constraint-compliant motion information units in the candidate motion information unit sets corresponding to different pixel samples in the K1 pixel samples, N is a positive integer, the N candidate merged motion information unit sets are different from each other, and each candidate merged motion information unit set in the N candidate merged motion information unit sets includes K1 motion information units.

That two candidate merged motion information unit sets are different may mean that motion information units included in the candidate merged motion information unit sets are not completely the same.

That two motion information units are different may mean that motion vectors included in the two motion information units are different, or that prediction directions of motion vectors included in the two motion information units are different, or that reference frame indexes corresponding to motion vectors included in the two motion information units are different. That two motion information units are the same may mean that motion vectors included in the two motion information units are the same, and that prediction directions of the motion vectors included in the two motion information units are the same, and that reference frame indexes corresponding to the motion vectors included in the two motion information units are the same.

Optionally, in some possible implementation manners of the present application, when the picture prediction method is applied to the video decoding process, the determining, from N candidate merged motion information unit sets, the merged motion information unit set i including the K1 motion information units, may include: determining, from the N candidate merged motion information unit sets, based on an identifier that is of the merged motion information unit set i and is obtained from a video bit stream, the merged motion information unit set i including the K1 motion information units.

Optionally, in some possible implementation manners of the present application, when the picture prediction method is applied to the video coding process, the method may further include: writing an identifier of the merged motion information unit set i into a video bit stream.

Optionally, in some possible implementation manners of the present application, the determining, from N candidate merged motion information unit sets, the merged motion information unit set i including the K1 motion information units, may include: determining, from the N candidate merged motion information unit sets, according to distortion or a rate distortion cost, the merged motion information unit set i including the K1 motion information units.

Optionally, a rate distortion cost corresponding to the merged motion information unit set i is lower than or equal to a rate distortion cost corresponding to any merged motion information unit set in the N candidate merged motion information unit sets except the merged motion information unit set i.

Optionally, distortion corresponding to the merged motion information unit set i is less than or equal to distortion corresponding to any merged motion information unit set in the N candidate merged motion information unit sets except the merged motion information unit set i.

A rate distortion cost corresponding to a particular candidate merged motion information unit set in the N candidate merged motion information unit sets (for example, the merged motion information unit set i in the N candidate merged motion information unit sets) may be, for example, a rate distortion cost corresponding to a predicted pixel value of a picture block obtained by predicting the pixel value of the picture block (for example, the picture block x) by using the particular candidate merged motion information unit set (for example, the merged motion information unit set i).

Distortion corresponding to a particular candidate merged motion information unit set in the N candidate merged motion information unit sets (for example, the merged motion information unit set i in the N candidate merged motion information unit sets) may be, for example, distortion between an original pixel value of a picture block (for example, the picture block x) and a predicted pixel value of the picture block obtained by predicting the pixel value of the picture block by using the particular candidate merged motion information unit set (for example, the merged motion information unit set i) (namely, the distortion between the original pixel value and the predicted pixel value of the picture block).

In some possible implementation manners of the present application, distortion between an original pixel value of a picture block (for example, the picture block x) and a predicted pixel value of the picture block obtained by predicting the pixel value of the picture block by using the particular candidate merged motion information unit set (for example, the merged motion information unit set i) may be specifically, for example, a sum of square differences (SSD) or a sum of absolute differences (SAD) or a sum of differences between the original pixel value of the picture block (for example, the picture block x) and the predicted pixel value of the picture block obtained by predicting the pixel value of the picture block by using the particular candidate merged motion information unit set (for example, the merged motion information unit set i), or another distortion parameter that can measure the distortion.

N is a positive integer. For example, N may be equal to 1, 2, 3, 4, 5, 6, 8, or another value.

Optionally, in some possible implementation manners of the present application, motion information units in any candidate merged motion information unit set in the N candidate merged motion information unit sets may be different from each other.

Optionally, in some possible implementation manners of the present application, the N candidate merged motion information unit sets meet at least one of a first condition, a second condition, a third condition, a fourth condition, or a fifth condition.

The first condition includes that a motion mode of the picture block x indicated by a motion information unit in any candidate merged motion information unit set in the N candidate merged motion information unit sets is non-translational motion. For example, if all motion vectors whose prediction directions are a first prediction direction in a candidate merged motion information unit set are equal, it may be considered that the motion mode of the picture block x indicated by a motion information unit in the candidate merged motion information unit set is translational motion; otherwise, it may be considered that the motion mode of the picture block x indicated by a motion information unit in the candidate merged motion information unit set is non-translational motion, where the first prediction direction is forward or backward. For another example, if all motion vectors whose prediction directions are a forward prediction direction in a candidate merged motion information unit set are equal, and all motion vectors whose prediction directions are a backward prediction directions in the candidate merged motion information unit set are equal, it may be considered that the motion mode of the picture block x indicated by a motion information unit in the candidate merged motion information unit set is translational motion; otherwise, it may be considered that the motion mode of the picture block x indicated by a motion information unit in the candidate merged motion information unit set is non-translational motion.

The second condition may include that prediction directions of at least two motion information units in any candidate merged motion information unit set in the N candidate merged motion information unit sets are the same. For example, when two motion information units both include a motion vector whose prediction direction is forward and a motion vector whose prediction direction is backward, it indicates that the prediction directions of the two motion information units are the same. For another example, when one motion information unit in two motion information units includes a motion vector whose prediction direction is forward and a motion vector whose prediction direction is backward, and the other motion information unit includes a motion vector whose prediction direction is forward but does not include a motion vector whose prediction direction is backward, or the other motion information unit includes a motion vector whose prediction direction is backward but does not include a motion vector whose prediction direction is forward, it may indicate that the prediction directions of the two motion information units are different. For another example, when one motion information unit in two motion information units includes a motion vector whose prediction direction is forward but does not include a motion vector whose prediction direction is backward, and the other motion information unit includes a motion vector whose prediction direction is backward but does not include a motion vector whose prediction direction is forward, it may indicate that the prediction directions of the two motion information units are different. For another example, when two motion information units both include a motion vector whose prediction direction is forward, but neither of the two motion information units includes a motion vector whose prediction direction is backward, it indicates that the prediction directions of the two motion information units are the same. For another example, when two motion information units both include a motion vector whose prediction direction is backward, but neither of the two motion information units includes a motion vector whose prediction direction is forward, it indicates that the prediction directions of the two motion information units are the same.

The third condition includes that reference frame indexes corresponding to at least two motion information units in any candidate merged motion information unit set in the N candidate merged motion information unit sets are the same. For example, when two motion information units both include a motion vector whose prediction direction is forward and a motion vector whose prediction direction is backward, and reference frame indexes corresponding to the motion vectors whose prediction directions are forward in the two motion information units are the same, and reference frame indexes corresponding to the motion vectors whose prediction directions are backward in the two motion information units are the same, it may indicate that the reference frame indexes corresponding to the two motion information units are the same. For another example, when one motion information unit in two motion information units includes a motion vector whose prediction direction is forward and a motion vector whose prediction direction is backward, and the other motion information unit includes a motion vector whose prediction direction is forward but does not include a motion vector whose prediction direction is backward, or the other motion information unit includes a motion vector whose prediction direction is backward but does not include a motion vector whose prediction direction is forward, it indicates that the prediction directions of the two motion information units are different, and may indicate that reference frame indexes corresponding to the two motion information units are different. For another example, when one motion information unit in two motion information units includes a motion vector whose prediction direction is forward but does not include a motion vector whose prediction direction is backward, and the other motion information unit includes a motion vector whose prediction direction is backward but does not include a motion vector whose prediction direction is forward, it may indicate that reference frame indexes corresponding to the two motion information units are different. For another example, when one motion information unit in two motion information units includes a motion vector whose prediction direction is forward but does not include a motion vector whose prediction direction is backward, and the other motion information unit includes a motion vector whose prediction direction is forward but does not include a motion vector whose prediction direction is backward, and reference frame indexes corresponding to the motion vectors whose prediction directions are forward in the two motion information units are the same, it may indicate that reference frame indexes corresponding to the two motion information units are different. For another example, when one motion information unit in two motion information units includes a motion vector whose prediction direction is backward but does not include a motion vector whose prediction direction is forward, and the other motion information unit includes a motion vector whose prediction direction is backward but does not include a motion vector whose prediction direction is forward, and reference frame indexes corresponding to the motion vectors whose prediction directions are backward in the two motion information units are the same, it may indicate that reference frame indexes corresponding to the two motion information units are different.

The fourth condition includes that an absolute value of a difference between horizontal components of two motion information units in any candidate merged motion information unit set in the N candidate merged motion information unit sets is less than or equal to a horizontal component threshold. The horizontal component threshold may be equal to ⅓ of a width of the picture block x, ½ of a width of the picture block x, ⅔ of a width of the picture block x, ¾ of a width of the picture block x, or another value.

The fifth condition includes that an absolute value of a difference between vertical components of two motion information units in any candidate merged motion information unit set in the N candidate merged motion information unit sets is less than or equal to a vertical component threshold. The vertical component threshold may be equal to ⅓ of a height of the picture block x, ½ of a height of the picture block x, ⅔ of a height of the picture block x, ¾ of a height of the picture block x, or another value.

Optionally, in some possible implementation manners of the present application, a candidate motion information unit set corresponding to the upper left pixel sample of the picture block x includes motion information units of x1 pixel samples, where the x1 pixel samples include at least one pixel sample spatially adjacent to the upper left pixel sample of the picture block x and/or at least one pixel sample temporally adjacent to the upper left pixel sample of the picture block x, and x1 is a positive integer. For example, the x1 pixel samples include only at least one pixel sample spatially adjacent to the upper left pixel sample of the picture block x and/or at least one pixel sample temporally adjacent to the upper left pixel sample of the picture block x.

For example, x1 may be equal to 1, 2, 3, 4, 5, 6, or another value.

For example, the x1 pixel samples include at least one of a pixel sample that has a same location as the upper left pixel sample of the picture block x, a pixel sample spatially adjacent to a left edge of the picture block x, a pixel sample spatially adjacent to an upper left of the picture block x, or a pixel sample spatially adjacent to an upper edge of the picture block x, in a video frame temporally adjacent to a video frame to which the picture block x belongs.

Optionally, in some possible implementation manners of the present application, a candidate motion information unit set corresponding to the upper right pixel sample of the picture block x includes motion information units of x2 pixel samples, where the x2 pixel samples include at least one pixel sample spatially adjacent to the upper right pixel sample of the picture block x and/or at least one pixel sample temporally adjacent to the upper right pixel sample of the picture block x, and x2 is a positive integer.

For example, x2 may be equal to 1, 2, 3, 4, 5, 6, or another value.

For example, the x2 pixel samples include at least one of a pixel sample that has a same location as the upper right pixel sample of the picture block x, a pixel sample spatially adjacent to a right edge of the picture block x, a pixel sample spatially adjacent to an upper right of the picture block x, or a pixel sample spatially adjacent to the upper edge of the picture block x, in a video frame temporally adjacent to the video frame to which the picture block x belongs.

Optionally, in some possible implementation manners of the present application, a candidate motion information unit set corresponding to the lower left pixel sample of the picture block x includes motion information units of x3 pixel samples, where the x3 pixel samples include at least one pixel sample spatially adjacent to the lower left pixel sample of the picture block x and/or at least one pixel sample temporally adjacent to the lower left pixel sample of the picture block x, and x3 is a positive integer. For example, the x3 pixel samples include only at least one pixel sample spatially adjacent to the lower left pixel sample of the picture block x and/or at least one pixel sample temporally adjacent to the lower left pixel sample of the picture block x.

For example, x3 may be equal to 1, 2, 3, 4, 5, 6, or another value.

For example, the x3 pixel samples include at least one of a pixel sample that has a same location as the lower left pixel sample of the picture block x, a pixel sample spatially adjacent to the left edge of the picture block x, a pixel sample spatially adjacent to a lower left of the picture block x, or a pixel sample spatially adjacent to a lower edge of the picture block x, in a video frame temporally adjacent to the video frame to which the picture block x belongs.

Optionally, in some possible implementation manners of the present application, a candidate motion information unit set corresponding to the central pixel sample a1 of the picture block x includes motion information units of x5 pixel samples, where one pixel sample in the x5 pixel samples is a pixel sample a2. For example, the x5 pixel samples include only the pixel sample a2.

A location of the central pixel sample a1 in the video frame to which the picture block x belongs is the same as a location of the pixel sample a2 in a video frame adjacent to the video frame to which the picture block x belongs, and x5 is a positive integer.

Optionally, in some possible implementation manners of the present application, the predicting a pixel value of the picture block x by using a non-translational motion model and the merged motion information unit set i may include: when motion vectors whose prediction directions are a first prediction direction in the merged motion information unit set i correspond to different reference frame indexes, performing scaling processing on the merged motion information unit set i, so that the motion vectors whose prediction directions are the first prediction direction in the merged motion information unit set i are scaled down to a same reference frame, and predicting the pixel value of the picture block x by using the non-translational motion model and a scaled merged motion information unit set i, where the first prediction direction is forward or backward; or the predicting a pixel value of the picture block x by using a non-translational motion model and the merged motion information unit set i may include: when motion vectors whose prediction directions are forward in the merged motion information unit set i correspond to different reference frame indexes and motion vectors whose prediction directions are backward in the merged motion information unit set i correspond to different reference frame indexes, performing scaling processing on the merged motion information unit set i, so that the motion vectors whose prediction directions are forward in the merged motion information unit set i are scaled down to a same reference frame and that the motion vectors whose prediction directions are backward in the merged motion information unit set i are scaled down to a same reference frame, and predicting the pixel value of the picture block x by using the non-translational motion model and a scaled merged motion information unit set i.

It may be understood that, for each picture block in a current video frame, a pixel value may be predicted in a mode similar to a pixel value prediction mode corresponding to the picture block x. Certainly, for some picture blocks in the current video frame, a pixel value may also be predicted in a mode different from the pixel value prediction mode corresponding to the picture block x.

Optionally, in some possible implementation manners of the present application, the predicting a pixel value of the picture block x by using a non-translational motion model and the merged motion information unit set i may include: performing motion estimation processing on a motion vector in the merged motion information unit set i to obtain a motion-estimated merged motion information unit set i, and predicting the pixel value of the picture block x by using the non-translational motion model and the motion-estimated merged motion information unit set i.

Optionally, in some possible implementation manners of the present application, the predicting the pixel value of the picture block x by using the non-translational motion model and a scaled merged motion information unit set i may, for example, include: performing motion estimation processing on a motion vector in the scaled merged motion information unit set i to obtain a motion-estimated merged motion information unit set i, and predicting the pixel value of the picture block x by using the non-translational motion model and the motion-estimated merged motion information unit set i.

Optionally, in some possible implementation manners of the present application, the predicting a pixel value of the picture block x by using a non-translational motion model and the merged motion information unit set i includes: obtaining a motion vector of each pixel in the picture block x through computation by using the non-translational motion model and the merged motion information unit set i, and determining a predicted pixel value of each pixel in the picture block x by using the obtained motion vector of each pixel in the picture block x; or obtaining a motion vector of each pixel block in the picture block x through computation by using the non-translational motion model and the merged motion information unit set i, and determining a predicted pixel value of each pixel in each pixel block in the picture block x by using the obtained motion vector of each pixel block in the picture block x.

During a test, it is found that performing motion vector computation by using a pixel block in the picture block x as a granularity helps reduce computational complexity greatly if the motion vector of each pixel block in the picture block x is obtained through computation by using the non-translational motion model and the merged motion information unit set i and then the predicted pixel value of each pixel in each pixel block in the picture block x is determined by using the obtained motion vector of each pixel block in the picture block x.

Optionally, in some possible implementation manners of the present application, the method further includes: determining K2 pixel samples in a picture block y, and determining a candidate motion information unit set corresponding to each pixel sample in the K2 pixel samples, where K2 is an integer that is greater than 1 (K1 may be equal or unequal to K2), and the picture block y is spatially adjacent to the picture block x and the candidate motion information unit set corresponding to each pixel sample in the K2 pixel samples includes at least one candidate motion information unit; determining a merged motion information unit set j including K2 motion information units; wherein a candidate motion information unit set corresponding to a pixel sample z1 in the K2 pixel samples includes a motion information unit a2, and the motion information unit a2 is obtained based on a motion information unit of a pixel sample z2, where the pixel sample z2 is a pixel sample in the picture block x and a distance between the pixel sample z2 and the pixel sample z1 is less than a threshold, or the pixel sample z2 is a pixel sample in the picture block x and a distance between the pixel sample z2 and the pixel sample z1 is shortest; and the K2 motion information units in the merged motion information unit set j are respectively selected from at least a part of constraint-compliant motion information units in the candidate motion information unit set corresponding to each pixel sample in the K2 pixel samples; and predicting a pixel value of the picture block y by using the non-translational motion model and the merged motion information unit set j.

Optionally, in some possible implementation manners of the present application, the K2 pixel samples may further include at least two pixel samples in an upper left pixel sample, an upper right pixel sample, a lower left pixel sample, and a central pixel sample a3 of the picture block y. The upper left pixel sample of the picture block y is an upper left vertex of the picture block y, or a pixel block in the picture block y and including an upper left vertex of the picture block y; the lower left pixel sample of the picture block y is a lower left vertex of the picture block y, or a pixel block in the picture block y and including a lower left vertex of the picture block y; the upper right pixel sample of the picture block y is an upper right vertex of the picture block y, or a pixel block in the picture block y and including an upper right vertex of the picture block y; and the central pixel sample a3 of the picture block y is a central pixel of the picture block y, or a pixel block in the picture block y and including a central pixel of the picture block y.

In an actual application, the merged motion information unit set j including the K2 motion information units may be determined in various manners.

Optionally, in some possible implementation manners of the present application, the determining a merged motion information unit set j including K2 motion information units may include: determining, from N2 candidate merged motion information unit sets, the merged motion information unit set j including the K2 motion information units, where each motion information unit included in each candidate merged motion information unit set in the N2 candidate merged motion information unit sets is selected from at least a part of constraint-compliant motion information units in candidate motion information unit sets corresponding to different pixel samples in the K2 pixel samples, the N2 candidate merged motion information unit sets are different from each other, each candidate merged motion information unit set in the N2 candidate merged motion information unit sets includes K2 motion information units, and N2 is a positive integer.

Optionally, in some possible implementation manners of the present application, when the picture prediction method is applied to the video decoding process, the determining, from N2 candidate merged motion information unit sets, the merged motion information unit set j including the K2 motion information units, may include: determining, from the N2 candidate merged motion information unit sets, based on an identifier that is of the merged motion information unit set j and is obtained from a video bit stream, the merged motion information unit set j including the K2 motion information units.

Optionally, in some possible implementation manners of the present application, when the picture prediction method is applied to the video coding process, the method further includes: writing an identifier of the merged motion information unit set j into a video bit stream.

Optionally, in some possible implementation manners of the present application, the determining, from N2 candidate merged motion information unit sets, the merged motion information unit set j including the K2 motion information units, may include: determining, from the N2 candidate merged motion information unit sets, according to distortion or a rate distortion cost, the merged motion information unit set j including K2 motion vectors.

Optionally, a rate distortion cost corresponding to the merged motion information unit set j is lower than or equal to a rate distortion cost corresponding to any merged motion information unit set in the N2 candidate merged motion information unit sets except the merged motion information unit set j.

Optionally, distortion corresponding to the merged motion information unit set j is less than or equal to distortion corresponding to any merged motion information unit set in the N2 candidate merged motion information unit sets except the merged motion information unit set j.

A rate distortion cost corresponding to a particular candidate merged motion information unit set in the N2 candidate merged motion information unit sets (for example, the merged motion information unit set j in the N2 candidate merged motion information unit sets) may be, for example, a rate distortion cost corresponding to a predicted pixel value of a picture block obtained by predicting the pixel value of the picture block (for example, the picture block y) by using the particular candidate merged motion information unit set (for example, the merged motion information unit set j).

Distortion corresponding to a particular candidate merged motion information unit set in the N2 candidate merged motion information unit sets (for example, the merged motion information unit set j in the N2 candidate merged motion information unit sets) may be, for example, distortion between an original pixel value of a picture block (for example, the picture block y) and a predicted pixel value of the picture block obtained by predicting the pixel value of the picture block by using the particular candidate merged motion information unit set (for example, the merged motion information unit set j) (namely, the distortion between the original pixel value and the predicted pixel value of the picture block).

In some possible implementation manners of the present application, distortion between an original pixel value of a picture block (for example, the picture block y) and a predicted pixel value of the picture block obtained by predicting the pixel value of the picture block by using the particular candidate merged motion information unit set (for example, the merged motion information unit set j) may be specifically, for example, a sum of square differences or a sum of absolute differences or a sum of differences between the original pixel value of the picture block (for example, the picture block y) and the predicted pixel value of the picture block obtained by predicting the pixel value of the picture block by using the particular candidate merged motion information unit set (for example, the merged motion information unit set j), or another distortion parameter that can measure the distortion.

N2 is a positive integer. For example, N2 may be equal to 1, 2, 3, 4, 5, 6, 8, or another value.

Optionally, in some possible implementation manners of the present application, the N2 candidate merged motion information unit sets meet at least one of a first condition, a second condition, a third condition, a fourth condition, or a fifth condition. The first condition includes that a motion mode of the picture block y indicated by a motion information unit in any candidate merged motion information unit set in the N2 candidate merged motion information unit sets is non-translational motion. The second condition may include that prediction directions of at least two motion information units in any candidate merged motion information unit set in the N2 candidate merged motion information unit sets are the same. The third condition includes that reference frame indexes corresponding to at least two motion information units in any candidate merged motion information unit set in the N2 candidate merged motion information unit sets are the same. The fourth condition includes that an absolute value of a difference between horizontal components of two motion information units in any candidate merged motion information unit set in the N2 candidate merged motion information unit sets is less than or equal to a horizontal component threshold. The fifth condition includes that an absolute value of a difference between vertical components of two motion information units in any candidate merged motion information unit set in the N2 candidate merged motion information unit sets is less than or equal to a vertical component threshold.

Optionally, in some possible implementation manners of the present application, a candidate motion information unit set corresponding to the upper left pixel sample of the picture block y includes motion information units of y1 pixel samples, where the y1 pixel samples include at least one pixel sample spatially adjacent to the upper left pixel sample of the picture block y and/or at least one pixel sample temporally adjacent to the upper left pixel sample of the picture block y, and y1 is a positive integer. For example, the y1 pixel samples include only at least one pixel sample spatially adjacent to the upper left pixel sample of the picture block y and/or at least one pixel sample temporally adjacent to the upper left pixel sample of the picture block y.

For example, y1 may be equal to 1, 2, 3, 4, 5, 6, or another value.

For example, the y1 pixel samples include at least one of a pixel sample that has a same location as the upper left pixel sample of the picture block y, a pixel sample spatially adjacent to a left edge of the picture block y, a pixel sample spatially adjacent to an upper left of the picture block y, or a pixel sample spatially adjacent to an upper edge of the picture block y, in a video frame temporally adjacent to a video frame to which the picture block y belongs. Optionally, in some possible implementation manners of the present application, a candidate motion information unit set corresponding to the upper right pixel sample of the picture block y includes motion information units of y2 pixel samples, where the y2 pixel samples include at least one pixel sample spatially adjacent to the upper right pixel sample of the picture block y and/or at least one pixel sample temporally adjacent to the upper right pixel sample of the picture block y, and y2 is a positive integer.

For example, y2 may be equal to 1, 2, 3, 4, 5, 6, or another value.

For example, the y2 pixel samples include at least one of a pixel sample that has a same location as the upper right pixel sample of the picture block y, a pixel sample spatially adjacent to a right edge of the picture block y, a pixel sample spatially adjacent to an upper right of the picture block y, or a pixel sample spatially adjacent to the upper edge of the picture block y, in a video frame temporally adjacent to the video frame to which the picture block y belongs.

Optionally, in some possible implementation manners of the present application, a candidate motion information unit set corresponding to the lower left pixel sample of the picture block y includes motion information units of y3 pixel samples, where the y3 pixel samples include at least one pixel sample spatially adjacent to the lower left pixel sample of the picture block y and/or at least one pixel sample temporally adjacent to the lower left pixel sample of the picture block y, and y3 is a positive integer. For example, the y3 pixel samples include only at least one pixel sample spatially adjacent to the lower left pixel sample of the picture block y and/or at least one pixel sample temporally adjacent to the lower left pixel sample of the picture block y.

For example, y3 may be equal to 1, 2, 3, 4, 5, 6, or another value.

For example, the y3 pixel samples include at least one of a pixel sample that has a same location as the lower left pixel sample of the picture block y, a pixel sample spatially adjacent to the left edge of the picture block y, a pixel sample spatially adjacent to a lower left of the picture block y, or a pixel sample spatially adjacent to a lower edge of the picture block y, in a video frame temporally adjacent to the video frame to which the picture block y belongs.

Optionally, in some possible implementation manners of the present application, a candidate motion information unit set corresponding to the central pixel sample a3 of the picture block y includes motion information units of y5 pixel samples, where one pixel sample in the y5 pixel samples is a pixel sample a4. For example, the y5 pixel samples include only the pixel sample a4.

A location of the central pixel sample a3 in the video frame to which the picture block y belongs is the same as a location of the pixel sample a4 in a video frame adjacent to the video frame to which the picture block y belongs, and y5 is a positive integer.

Optionally, in some possible implementation manners of the present application, the predicting a pixel value of the picture block y by using the non-translational motion model and the merged motion information unit set j may include: when motion vectors whose prediction directions are a first prediction direction in the merged motion information unit set j correspond to different reference frame indexes, performing scaling processing on the merged motion information unit set j, so that the motion vectors whose prediction directions are the first prediction direction in the merged motion information unit set j are scaled down to a same reference frame, and predicting the pixel value of the picture block y by using the non-translational motion model and a scaled merged motion information unit set j, where the first prediction direction is forward or backward; or the predicting a pixel value of the picture block y by using the non-translational motion model and the merged motion information unit set j may include: when motion vectors whose prediction directions are forward in the merged motion information unit set j correspond to different reference frame indexes and motion vectors whose prediction directions are backward in the merged motion information unit set j correspond to different reference frame indexes, performing scaling processing on the merged motion information unit set j, so that the motion vectors whose prediction directions are forward in the merged motion information unit set j are scaled down to a same reference frame and that the motion vectors whose prediction directions are backward in the merged motion information unit set j are scaled down to a same reference frame, and predicting the pixel value of the picture block y by using the non-translational motion model and a scaled merged motion information unit set j.

Optionally, in some possible implementation manners of the present application, the predicting a pixel value of the picture block y by using the non-translational motion model and the merged motion information unit set j may include: performing motion estimation processing on a motion vector in the merged motion information unit set j to obtain a motion-estimated merged motion information unit set j, and predicting the pixel value of the picture block y by using the non-translational motion model and the motion-estimated merged motion information unit set j.

Optionally, in some possible implementation manners of the present application, the predicting the pixel value of the picture block y by using the non-translational motion model and a scaled merged motion information unit set j may, for example, include: performing motion estimation processing on a motion vector in the scaled merged motion information unit set j to obtain a motion-estimated merged motion information unit set j, and predicting the pixel value of the picture block y by using the non-translational motion model and the motion-estimated merged motion information unit set j.

Optionally, in some possible implementation manners of the present application, the predicting a pixel value of the picture block y by using the non-translational motion model and the merged motion information unit set j includes: obtaining a motion vector of each pixel in the picture block y through computation by using the non-translational motion model and the merged motion information unit set j, and determining a predicted pixel value of each pixel in the picture block y by using the obtained motion vector of each pixel in the picture block y; or obtaining a motion vector of each pixel block in the picture block y through computation by using the non-translational motion model and the merged motion information unit set j, and determining a predicted pixel value of each pixel in each pixel block in the picture block y by using the obtained motion vector of each pixel block in the picture block y.

During the test, it is found that performing motion vector computation by using a pixel block in the picture block y as a granularity helps reduce computational complexity greatly if the motion vector of each pixel block in the picture block y is obtained through computation by using the non-translational motion model and the merged motion information unit set j and then the predicted pixel value of each pixel in each pixel block in the picture block y is determined by using the obtained motion vector of each pixel block in the picture block y.

For better understanding and implementing the foregoing solution of the embodiment of the present application, the following uses specific application scenarios for further description.

Referring to FIG. 2-*a*, FIG. 2-*a* is a schematic flowchart of another picture prediction method according to another embodiment of the present application. As shown in FIG. 2-*a*, another picture prediction method provided by another embodiment of the present application may include the following steps:

201. Determine K1 pixel samples in a picture block x.

In this embodiment, for example, the K1 pixel samples include an upper left pixel sample, an upper right pixel sample, and a lower left pixel sample of the picture block x.

The upper left pixel sample of the picture block x is an upper left vertex of the picture block x, or a pixel block in the picture block x and including an upper left vertex of the picture block x. The lower left pixel sample of the picture block x is a lower left vertex of the picture block x, or a pixel block in the picture block x and including a lower left vertex of the picture block x. The upper right pixel sample of the picture block x is an upper right vertex of the picture block x, or a pixel block in the picture block x and including an upper right vertex of the picture block x.

If a pixel sample is a pixel block, a size of the pixel block is, for example, 2×2, 1×2, 4×2, 4×4, or another size.

202. Determine a candidate motion information unit set corresponding to each pixel sample in the K1 pixel samples.

The candidate motion information unit set corresponding to each pixel sample includes at least one candidate motion information unit.

The pixel sample mentioned in each embodiment of the present application may be a pixel or a pixel block including at least two pixels.

The motion information unit mentioned in each embodiment of the present application may include a motion vector whose prediction direction is forward and/or a motion vector whose prediction direction is backward. That is, one motion information unit may include one motion vector or may include two motion vectors with different prediction directions.

If a prediction direction of a motion information unit is forward, it indicates that the motion information unit includes a motion vector whose prediction direction is forward but does not include a motion vector whose prediction direction is backward. If a prediction direction of a motion information unit is backward, it indicates that the motion information unit includes a motion vector whose prediction direction is backward but does not include a motion vector whose prediction direction is forward. If a prediction direction of a motion information unit is unidirectional, it indicates that the motion information unit includes a motion vector whose prediction direction is forward but does not include a motion vector whose prediction direction is backward, or it indicates that the motion information unit includes a motion vector whose prediction direction is backward but does not include a motion vector whose prediction direction is forward. If a prediction direction of a motion information unit is bidirectional, it indicates that the motion information unit includes a motion vector whose prediction direction is forward and a motion vector whose prediction direction is backward.

K1 is an integer that is greater than 1. For example, K1 may be equal to 2, 3, 4, or another value.

The candidate motion information unit sets corresponding to the K1 pixel samples may be determined in various manners.

For example, as shown in FIG. 2-*b* and FIG. 2-*c*, FIG. 2-*b* and FIG. 2-*c* use an example in which K1 is equal to 3. A candidate motion information unit set S1 corresponding to the upper left pixel sample of the picture block x may include motion information units of x1 pixel samples. The x1 pixel samples include at least one of a pixel sample Col-LT that has a same location as the upper left pixel sample LT of the picture block x, a pixel sample C spatially adjacent to a left edge of the picture block x, a pixel sample A spatially adjacent to an upper left of the picture block x, or a pixel sample B spatially adjacent to an upper edge of the picture block x, in a video frame temporally adjacent to a video frame to which the picture block x belongs. For example, a motion information unit of the pixel sample C spatially adjacent to the left edge of the picture block x, a motion information unit of the pixel sample A spatially adjacent to the upper left of the picture block x, and a motion information unit of the pixel sample B spatially adjacent to the upper edge of the picture block x may be obtained first, and the obtained motion information unit of the pixel sample C spatially adjacent to the left edge of the picture block x, motion information unit of the pixel sample A spatially adjacent to the upper left of the picture block x, and motion information unit of the pixel sample B spatially adjacent to the upper edge of the picture block x are added to the candidate motion information unit set corresponding to the upper left pixel sample of the picture block x. If some or all motion information units in the motion information unit of the pixel sample C spatially adjacent to the left edge of the picture block x, the motion information unit of the pixel sample A spatially adjacent to the upper left of the picture block x, and the motion information unit of the pixel sample B spatially adjacent to the upper edge of the picture block x are the same, deduplication processing is further performed on the candidate motion information unit set S1 (herein a quantity of motion information units in the candidate motion information unit set S1 after the deduplication processing may be 1 or 2). If a motion information unit of the pixel sample Col-LT that has the same location as the upper left pixel sample LT of the picture block x, in the video frame temporally adjacent to the video frame to which the picture block x belongs, is the same as a motion information unit in the candidate motion information unit set S1 after the deduplication processing, a zero motion information unit is added to the candidate motion information unit set S1 until the quantity of motion information units in the candidate motion information unit set S1 is equal to 3. In addition, if a motion information unit of the pixel sample Col-LT that has the same location as the upper left pixel sample LT of the picture block x, in the video frame temporally adjacent to the video frame to which the picture block x belongs, is different from any motion information unit in the candidate motion information unit set S1 after the deduplication processing, the motion information unit of the pixel sample Col-LT that has the same location as the upper left pixel sample LT of the picture block x, in the video frame temporally adjacent to the video frame to which the picture block x belongs, is added to the candidate motion information unit set S1 after the deduplication processing. If the quantity of motion information units in the candidate motion information unit set S1 is still less than 3 in this case, a zero motion information unit is added to the candidate motion information unit set S1 until the quantity of motion information units in the candidate motion information unit set S1 is equal to 3.

If the video frame to which the picture block x belongs is a forward prediction frame, the zero motion information unit added to the candidate motion information unit set S1 includes a zero motion vector whose prediction direction is forward but may not include a zero motion vector whose prediction direction is backward. If the video frame to which the picture block x belongs is a backward prediction frame, the zero motion information unit added to the candidate motion information unit set S1 includes a zero motion vector whose prediction direction is backward but may not include a zero motion vector whose prediction direction is forward. In addition, if the video frame to which the picture block x belongs is a bidirectional prediction frame, the zero motion information unit added to the candidate motion information unit set S1 includes a zero motion vector whose prediction direction is forward and a zero motion vector whose prediction direction is backward, where reference frame indexes corresponding to motion vectors in different zero motion information units added to the candidate motion information unit set S1 may be different, and the corresponding reference frame indexes may be, for example, 0, 1, 2, 3, or another value.

Similarly, for example, as shown in FIG. 2-*b* and FIG. 2-*c*, a candidate motion information unit set S2 corresponding to the upper right pixel sample of the picture block x may include motion information units of x2 pixel samples. The x2 pixel samples may include at least one of a pixel sample Col-RT that has a same location as the upper right pixel sample RT of the picture block x, a pixel sample E spatially adjacent to an upper right of the picture block x, or a pixel sample D spatially adjacent to the upper edge of the picture block x, in a video frame temporally adjacent to the video frame to which the picture block x belongs. For example, a motion information unit of the pixel sample E spatially adjacent to the upper right of the picture block x and a motion information unit of the pixel sample D spatially adjacent to the upper edge of the picture block x may be obtained first, and the obtained motion information unit of the pixel sample E spatially adjacent to the upper right of the picture block x and motion information unit of the pixel sample D spatially adjacent to the upper edge of the picture block x are added to the candidate motion information unit set S2 corresponding to the upper right pixel sample of the picture block x. If the motion information unit of the pixel sample E spatially adjacent to the upper right of the picture block x is the same as the motion information unit of the pixel sample D spatially adjacent to the upper edge of the picture block x, deduplication processing is performed on the candidate motion information unit set S2 (herein a quantity of motion information units in the candidate motion information unit set S2 after the deduplication processing is 1). If a motion information unit of the pixel sample Col-RT that has the same location as the upper right pixel sample RT of the picture block x, in the video frame temporally adjacent to the video frame to which the picture block x belongs, is the same as a motion information unit in the candidate motion information unit set S2 after the deduplication processing, a zero motion information unit may be further added to the candidate motion information unit set S2 until the quantity of motion information units in the candidate motion information unit set S2 is equal to 2. In addition, if a motion information unit of the pixel sample Col-RT that has the same location as the upper right pixel sample RT of the picture block x, in the video frame temporally adjacent to the video frame to which the picture block x belongs, is different from any motion information unit in the candidate motion information unit set S2 after the deduplication processing, the motion information unit of the pixel sample Col-RT that has the same location as the upper right pixel sample RT of the picture block x, in the video frame temporally adjacent to the video frame to which the picture block x belongs, may be added to the candidate motion information unit set S2 after the deduplication processing. If the quantity of motion information units in the candidate motion information unit set S2 is still less than 2 in this case, a zero motion information unit is further added to the candidate motion information unit set S2 until the quantity of motion information units in the candidate motion information unit set S2 is equal to 2.

If the video frame to which the picture block x belongs is a forward prediction frame, the zero motion information unit added to the candidate motion information unit set S2 includes a zero motion vector whose prediction direction is forward but may not include a zero motion vector whose prediction direction is backward. If the video frame to which the picture block x belongs is a backward prediction frame, the zero motion information unit added to the candidate motion information unit set S2 includes a zero motion vector whose prediction direction is backward but may not include a zero motion vector whose prediction direction is forward. In addition, if the video frame to which the picture block x belongs is a bidirectional prediction frame, the zero motion information unit added to the candidate motion information unit set S2 includes a zero motion vector whose prediction direction is forward and a zero motion vector whose prediction direction is backward, where reference frame indexes corresponding to motion vectors in different zero motion information units added to the candidate motion information unit set S2 may be different, and the corresponding reference frame indexes may be, for example, 0, 1, 2, 3, or another value.

Similarly, for example, as shown in FIG. 2-*b* and FIG. 2-*c*, a candidate motion information unit set S3 corresponding to the lower left pixel sample of the picture block x may include motion information units of ×3 pixel samples. The x3 pixel samples may include at least one of a pixel sample Col-LB that has a same location as the lower left pixel sample LB of the picture block x, a pixel sample G spatially adjacent to a lower left of the picture block x, or a picture block F spatially adjacent to the left edge of the picture block x, in a video frame temporally adjacent to the video frame to which the picture block x belongs. For example, a motion information unit of the pixel sample G spatially adjacent to the lower left of the picture block x and a motion information unit of the picture block F spatially adjacent to the left edge of the picture block x may be obtained first, and the obtained motion information unit of the pixel sample G spatially adjacent to the lower left of the picture block x and motion information unit of the picture block F spatially adjacent to the left edge of the picture block x may be added to the candidate motion information unit set S3 corresponding to the lower left pixel sample of the picture block x. If the motion information unit of the pixel sample G spatially adjacent to the lower left of the picture block x is the same as the motion information unit of the picture block F spatially adjacent to the left edge of the picture block x, deduplication processing is performed on the candidate motion information unit set S3 (herein a quantity of motion information units in the candidate motion information unit set S3 after the deduplication processing is 1). If a motion information unit of the pixel sample Col-LB that has the same location as the lower left pixel sample LB of the picture block x, in the video frame temporally adjacent to the video frame to which the picture block x belongs, is the same as a motion information unit in the candidate motion information unit set S3 after the deduplication processing, a zero motion information unit may be further added to the candidate motion information unit set S3 until the quantity of motion information units in the candidate motion information unit set S3 is equal to 2. In addition, if a motion information unit of the pixel sample Col-LB that has the same location as the lower left pixel sample LB of the picture block x, in the video frame temporally adjacent to the video frame to which the picture block x belongs, is different from any motion information unit in the candidate motion information unit set S3 after the deduplication processing, the motion information unit of the pixel sample Col-LB that has the same location as the lower left pixel sample LB of the picture block x, in the video frame temporally adjacent to the video frame to which the picture block x belongs, may be added to the candidate motion information unit set S3 after the deduplication processing. If the quantity of motion information units in the candidate motion information unit set S3 is still less than 2 in this case, a zero motion information unit is further added to the candidate motion information unit set S3 until the quantity of motion information units in the candidate motion information unit set S3 is equal to 2.

If the video frame to which the picture block x belongs is a forward prediction frame, the zero motion information unit added to the candidate motion information unit set S3 includes a zero motion vector whose prediction direction is forward but may not include a zero motion vector whose prediction direction is backward. If the video frame to which the picture block x belongs is a backward prediction frame, the zero motion information unit added to the candidate motion information unit set S3 includes a zero motion vector whose prediction direction is backward but may not include a zero motion vector whose prediction direction is forward. In addition, if the video frame to which the picture block x belongs is a bidirectional prediction frame, the zero motion information unit added to the candidate motion information unit set S3 includes a zero motion vector whose prediction direction is forward and a zero motion vector whose prediction direction is backward, where reference frame indexes corresponding to motion vectors in different zero motion information units added to the candidate motion information unit set S3 may be different, and the corresponding reference frame indexes may be, for example, 0, 1, 2, 3, or another value.

That two motion information units are different may mean that motion vectors included in the two motion information units are different, or that prediction directions of motion vectors included in the two motion information units are different, or that reference frame indexes corresponding to motion vectors included in the two motion information units are different. That two motion information units are the same may mean that motion vectors included in the two motion information units are the same, and that prediction directions of the motion vectors included in the two motion information units are the same, and that reference frame indexes corresponding to the motion vectors included in the two motion information units are the same.

It may be understood that, for a scenario in which more pixel samples exist, a candidate motion information unit set corresponding to a pixel sample may be obtained in a similar manner.

For example, as shown in FIG. 2-*d*, in the example of FIG. 2-*d*, K1 is equal to 4. In the example of FIG. 2-*d*, the K1 pixel samples may include an upper left pixel sample, an upper right pixel sample, a lower left pixel sample, and a central pixel sample a1 of the picture block x. The upper left pixel sample of the picture block x is an upper left vertex of the picture block x, or a pixel block in the picture block x and including an upper left vertex of the picture block x; the lower left pixel sample of the picture block x is a lower left vertex of the picture block x, or a pixel block in the picture block x and including a lower left vertex of the picture block x; the upper right pixel sample of the picture block x is an upper right vertex of the picture block x, or a pixel block in the picture block x and including an upper right vertex of the picture block x; and the central pixel sample a1 of the picture block x is a central pixel of the picture block x, or a pixel block in the picture block x and including a central pixel of the picture block x.

203. Determine N candidate merged motion information unit sets based on the candidate motion information unit set corresponding to each pixel sample in the K1 pixel samples. Each motion information unit included in each candidate merged motion information unit set in the N candidate merged motion information unit sets is selected from at least a part of constraint-compliant motion information units in candidate motion information unit sets corresponding to different pixel samples in the K1 pixel samples. The N candidate merged motion information unit sets are different from each other, each candidate merged motion information unit set in the N candidate merged motion information unit sets includes K1 motion information units, and N is a positive integer.

It may be understood that, assuming that a candidate merged motion information unit set is determined based on the candidate motion information unit set S1 (assuming that three motion information units are included), the candidate motion information unit set S2 (assuming that two motion information units are included), and the candidate motion information unit set S3 (assuming that two motion information units are included), in theory, $3\times2\times2=12$ initial candidate merged motion information unit sets may be determined. However, to improve availability, for example, at least one condition in a first condition, a second condition, and a third condition may be used to screen out N candidate merged motion information unit sets from the 12 initial candidate merged motion information unit sets. Certainly, because quantities of motion information units included in the candidate motion information unit set S1, the candidate motion information unit set S2, and the candidate motion information unit set S3 are not limited to the foregoing examples, a quantity of initial candidate merged motion information unit sets is not necessarily 12.

Optionally, in some possible implementation manners of the present application, the N candidate merged motion information unit sets meet at least one of a first condition, a second condition, a third condition, a fourth condition, or a fifth condition.

The first condition includes that a motion mode of the picture block x indicated by a motion information unit in any candidate merged motion information unit set in the N candidate merged motion information unit sets is non-translational motion. For example, if all motion vectors whose prediction directions are a first prediction direction in a candidate merged motion information unit set are equal, it may be considered that the motion mode of the picture block x indicated by a motion information unit in the candidate merged motion information unit set is translational motion; otherwise, it may be considered that the motion mode of the picture block x indicated by a motion information unit in the candidate merged motion information unit set is non-translational motion, where the first prediction direction is forward or backward. For another example, if all motion vectors whose prediction directions are a forward prediction direction in a candidate merged motion information unit set are equal, and all motion vectors whose prediction directions are a backward prediction directions in the candidate merged motion information unit set are equal, it may be considered that the motion mode of the picture block x indicated by a motion information unit in the candidate merged motion information unit set is translational motion; otherwise, it may be considered that the motion mode of the picture block x indicated by a motion information unit in the candidate merged motion information unit set is non-translational motion.

The second condition may include that prediction directions of at least two motion information units in any candidate merged motion information unit set in the N candidate merged motion information unit sets are the same (if prediction directions of motion information units in a particular candidate merged motion information unit set are different from each other, it may be considered that the particular candidate merged motion information unit set is invalid, and the particular candidate merged motion information unit set may be abandoned). For example, when two motion information units both include a motion vector whose prediction direction is forward and a motion vector whose prediction direction is backward, it indicates that the prediction directions of the two motion information units are the same. For another example, when one motion information unit in two motion information units includes a motion vector whose prediction direction is forward and a motion vector whose prediction direction is backward, and the other motion information unit includes a motion vector whose prediction direction is forward but does not include a motion vector whose prediction direction is backward, or the other motion information unit includes a motion vector whose prediction direction is backward but does not include a motion vector whose prediction direction is forward, it may indicate that the prediction directions of the two motion information units are different. For another example, when one motion information unit in two motion information units includes a motion vector whose prediction direction is forward but does not include a motion vector whose prediction direction is backward, and the other motion information unit includes a motion vector whose prediction direction is backward but does not include a motion vector whose prediction direction is forward, it may indicate that the prediction directions of the two motion information units are different. For another example, when two motion information units both include a motion vector whose prediction direction is forward, but neither of the two motion information units includes a motion vector whose prediction direction is backward, it indicates that the prediction directions of the two motion information units are the same. For another example, when two motion information units both include a motion vector whose prediction direction is backward, but neither of the two motion information units includes a motion vector whose prediction direction is forward, it indicates that the prediction directions of the two motion information units are the same.

The third condition may include that reference frame indexes corresponding to at least two motion information units in any candidate merged motion information unit set in the N candidate merged motion information unit sets are the same (if reference frame indexes corresponding to motion information units in a particular candidate merged motion information unit set are different from each other, it may be considered that the particular candidate merged motion information unit set is invalid, and the particular candidate merged motion information unit set may be abandoned). For example, when two motion information units both include a motion vector whose prediction direction is forward and a motion vector whose prediction direction is backward, and reference frame indexes corresponding to the motion vectors whose prediction directions are forward in the two motion information units are the same, and reference frame indexes corresponding to the motion vectors whose prediction directions are backward in the two motion information units are the same, it may indicate that the reference frame indexes corresponding to the two motion information units are the same. For another example, when one motion information unit in two motion information units includes a motion vector whose prediction direction is forward and a motion vector whose prediction direction is backward, and the other motion information unit includes a motion vector whose prediction direction is forward but does not include a motion vector whose prediction direction is backward, or the other motion information unit includes a motion vector whose prediction direction is backward but does not include a motion vector whose prediction direction is forward, it indicates that the prediction directions of the two motion information units are different, and may indicate that reference frame indexes corresponding to the two motion information units are different. For another example, when one motion information unit in two motion information units includes a motion vector whose prediction direction is forward but does not include a motion vector whose prediction direction is backward, and the other motion information unit includes a motion vector whose prediction direction is backward but does not include a motion vector whose prediction direction is forward, it may indicate that reference frame indexes corresponding to the two motion information units are different. For another example, when one motion information unit in two motion information units includes a motion vector whose prediction direction is forward but does not include a motion vector whose prediction direction is backward, and the other motion information unit includes a motion vector whose prediction direction is forward but does not include a motion vector whose prediction direction is backward, and reference frame indexes corresponding to the motion vectors whose prediction directions are forward in the two motion information units are the same, it may indicate that reference frame indexes corresponding to the two motion information units are different. For another example, when one motion information unit in two motion information units includes a motion vector whose prediction direction is backward but does not include a motion vector whose prediction direction is forward, and the other motion information unit includes a motion vector whose prediction direction is backward but does not include a motion vector whose prediction direction is forward, and reference frame indexes corresponding to the motion vectors whose prediction directions are backward in the two motion information units are the same, it may indicate that reference frame indexes corresponding to the two motion information units are different.

The fourth condition includes that an absolute value of a difference between horizontal components of two (any two) motion information units in any candidate merged motion information unit set in the N candidate merged motion information unit sets is less than or equal to a horizontal component threshold. Specifically, for example, the fourth condition includes that an absolute value of a difference between horizontal components of two motion vectors whose prediction directions are the same in two (any two)

motion information units in any candidate merged motion information unit set in the N candidate merged motion information unit sets is less than or equal to the horizontal component threshold. If an absolute value of a difference between horizontal components of two motion information units in a particular candidate merged motion information unit set is greater than the horizontal component threshold, it may be considered that the particular candidate merged motion information unit set is invalid, and the particular candidate merged motion information unit set may be further abandoned. The horizontal component threshold may be equal to ⅓ of a width of the picture block x, ½ of a width of the picture block x, ⅔ of a width of the picture block x, ¾ of a width of the picture block x, or another value.

The fifth condition includes that an absolute value of a difference between vertical components of two (any two) motion information units in any candidate merged motion information unit set in the N candidate merged motion information unit sets is less than or equal to a vertical component threshold. Specifically, for example, the fifth condition includes that an absolute value of a difference between vertical components of two motion vectors whose prediction directions are the same in two (any two) motion information units in any candidate merged motion information unit set in the N candidate merged motion information unit sets is less than or equal to the vertical component threshold. The vertical component threshold may be equal to ⅓ of a height of the picture block x, ½ of a height of the picture block x, ⅔ of a height of the picture block x, ¾ of a height of the picture block x, or another value.

Certainly, the N candidate merged motion information unit sets, for example, may further meet other conditions that are not illustrated.

It may be understood that, by introducing at least one of the first condition, the second condition, the third condition, the fourth condition, or the fifth condition, screening is performed on the initial candidate merged motion information unit sets, and the N candidate merged motion information unit sets are screened out from the initial candidate merged motion information unit sets. This helps terminate participation of some possible invalid candidate merged motion information unit sets in subsequent computation beforehand, and further helps reduce computational complexity of coding and decoding.

In a specific implementation process, for example, at least one of the first condition, the second condition, or the third condition may be first used to perform screening on the initial candidate merged motion information unit sets, and N01 candidate merged motion information unit sets are screened out from the initial candidate merged motion information unit sets, then scaling processing is performed on the N01 candidate merged motion information unit sets, and then at least one of the fourth condition or the fifth condition is used to screen out the N candidate merged motion information unit sets from the N01 candidate merged motion information unit sets. Certainly, screening may be performed on the initial candidate merged motion information unit sets by directly using at least one of the first condition, the second condition, or the third condition, without making reference to the fourth condition and the fifth condition, and the N candidate merged motion information unit sets are screened out from the initial candidate merged motion information unit sets.

It may be understood that, a motion vector in video coding or decoding reflects an offset of an object in one direction (a prediction direction) relative to a same time (the same time corresponds to a same reference frame). Therefore, when motion information units of different pixel samples correspond to different prediction directions and/or correspond to different reference frame indexes, a motion offset of each pixel or pixel block of the picture block x relative to a reference frame cannot be directly obtained. However, when the pixel samples correspond to a same prediction direction and correspond to a same reference frame index, a motion vector of each pixel or pixel block in the picture block may be obtained by using a combination of the merged motion vectors.

Therefore, when motion information units of different pixel samples in a candidate merged motion information unit set correspond to different prediction directions and/or correspond to different reference frame indexes, scaling processing may be performed on the candidate merged motion information unit set. The scaling processing performed on the candidate merged motion information unit set may relate to modification, addition, and/or deletion or the like of a motion vector in one or more motion information unit sets in the candidate merged motion information unit set.

For example, when motion vectors whose prediction directions are a first prediction direction in a candidate merged motion information unit set i (such as a merged motion information unit set i) correspond to different reference frame indexes, scaling processing may be performed on the candidate merged motion information unit set, so that the motion vectors whose prediction directions are the first prediction direction in the candidate merged motion information unit set are scaled down to a same reference frame, where the first prediction direction is forward or backward.

For another example, when motion vectors whose prediction directions are forward in a candidate merged motion information unit set i (such as the merged motion information unit set i) correspond to different reference frame indexes and motion vectors whose prediction directions are backward in the candidate merged motion information unit set correspond to different reference frame indexes, scaling processing is performed on the candidate merged motion information unit set, so that the motion vectors whose prediction directions are forward in the merged motion information unit set i are scaled down to a same reference frame and that the motion vectors whose prediction directions are backward in the merged motion information unit set i are scaled down to a same reference frame.

If a prediction direction of a motion information unit is bidirectional, it indicates that the motion information unit includes a motion vector whose prediction direction is forward and a motion vector whose prediction direction is backward. If a prediction direction of a motion information unit is forward, it indicates that the motion information unit includes a motion vector whose prediction direction is forward but does not include a motion vector whose prediction direction is backward. If a prediction direction of a motion information unit is backward, it indicates that the motion information unit includes a motion vector whose prediction direction is backward but does not include a motion vector whose prediction direction is forward.

When motion information units of different pixel samples in a candidate merged motion information unit set correspond to different prediction directions and/or correspond to different reference frame indexes, the different prediction directions and/or different reference frame indexes corresponding to the motion information units in the corresponding candidate merged motion information unit set may be further adjusted.

A prediction direction may be adjusted in the following manner. For example, if all motion information units in a candidate merged motion information unit set z in the N candidate merged motion information unit sets correspond to a same prediction direction, the prediction direction of each motion information unit in the candidate merged motion information unit set z may remain unchanged. In addition, if prediction directions of two motion information units in the candidate merged motion information unit set z are the same, prediction directions of remaining motion information units in the candidate merged motion information unit set z may be set to be the same as the prediction directions of the two motion information units.

Specifically, for example, if prediction directions of two motion information units in the candidate merged motion information unit set z are a first prediction direction (the first prediction direction is forward or backward), and prediction directions of remaining motion information units in the candidate merged motion information unit set z are a second prediction direction (the second prediction direction is different from the first prediction direction), the prediction directions of the remaining motion information units in the candidate merged motion information unit set z are adjusted to the first prediction direction. That is, prediction directions of all motion information units in the candidate merged motion information unit set z are all the first prediction direction.

For another example, if prediction directions of two motion information units in the candidate merged motion information unit set z are bidirectional, but prediction directions of remaining motion information units in the candidate merged motion information unit set z are forward, a motion vector whose prediction direction is backward is added to the remaining motion information units in the candidate merged motion information unit set z (a value of the added motion vector whose prediction direction is backward is inverse to a value of an original motion vector whose prediction direction is forward in a corresponding motion information information unit set z are also changed to bidirectional, that is, prediction directions of all motion information units in the candidate merged motion information unit set z are all bidirectional.

For another example, if prediction directions of two motion information units in the candidate merged motion information unit set z are bidirectional, but prediction directions of remaining motion information units in the candidate merged motion information unit set z are backward, a motion vector whose prediction direction is forward is added to the remaining motion information units in the candidate merged motion information unit set z (a value of the added motion vector whose prediction direction is forward is inverse to a value of an original motion vector whose prediction direction is backward in a corresponding motion information unit, and this is equivalent to performing scaling processing according to 1:−1). In this way, the prediction directions of the remaining motion information units in the candidate merged motion information unit set z are also changed to bidirectional, that is, prediction directions of all motion information units in the candidate merged motion information unit set z are all bidirectional.

For another example, if prediction directions of two motion information units in the candidate merged motion information unit set z are forward, but prediction directions of remaining motion information units in the candidate merged motion information unit set z are bidirectional, a motion vector whose prediction direction is backward is deleted from the remaining motion information units in the candidate merged motion information unit set z. In this way, the prediction directions of the remaining motion information units in the candidate merged motion information unit set z are also changed to forward. That is, prediction directions of all motion information units in the candidate merged motion information unit set z are all forward.

For another example, if prediction directions of two motion information units in the candidate merged motion information unit set z are backward, but prediction directions of remaining motion information units in the candidate merged motion information unit set z are bidirectional, a motion vector whose prediction direction is forward is deleted from the remaining motion information units in the candidate merged motion information unit set z. In this way, the prediction directions of the remaining motion information units in the candidate merged motion information unit set z are also changed to backward. That is, prediction directions of all motion information units in the candidate merged motion information unit set z are all backward.

A reference frame index may be adjusted in the following manner. Specifically, if all motion information units in the candidate merged motion information unit set z in the N candidate merged motion information unit sets correspond to a same reference frame index, the reference frame index corresponding to each motion information unit in the candidate merged motion information unit set z remains unchanged. If reference frame indexes corresponding to two motion information units in the candidate merged motion information unit set z are the same, but reference frame indexes corresponding to remaining motion information units are different, the reference frame indexes corresponding to the remaining motion information units in the candidate merged motion information unit set z may be adjusted to be the same as the reference frame indexes corresponding to the two motion information units, but scaling processing is performed on the candidate merged motion information unit set, so that motion vectors whose prediction directions are forward in the candidate merged motion information unit set z are scaled down to a same reference frame and/or that motion vectors whose prediction directions are backward in the candidate merged motion information unit set z are scaled down to a same reference frame.

Optionally, in some possible implementation manners of the present application, a motion vector $MV_d$ in the candidate merged motion information unit set z may be scaled down to a target reference frame by using the following method: assuming that a play sequence number of a current video frame (for example, the video frame to which the picture block x belongs) is CurPoc, where a play sequence number of the target reference frame is DesPoc and a play sequence number of an original reference frame of the motion vector $MV_d$ is SrcPoc, the motion vector $MV_d$ is scaled down to the target reference frame, and a motion vector $MV_s$ is obtained.

Specifically, $MV_s$ may be obtained through computation according to the following formula:

$$MV_S = \text{sign}(ScaleFactor \times MV_d) \times \text{abs}(ScaleFactor \times MV_d)$$

$$\text{where, } ScaleFactor = \frac{CurPoc - DesPoc}{CurPoc - SrcPoc}.$$

The candidate merged motion information unit set z may be any candidate merged motion information unit set in the N candidate merged motion information unit sets, that is, scaling processing may be performed on motion vectors in each candidate merged motion information unit set in the N candidate merged motion information unit sets in the illustrated manner.

204. Determine, from the N candidate merged motion information unit sets, a merged motion information unit set i including K1 motion information units.

Optionally, in some possible implementation manners of the present application, when the picture prediction method is applied to a video decoding process, the determining, from the N candidate merged motion information unit sets, a merged motion information unit set i including K1 motion information units, may include: determining, from the N candidate merged motion information unit sets, based on an identifier that is of the merged motion information unit set i and is obtained from a video bit stream, the merged motion information unit set i including the K1 motion information units.

Optionally, in some possible implementation manners of the present application, when the picture prediction method is applied to a video coding process, the method may further include: writing an identifier of the merged motion information unit set i into a video bit stream.

Optionally, in some possible implementation manners of the present application, when the picture prediction method is applied to a video decoding process, the determining, from the N candidate merged motion information unit sets, a merged motion information unit set i including K1 motion information units, may include: determining, from the N candidate merged motion information unit sets, according to distortion or a rate distortion cost, the merged motion information unit set i including the K1 motion information units.

Optionally, a rate distortion cost corresponding to the merged motion information unit set i is lower than or equal to a rate distortion cost corresponding to any merged motion information unit set in the N candidate merged motion information unit sets except the merged motion information unit set i.

Optionally, distortion corresponding to the merged motion information unit set i is less than or equal to distortion corresponding to any merged motion information unit set in the N candidate merged motion information unit sets except the merged motion information unit set i.

A rate distortion cost corresponding to a particular candidate merged motion information unit set in the N candidate merged motion information unit sets (for example, the merged motion information unit set i in the N candidate merged motion information unit sets) may be, for example, a rate distortion cost corresponding to a predicted pixel value of a picture block obtained by predicting the pixel value of the picture block (for example, the picture block x) by using the particular candidate merged motion information unit set (for example, the merged motion information unit set i).

Distortion corresponding to a particular candidate merged motion information unit set in the N candidate merged motion information unit sets (for example, the merged motion information unit set i in the N candidate merged motion information unit sets) may be, for example, distortion between an original pixel value of a picture block (for example, the picture block x) and a predicted pixel value of the picture block obtained by predicting the pixel value of the picture block by using the particular candidate merged motion information unit set (for example, the merged motion information unit set i) (namely, the distortion between the original pixel value and the predicted pixel value of the picture block).

In some possible implementation manners of the present application, distortion between an original pixel value of a picture block (for example, the picture block x) and a predicted pixel value of the picture block obtained by predicting the pixel value of the picture block by using the particular candidate merged motion information unit set (for example, the merged motion information unit set i) may be specifically, for example, a sum of square differences or a sum of absolute differences or a sum of differences between the original pixel value of the picture block (for example, the picture block x) and the predicted pixel value of the picture block obtained by predicting the pixel value of the picture block by using the particular candidate merged motion information unit set (for example, the merged motion information unit set i), or another distortion parameter that can measure the distortion.

Further, to further reduce computational complexity, when N is greater than n1, n1 candidate merged motion information unit sets may be screened out from the N candidate merged motion information unit sets, and the merged motion information unit set i including the K1 motion information units is determined from the n1 candidate merged motion information unit sets based on the distortion or the rate distortion cost. D(V) corresponding to any candidate merged motion information unit set in the n1 candidate merged motion information unit sets is less than or equal to D(V) corresponding to any candidate merged motion information unit set in the N candidate merged motion information unit sets except the n1 candidate merged motion information unit sets, where n1 is, for example, equal to 3, 4, 5, 6, or another value.

Further, the n1 candidate merged motion information unit sets or identifiers of the n1 candidate merged motion information unit sets are added to a candidate merged motion information unit set list. If N is less than or equal to n1, the N candidate merged motion information unit sets or identifiers of the N candidate merged motion information unit sets may be added to the candidate merged motion information unit set list. Candidate merged motion information unit sets in the candidate merged motion information unit set list may be arranged in ascending order or descending order, for example, according to a value of D(V).

Assuming that a prediction direction of each motion information unit in a particular candidate merged motion information unit set is unidirectional, a Euclidean distance parameter D(V) of the particular candidate merged motion information unit set may be computed, for example, in the following manner: $D(V)=(|\vec{v}_1-\vec{v}_0|+|\vec{v}_2-\vec{v}_0|)*2$, where $\vec{v}_1$, $\vec{v}_0$, and $\vec{v}_2$ are three motion vectors whose prediction directions are the same in the particular candidate merged motion information unit set. It may be understood that, in the foregoing example, a candidate merged motion information unit set including three motion information units is used as an example, and cases in which a candidate merged motion information unit set includes any other quantity of motion information units may be deduced in the same way.

Assuming that a prediction direction of each motion information unit in a particular candidate merged motion information unit set is bidirectional, a Euclidean distance parameter D(V) of the particular candidate merged motion information unit set may be computed, for example, in the following manner:

$$D(V) = \left|\vec{v}_1^0 - \vec{v}_0^0\right| + \left|\vec{v}_2^0 - \vec{v}_0^0\right| + \left|\vec{v}_1^1 - \vec{v}_0^1\right| + \left|\vec{v}_2^1 - \vec{v}_0^1\right|,$$

where $$\vec{v_1^0}, \vec{v_0^0}, \text{ and } \vec{v_2^0}$$

are three motion vectors whose prediction directions are forward in the particular candidate merged motion information unit set, and $$\vec{v_1^1}, \vec{v_0^1}, \text{ and } \vec{v_2^1}$$

are three motion vectors whose prediction directions are backward in the particular candidate merged motion information unit set. It may be understood that, in the foregoing example, a candidate merged motion information unit set including three motion information units is used as an example, and cases in which a candidate merged motion information unit set includes any other quantity of motion information units may be deduced in the same way.

205. Perform motion vector prediction on the picture block x by using a non-translational motion model and the merged motion information unit set i.

It is assumed that a size of the picture block x is $S_1 \times S_2$, and that $S_1$ is equal or unequal to $S_2$.

It is assumed that k1 is equal to 3, and that coordinates of the three pixel samples are (0,0) ($S_1$,0), and (0,$S_2$) Herein for example, coordinates of a pixel in an upper left corner of a pixel sample participate in computation. Referring to FIG. 2-*e*, FIG. 2-*e* shows coordinates of four vertexes of the picture block x.

It is assumed that motion vectors of the three pixel samples are ($vx_0$, $vy_0$) ($vx_1$, $vy_1$) and ($vx_2$, $vy_2$).

The coordinates and motion vectors of the three pixel samples are substituted into an affine transformation formula (1), and the motion vector of each pixel in the picture block x may be computed.

Referring to FIG. 2-*f* and FIG. 2-*g*, FIG. 2-*f* shows an affine transformation of a pixel whose coordinates are (x, y), and FIG. 2-*g* shows an affine transformation manner of three known pixels whose coordinates are (0,0), ($S_1$,0) and (0, $S_2$).

A motion vector of the pixel whose coordinates are (x, y) may be computed based on the following formula:

$$\begin{cases} vx = \dfrac{vx_1 - vx_0}{S_1}x + \dfrac{vx_2 - vx_0}{S_2}y + vx_0 \\ vy = \dfrac{vy_1 - vy_0}{S_1}x + \dfrac{vy_2 - vy_0}{S_2}y + vy_0 \end{cases} \quad \text{formula (1)}$$

It should be noted that, this embodiment is mainly described by using an example in which an affine motion model is used as a non-translational motion model. In mechanisms in which the motion vector of each pixel of the current picture block is computed based on other non-translational motion models and motion vectors of the K pixel samples, although used formulas may vary, principles are similar, and the mechanisms are not illustrated one by one herein.

206. Predict a pixel value of the picture block x based on the computed motion vector of each pixel of the picture block x.

Further, in video coding, a prediction residual of the picture block x may be obtained by using an original pixel value of the picture block x and a predicted pixel value of the picture block x that is obtained by predicting the pixel value, and the prediction residual of the picture block x may be written into a video bit stream.

The motion vector of each pixel in the picture block x is obtained through computation according to the non-translational motion model such as the affine motion model. After the motion vector of each pixel is obtained, for a luminance component, if precision of horizontal and vertical components of the motion vector is ¼, a predicated value of a luminance component of each pixel may be obtained based on the motion vector by directly using an HEVC interpolation filter. If the precision is higher than ¼, a ¼ precision luminance component of the picture block x is obtained based on the motion vector by using the HEVC interpolation filter, and then bilinear interpolation is performed on the ¼ precision luminance component to obtain a predicated value of the luminance component of the pixel. Likewise, for a chrominance component, if precision of the motion vector is higher than ⅛, bilinear interpolation is performed. Interpolation of the luminance component is shown in FIG. 2-*h*, where a, b, c, and d are ¼ precision pixels, and may be obtained by using the HEVC interpolation filter. After a horizontal motion component x and a vertical motion component y are obtained according to the motion vector of each pixel, bilinear interpolation may be performed, where S is precision of the bilinear interpolation.

If a prediction direction of a motion information unit in the merged motion information unit set i is bidirectional, a forward predicated value of the picture block x is obtained in a forward reference frame and a backward predicated value of the picture block x is obtained in a backward reference frame according to the foregoing method, and then weighted averaging is performed on the forward predicated value of the picture block x and the backward predicated value of the picture block x to obtain a predicated pixel value of the picture block x.

For effectively predicting a subsequent picture block, and improving storage efficiency of a motion vector, when the picture block x is coded in the foregoing manner, the current picture block x may be stored in a minimum motion vector storage unit according to the following method (assuming that the minimum motion vector storage unit is to store motion vectors of a 4×4 picture block): first storing motion vectors $\vec{v_0}$, $\vec{v_1}$, and $\vec{v_2}$ of the 4×4 picture block at three pixel samples of a current prediction unit according to FIG. 2-*i*; and then filling $\vec{v_0}$ in an upper left corner into other minimum motion vector storage units.

Therefore, after the merged motion information unit set i is determined, a motion vector of a lower right pixel sample of the picture block x and a motion vector of the central pixel sample of the picture block x may be computed by using the following formula:

$$\begin{cases} \vec{v_3} = \vec{v_1} + \vec{v_2} - \vec{v_0} \\ \vec{v_c} = (\vec{v_1} + \vec{v_2})/2 \end{cases}$$

$\vec{v_3}$ indicates the stored motion vector of the lower right pixel sample of the picture block x, and $\vec{v_c}$ indicates the stored motion vector of the central pixel sample of the picture block x. As shown in FIG. 2-*i*, motion vectors of all pixel samples in the picture block x except vertex pixel samples may be stored as $\vec{v_c}$.

It can be seen that, in the technical solution of this embodiment, a pixel value of the picture block x is predicted by using a non-translational motion model and a merged motion information unit set i, where the merged motion information unit set i is selected from N candidate merged motion information unit sets meeting a condition, and each motion information unit in the merged motion information unit set i is selected from at least a part of motion information units in candidate motion information unit sets corresponding to different pixel samples in the K1 pixel samples. Because a selection range of the merged motion information unit set i is relatively small, a mechanism used in a conventional technology for screening out motion information units of K1 pixel samples only by performing a huge amount of computation in all possible candidate motion information unit sets corresponding to the K1 pixel samples is abandoned. This helps improve coding efficiency, also helps reduce computational complexity of picture prediction performed based on the non-translational motion model, further makes it possible to introduce the non-translational motion model into a video coding standard, and because the non-translational motion model is introduced, helps describe motion of an object more accurately, and therefore helps improve prediction accuracy.

Referring to FIG. 3, FIG. 3 is a schematic flowchart of a video coding method according to another embodiment of the present application. As shown in FIG. 3, a video coding method provided by another embodiment of the present application may include the following steps:

301. A video coding apparatus determines K1 pixel samples in a picture block x.

In this embodiment, for example, the K1 pixel samples include an upper left pixel sample, an upper right pixel sample, and a lower left pixel sample of the picture block x.

The upper left pixel sample of the picture block x is an upper left vertex of the picture block x, or a pixel block in the picture block x and including an upper left vertex of the picture block x. The lower left pixel sample of the picture block x is a lower left vertex of the picture block x, or a pixel block in the picture block x and including a lower left vertex of the picture block x. The upper right pixel sample of the picture block x is an upper right vertex of the picture block x, or a pixel block in the picture block x and including an upper right vertex of the picture block x.

302. The video coding apparatus determines a candidate motion information unit set corresponding to each pixel sample in the K1 pixel samples.

The candidate motion information unit set corresponding to each pixel sample includes at least one candidate motion information unit.

The motion information unit mentioned in each embodiment of the present application may include a motion vector whose prediction direction is forward and/or a motion vector whose prediction direction is backward. That is, one motion information unit may include one motion vector or may include two motion vectors with different prediction directions.

K1 is an integer that is greater than 1. For example, K1 may be equal to 2, 3, 4, or another value.

That two motion information units are different may mean that motion vectors included in the two motion information units are different, or that prediction directions of motion vectors included in the two motion information units are different, or that reference frame indexes corresponding to motion vectors included in the two motion information units are different. That two motion information units are the same may mean that motion vectors included in the two motion information units are the same, and that prediction directions of the motion vectors included in the two motion information units are the same, and that reference frame indexes corresponding to the motion vectors included in the two motion information units are the same.

The candidate motion information unit sets corresponding to the K1 pixel samples may be determined in various manners. For example, the candidate motion information unit set corresponding to each pixel sample in the K1 pixel samples may be determined in a manner illustrated in step 202.

303. The video coding apparatus determines N candidate merged motion information unit sets based on the candidate motion information unit set corresponding to each pixel sample in the K1 pixel samples. Each motion information unit included in each candidate merged motion information unit set in the N candidate merged motion information unit sets is selected from at least a part of constraint-compliant motion information units in candidate motion information unit sets corresponding to different pixel samples in the K1 pixel samples. The N candidate merged motion information unit sets are different from each other, each candidate merged motion information unit set in the N candidate merged motion information unit sets includes K1 motion information units, and N is a positive integer.

It may be understood that, assuming that a candidate merged motion information unit set is determined based on a candidate motion information unit set S1 (assuming that three motion information units are included), a candidate motion information unit set S2 (assuming that two motion information units are included), and a candidate motion information unit set S3 (assuming that two motion information units are included), in theory, $3\times2\times2=12$ initial candidate merged motion information unit sets may be determined. However, to improve availability, for example, at least one condition in a first condition, a second condition, and a third condition may be used to screen out N candidate merged motion information unit sets from the 12 initial candidate merged motion information unit sets. Certainly, because quantities of motion information units included in the candidate motion information unit set S1, the candidate motion information unit set S2, and the candidate motion information unit set S3 are not limited to the foregoing examples, a quantity of initial candidate merged motion information unit sets is not necessarily 12.

Optionally, in some possible implementation manners of the present application, the N candidate merged motion information unit sets meet at least one of a first condition, a second condition, a third condition, a fourth condition, or a fifth condition.

The first condition includes that a motion mode of the picture block x indicated by a motion information unit in any candidate merged motion information unit set in the N candidate merged motion information unit sets is non-translational motion.

The second condition may include that prediction directions of at least two motion information units in any candidate merged motion information unit set in the N candidate merged motion information unit sets are the same (if prediction directions of motion information units in a particular candidate merged motion information unit set are different from each other, it may be considered that the particular candidate merged motion information unit set is invalid, and the particular candidate merged motion information unit set may be abandoned).

The third condition may include that reference frame indexes corresponding to at least two motion information units in any candidate merged motion information unit set in the N candidate merged motion information unit sets are the same (if reference frame indexes corresponding to motion information units in a particular candidate merged motion information unit set are different from each other, it may be considered that the particular candidate merged motion information unit set is invalid, and the particular candidate merged motion information unit set may be abandoned).

The fourth condition includes that an absolute value of a difference between horizontal components of two (any two) motion information units in any candidate merged motion information unit set in the N candidate merged motion information unit sets is less than or equal to a horizontal component threshold. The horizontal component threshold may be equal to ⅓ of a width of the picture block x, ½ of a width of the picture block x, ⅔ of a width of the picture block x, ¾ of a width of the picture block x, or another value.

The fifth condition includes that an absolute value of a difference between vertical components of two (any two) motion information units in any candidate merged motion information unit set in the N candidate merged motion information unit sets is less than or equal to a vertical component threshold. The vertical component threshold may be equal to ⅓ of a height of the picture block x, ½ of a height of the picture block x, ⅔ of a height of the picture block x, ¾ of a height of the picture block x, or another value.

Certainly, the N candidate merged motion information unit sets, for example, may further meet other conditions that are not illustrated.

It may be understood that, by introducing at least one of the first condition, the second condition, the third condition, the fourth condition, or the fifth condition, screening is performed on the initial candidate merged motion information unit sets, and the N candidate merged motion information unit sets are screened out from the initial candidate merged motion information unit sets. This helps terminate participation of some possible invalid candidate merged motion information unit sets in subsequent computation beforehand, and further helps reduce computational complexity of coding and decoding.

In a specific implementation process, for example, at least one of the first condition, the second condition, or the third condition may be first used to perform screening on the initial candidate merged motion information unit sets, and N01 candidate merged motion information unit sets are screened out from the initial candidate merged motion information unit sets, then scaling processing is performed on the N01 candidate merged motion information unit sets, and then at least one of the fourth condition or the fifth condition is used to screen out the N candidate merged motion information unit sets from the N01 candidate merged motion information unit sets. Certainly, screening may be performed on the initial candidate merged motion information unit sets by directly using at least one of the first condition, the second condition, or the third condition, without making reference to the fourth condition and the fifth condition, and the N candidate merged motion information unit sets are screened out from the initial candidate merged motion information unit sets.

It may be understood that, a motion vector in video coding or decoding reflects an offset of an object in one direction (a prediction direction) relative to a same time (the same time corresponds to a same reference frame). Therefore, when motion information units of different pixel samples correspond to different prediction directions and/or correspond to different reference frame indexes, a motion offset of each pixel or pixel block of the picture block x relative to a reference frame cannot be directly obtained. However, when the pixel samples correspond to a same prediction direction and correspond to a same reference frame index, a motion vector of each pixel or pixel block in the picture block may be obtained by using a combination of the merged motion vectors.

Therefore, when motion information units of different pixel samples in a candidate merged motion information unit set correspond to different prediction directions and/or correspond to different reference frame indexes, scaling processing may be performed on the candidate merged motion information unit set. The scaling processing performed on the candidate merged motion information unit set may relate to modification, addition, and/or deletion or the like of a motion vector in one or more motion information unit sets in the candidate merged motion information unit set.

For example, when motion vectors whose prediction directions are a first prediction direction in a candidate merged motion information unit set i (such as a merged motion information unit set i) correspond to different reference frame indexes, scaling processing may be performed on the candidate merged motion information unit set, so that the motion vectors whose prediction directions are the first prediction direction in the candidate merged motion information unit set are scaled down to a same reference frame, where the first prediction direction is forward or backward.

For another example, when motion vectors whose prediction directions are forward in a candidate merged motion information unit set i (such as the merged motion information unit set i) correspond to different reference frame indexes and motion vectors whose prediction directions are backward in the candidate merged motion information unit set correspond to different reference frame indexes, scaling processing is performed on the candidate merged motion information unit set, so that the motion vectors whose prediction directions are forward in the merged motion information unit set i are scaled down to a same reference frame and that the motion vectors whose prediction directions are backward in the merged motion information unit set i are scaled down to a same reference frame.

If a prediction direction of a motion information unit is bidirectional, it indicates that the motion information unit includes a motion vector whose prediction direction is forward and a motion vector whose prediction direction is backward. If a prediction direction of a motion information unit is forward, it indicates that the motion information unit includes a motion vector whose prediction direction is forward but does not include a motion vector whose prediction direction is backward. If a prediction direction of a motion information unit is backward, it indicates that the motion information unit includes a motion vector whose prediction direction is backward but does not include a motion vector whose prediction direction is forward.

When motion information units of different pixel samples in a candidate merged motion information unit set correspond to different prediction directions and/or correspond to different reference frame indexes, the different prediction directions and/or different reference frame indexes corresponding to the motion information units in the corresponding candidate merged motion information unit set may be further adjusted.

A prediction direction may be adjusted in the following manner. For example, if all motion information units in a candidate merged motion information unit set z in the N candidate merged motion information unit sets correspond to a same prediction direction, the prediction direction of each motion information unit in the candidate merged motion information unit set z may remain unchanged. In addition, if prediction directions of two motion information units in the candidate merged motion information unit set z are the same, prediction directions of remaining motion information units in the candidate merged motion information unit set z may be set to be the same as the prediction directions of the two motion information units.

Specifically, for example, if prediction directions of two motion information units in the candidate merged motion information unit set z are a first prediction direction (the first prediction direction is forward or backward), and prediction directions of remaining motion information units in the candidate merged motion information unit set z are a second prediction direction (the second prediction direction is different from the first prediction direction), the prediction directions of the remaining motion information units in the candidate merged motion information unit set z are adjusted to the first prediction direction. That is, prediction directions of all motion information units in the candidate merged motion information unit set z are all the first prediction direction.

For another example, if prediction directions of two motion information units in the candidate merged motion information unit set z are bidirectional, but prediction directions of remaining motion information units in the candidate merged motion information unit set z are forward, a motion vector whose prediction direction is backward is added to the remaining motion information units in the candidate merged motion information unit set z (a value of the added motion vector whose prediction direction is backward is inverse to a value of an original motion vector whose prediction direction is forward in a corresponding motion information unit, and this is equivalent to performing scaling processing according to 1:−1). In this way, the prediction directions of the remaining motion information units in the candidate merged motion information unit set z are also changed to bidirectional, that is, prediction directions of all motion information units in the candidate merged motion information unit set z are all bidirectional.

For another example, if prediction directions of two motion information units in the candidate merged motion information unit set z are bidirectional, but prediction directions of remaining motion information units in the candidate merged motion information unit set z are backward, a motion vector whose prediction direction is forward is added to the remaining motion information units in the candidate merged motion information unit set z (a value of the added motion vector whose prediction direction is forward is inverse to a value of an original motion vector whose prediction direction is backward in a corresponding motion information information unit set z are also changed to bidirectional, that is, prediction directions of all motion information units in the candidate merged motion information unit set z are all bidirectional.

For another example, if prediction directions of two motion information units in the candidate merged motion information unit set z are forward, but prediction directions of remaining motion information units in the candidate merged motion information unit set z are bidirectional, a motion vector whose prediction direction is backward is deleted from the remaining motion information units in the candidate merged motion information unit set z. In this way, the prediction directions of the remaining motion information units in the candidate merged motion information unit set z are also changed to forward. That is, prediction directions of all motion information units in the candidate merged motion information unit set z are all forward.

For another example, if prediction directions of two motion information units in the candidate merged motion information unit set z are backward, but prediction directions of remaining motion information units in the candidate merged motion information unit set z are bidirectional, a motion vector whose prediction direction is forward is deleted from the remaining motion information units in the candidate merged motion information unit set z. In this way, the prediction directions of the remaining motion information units in the candidate merged motion information unit set z are also changed to backward. That is, prediction directions of all motion information units in the candidate merged motion information unit set z are all backward.

A reference frame index may be adjusted in the following manner. Specifically, if all motion information units in the candidate merged motion information unit set z in the N candidate merged motion information unit sets correspond to a same reference frame index, the reference frame index corresponding to each motion information unit in the candidate merged motion information unit set z remains unchanged. If reference frame indexes corresponding to two motion information units in the candidate merged motion information unit set z are the same, but reference frame indexes corresponding to remaining motion information units are different, the reference frame indexes corresponding to the remaining motion information units in the candidate merged motion information unit set z may be adjusted to be the same as the reference frame indexes corresponding to the two motion information units, but scaling processing is performed on the candidate merged motion information unit set, so that motion vectors whose prediction directions are forward in the candidate merged motion information unit set z are scaled down to a same reference frame and/or that motion vectors whose prediction directions are backward in the candidate merged motion information unit set z are scaled down to a same reference frame.

The candidate merged motion information unit set z may be any candidate merged motion information unit set in the N candidate merged motion information unit sets, that is, scaling processing may be performed on motion vectors in each candidate merged motion information unit set in the N candidate merged motion information unit sets in the illustrated manner.

304. The video coding apparatus determines, from the N candidate merged motion information unit sets, according to distortion or a rate distortion cost, a merged motion information unit set i including the K1 motion information units.

Optionally, a rate distortion cost corresponding to the merged motion information unit set i is lower than or equal to a rate distortion cost corresponding to any merged motion information unit set in the N candidate merged motion information unit sets except the merged motion information unit set i.

Optionally, distortion corresponding to the merged motion information unit set i is less than or equal to distortion corresponding to any merged motion information unit set in the N candidate merged motion information unit sets except the merged motion information unit set i.

A rate distortion cost corresponding to a particular candidate merged motion information unit set in the N candidate merged motion information unit sets (for example, the merged motion information unit set i in the N candidate merged motion information unit sets) may be, for example, a rate distortion cost corresponding to a predicted pixel value of a picture block obtained by predicting the pixel value of the picture block (for example, the picture block x) by using the particular candidate merged motion information unit set (for example, the merged motion information unit set i).

Distortion corresponding to a particular candidate merged motion information unit set in the N candidate merged motion information unit sets (for example, the merged motion information unit set i in the N candidate merged motion information unit sets) may be, for example, distortion between an original pixel value of a picture block (for example, the picture block x) and a predicted pixel value of the picture block obtained by predicting the pixel value of the picture block by using the particular candidate merged motion information unit set (for example, the merged motion information unit set i) (namely, the distortion between the original pixel value and the predicted pixel value of the picture block).

In some possible implementation manners of the present application, distortion between an original pixel value of a picture block (for example, the picture block x) and a predicted pixel value of the picture block obtained by predicting the pixel value of the picture block by using the particular candidate merged motion information unit set (for example, the merged motion information unit set i) may be specifically, for example, a sum of square differences or a sum of absolute differences or a sum of differences between the original pixel value of the picture block (for example, the picture block x) and the predicted pixel value of the picture block obtained by predicting the pixel value of the picture block by using the particular candidate merged motion information unit set (for example, the merged motion information unit set i), or another distortion parameter that can measure the distortion.

Further, to further reduce computational complexity, when N is greater than n1, n1 candidate merged motion information unit sets may be screened out from the N candidate merged motion information unit sets, and the merged motion information unit set i including the K1 motion information units is determined from the n1 candidate merged motion information unit sets based on the distortion or the rate distortion cost. D(V) corresponding to any candidate merged motion information unit set in the n1 candidate merged motion information unit sets is less than or equal to D(V) corresponding to any candidate merged motion information unit set in the N candidate merged motion information unit sets except the n1 candidate merged motion information unit sets, where n1 is, for example, equal to 3, 4, 5, 6, or another value.

Further, the n1 candidate merged motion information unit sets or identifiers of the n1 candidate merged motion information unit sets are added to a candidate merged motion information unit set list. If N is less than or equal to n1, the N candidate merged motion information unit sets or identifiers of the N candidate merged motion information unit sets may be added to the candidate merged motion information unit set list. Candidate merged motion information unit sets in the candidate merged motion information unit set list may be arranged in ascending order or descending order, for example, according to a value of D(V).

Assuming that a prediction direction of each motion information unit in a particular candidate merged motion information unit set is unidirectional, a Euclidean distance parameter D(V) of the particular candidate merged motion information unit set may be computed, for example, in the following manner: $D(V)=(|\vec{v}_1-\vec{v}_0|+|\vec{v}_2-\vec{v}_0|)*_2$, where $\vec{v}_1$, $\vec{v}_0$, and $\vec{v}_2$ are three motion vectors whose prediction directions are the same in the particular candidate merged motion information unit set. It may be understood that, in the foregoing example, a candidate merged motion information unit set including three motion information units is used as an example, and cases in which a candidate merged motion information unit set includes any other quantity of motion information units may be deduced in the same way.

Assuming that a prediction direction of each motion information unit in a particular candidate merged motion information unit set is bidirectional, a Euclidean distance parameter D(V) of the particular candidate merged motion information unit set may be computed, for example, in the following manner:

$$D(V) = \left|\overrightarrow{v_1^0} - \overrightarrow{v_0^0}\right| + \left|\overrightarrow{v_2^0} - \overrightarrow{v_0^0}\right| + \left|\overrightarrow{v_1^1} - \overrightarrow{v_0^1}\right| + \left|\overrightarrow{v_2^1} - \overrightarrow{v_0^1}\right|,$$

where $$\overrightarrow{v_1^0}, \overrightarrow{v_0^0}, \text{ and } \overrightarrow{v_2^0}$$

are three motion vectors whose prediction directions are forward in the particular candidate merged motion information unit set, and $$\overrightarrow{v_1^1}, \overrightarrow{v_0^1}, \text{ and } \overrightarrow{v_2^1}$$

are three motion vectors whose prediction directions are backward in the particular candidate merged motion information unit set. It may be understood that, in the foregoing example, a candidate merged motion information unit set including three motion information units is used as an example, and cases in which a candidate merged motion information unit set includes any other quantity of motion information units may be deduced in the same way.

305. The video coding apparatus performs motion estimation processing on a motion vector in the merged motion information unit set i to obtain a motion-estimated merged motion information unit set i, and the video coding apparatus performs motion vector prediction on the picture block x by using a non-translational motion model and the motion-estimated merged motion information unit set i.

306. The video coding apparatus predicts a pixel value of the picture block x based on a computed motion vector of each pixel or each pixel block of the picture block x.

307. The video coding apparatus obtains a prediction residual of the picture block x by using an original pixel value of the picture block x and the predicted pixel value of the picture block x that is obtained by predicting the pixel value of the picture block x.

308. The video coding apparatus writes the prediction residual of the picture block x into a video bit stream.

Optionally, in some possible implementation manners of the present application, when the video coding method is applied to a video coding process, the method may further include: writing an identifier of the merged motion information unit set i into the video bit stream. For example, when N is greater than 1, the identifier of the merged motion information unit set i may be written into the video bit stream. When N is equal to 1, the merged motion information unit set i may be directly determined uniquely. Therefore, when N is equal to 1, even if an encoder does not write the identifier of the merged motion information unit set i into the video bit stream, a decoder can still determine the merged motion information unit set i.

If a prediction direction of a motion information unit in the merged motion information unit set i is bidirectional, a forward predicated value of the picture block x is obtained in a forward reference frame and a backward predicated value of the picture block x is obtained in a backward reference frame according to the foregoing method, and then weighted averaging is performed on the forward predicated value of the picture block x and the backward predicated value of the picture block x to obtain a predicated pixel value of the picture block x.

It can be seen that, in the video coding solution of this embodiment, a pixel value of the picture block x is predicted by using a non-translational motion model and a merged motion information unit set i, where the merged motion information unit set i is selected from N candidate merged motion information unit sets meeting a condition, and each motion information unit in the merged motion information unit set i is selected from at least a part of motion information units in candidate motion information unit sets corresponding to different pixel samples in the K1 pixel samples. Because a selection range of the merged motion information unit set i is relatively small, a mechanism used in a conventional technology for screening out motion information units of K1 pixel samples only by performing a huge amount of computation in all possible candidate motion information unit sets corresponding to the K1 pixel samples is abandoned. This helps improve coding efficiency, also helps reduce computational complexity of picture prediction performed based on the non-translational motion model, further makes it possible to introduce the non-translational motion model into a video coding standard, and because the non-translational motion model is introduced, helps describe motion of an object more accurately, and therefore helps improve prediction accuracy.

Figure 4:
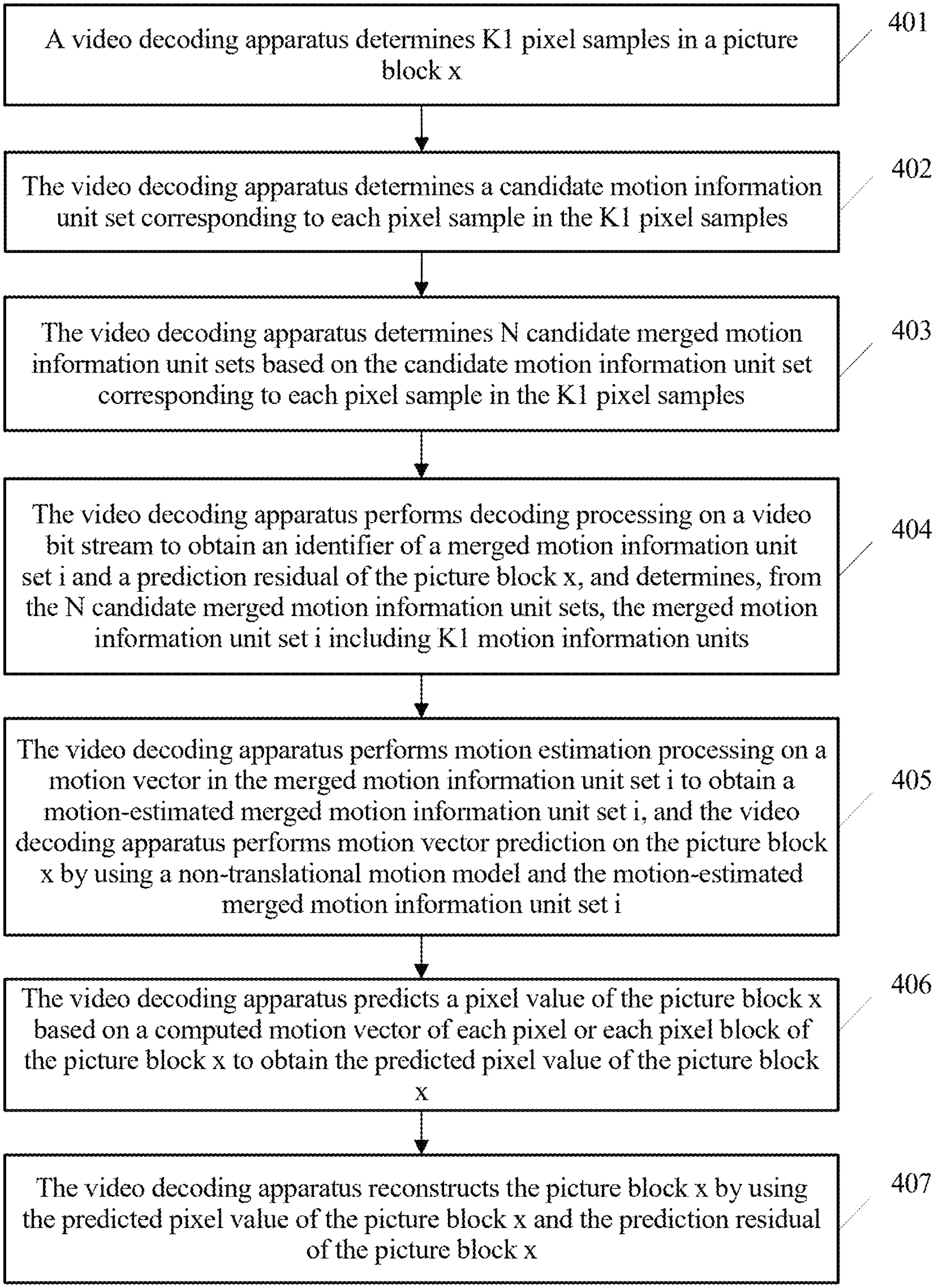
FIG. 4 is a schematic flowchart of another video decoding method according to an embodiment of the present application.

Referring to FIG. 4, FIG. 4 is a schematic flowchart of a video decoding method according to another embodiment of the present application. As shown in FIG. 4, a video decoding method provided by another embodiment of the present application may include the following steps:

401. A video decoding apparatus determines K1 pixel samples in a picture block x.

In this embodiment, for example, the K1 pixel samples include an upper left pixel sample, an upper right pixel sample, and a lower left pixel sample of the picture block x.

The upper left pixel sample of the picture block x is an upper left vertex of the picture block x, or a pixel block in the picture block x and including an upper left vertex of the picture block x. The lower left pixel sample of the picture block x is a lower left vertex of the picture block x, or a pixel block in the picture block x and including a lower left vertex of the picture block x. The upper right pixel sample of the picture block x is an upper right vertex of the picture block x, or a pixel block in the picture block x and including an upper right vertex of the picture block x.

If a pixel sample is a pixel block, a size of the pixel block is, for example, 2×2, 1×2, 4×2, 4×4, or another size.

402. The video decoding apparatus determines a candidate motion information unit set corresponding to each pixel sample in the K1 pixel samples.

The candidate motion information unit set corresponding to each pixel sample includes at least one candidate motion information unit.

The motion information unit mentioned in each embodiment of the present application may include a motion vector whose prediction direction is forward and/or a motion vector whose prediction direction is backward. That is, one motion information unit may include one motion vector or may include two motion vectors with different prediction directions.

If a prediction direction of a motion information unit is forward, it indicates that the motion information unit includes a motion vector whose prediction direction is forward but does not include a motion vector whose prediction direction is backward. If a prediction direction of a motion information unit is backward, it indicates that the motion information unit includes a motion vector whose prediction direction is backward but does not include a motion vector whose prediction direction is forward. If a prediction direction of a motion information unit is unidirectional, it indicates that the motion information unit includes a motion vector whose prediction direction is forward but does not include a motion vector whose prediction direction is backward, or it indicates that the motion information unit includes a motion vector whose prediction direction is backward but does not include a motion vector whose prediction direction is forward. If a prediction direction of a motion information unit is bidirectional, it indicates that the motion information unit includes a motion vector whose prediction direction is forward and a motion vector whose prediction direction is backward.

K1 is an integer that is greater than 1. For example, K1 may be equal to 2, 3, 4, or another value.

The candidate motion information unit sets corresponding to the K1 pixel samples may be determined in various manners. For example, the candidate motion information unit set corresponding to each pixel sample in the K1 pixel samples may be determined in a manner illustrated in step 202.

403. The video decoding apparatus determines N candidate merged motion information unit sets based on the candidate motion information unit set corresponding to each pixel sample in the K1 pixel samples. Each motion information unit included in each candidate merged motion information unit set in the N candidate merged motion information unit sets is selected from at least a part of constraint-compliant motion information units in candidate motion information unit sets corresponding to different pixel samples in the K1 pixel samples. The N candidate merged motion information unit sets are different from each other, each candidate merged motion information unit set in the N candidate merged motion information unit sets includes K1 motion information units, and N is a positive integer.

It may be understood that, assuming that a candidate merged motion information unit set is determined based on a candidate motion information unit set S1 (assuming that three motion information units are included), a candidate motion information unit set S2 (assuming that two motion information units are included), and a candidate motion information unit set S3 (assuming that two motion information units are included), in theory, 3×2×2=12 initial candidate merged motion information unit sets may be determined. However, to improve availability, for example, at least one condition in a first condition, a second condition, and a third condition may be used to screen out N candidate merged motion information unit sets from the 12 initial candidate merged motion information unit sets. Certainly, because quantities of motion information units included in the candidate motion information unit set S1, the candidate motion information unit set S2, and the candidate motion information unit set S3 are not limited to the foregoing examples, a quantity of initial candidate merged motion information unit sets is not necessarily 12.

Optionally, in some possible implementation manners of the present application, the N candidate merged motion information unit sets meet at least one of a first condition, a second condition, a third condition, a fourth condition, or a fifth condition.

The first condition includes that a motion mode of the picture block x indicated by a motion information unit in any candidate merged motion information unit set in the N candidate merged motion information unit sets is non-translational motion.

The second condition may include that prediction directions of at least two motion information units in any candidate merged motion information unit set in the N candidate merged motion information unit sets are the same (if prediction directions of motion information units in a particular candidate merged motion information unit set are different from each other, it may be considered that the particular candidate merged motion information unit set is invalid, and the particular candidate merged motion information unit set may be abandoned).

The third condition may include that reference frame indexes corresponding to at least two motion information units in any candidate merged motion information unit set in the N candidate merged motion information unit sets are the same (if reference frame indexes corresponding to motion information units in a particular candidate merged motion information unit set are different from each other, it may be considered that the particular candidate merged motion information unit set is invalid, and the particular candidate merged motion information unit set may be abandoned).

The fourth condition includes that an absolute value of a difference between horizontal components of two (any two) motion information units in any candidate merged motion information unit set in the N candidate merged motion information unit sets is less than or equal to a horizontal component threshold. The horizontal component threshold may be equal to ⅓ of a width of the picture block x, ½ of a width of the picture block x, ⅔ of a width of the picture block x, ¾ of a width of the picture block x, or another value.

The fifth condition includes that an absolute value of a difference between vertical components of two (any two) motion information units in any candidate merged motion information unit set in the N candidate merged motion information unit sets is less than or equal to a vertical component threshold. The vertical component threshold may be equal to ⅓ of a height of the picture block x, ½ of a height of the picture block x, ⅔ of a height of the picture block x, ¾ of a height of the picture block x, or another value.

Certainly, the N candidate merged motion information unit sets, for example, may further meet other conditions that are not illustrated.

It may be understood that, by introducing at least one of the first condition, the second condition, the third condition, the fourth condition, or the fifth condition, screening is performed on the initial candidate merged motion information unit sets, and the N candidate merged motion information unit sets are screened out from the initial candidate merged motion information unit sets. This helps terminate participation of some possible invalid candidate merged motion information unit sets in subsequent computation beforehand, and further helps reduce computational complexity of coding and decoding.

In a specific implementation process, for example, at least one of the first condition, the second condition, or the third condition may be first used to perform screening on the initial candidate merged motion information unit sets, and N01 candidate merged motion information unit sets are screened out from the initial candidate merged motion information unit sets, then scaling processing is performed on the N01 candidate merged motion information unit sets, and then at least one of the fourth condition or the fifth condition is used to screen out the N candidate merged motion information unit sets from the N01 candidate merged motion information unit sets. Certainly, screening may be performed on the initial candidate merged motion information unit sets by directly using at least one of the first condition, the second condition, or the third condition, without making reference to the fourth condition and the fifth condition, and the N candidate merged motion information unit sets are screened out from the initial candidate merged motion information unit sets.

It may be understood that, a motion vector in video coding or decoding reflects an offset of an object in one direction (a prediction direction) relative to a same time (the same time corresponds to a same reference frame). Therefore, when motion information units of different pixel samples correspond to different prediction directions and/or correspond to different reference frame indexes, a motion offset of each pixel or pixel block of the picture block x relative to a reference frame cannot be directly obtained. However, when the pixel samples correspond to a same prediction direction and correspond to a same reference frame index, a motion vector of each pixel or pixel block in the picture block may be obtained by using a combination of the merged motion vectors.

Therefore, when motion information units of different pixel samples in a candidate merged motion information unit set correspond to different prediction directions and/or correspond to different reference frame indexes, scaling processing may be performed on the candidate merged motion information unit set. The scaling processing performed on the candidate merged motion information unit set may relate to modification, addition, and/or deletion or the like of a motion vector in one or more motion information unit sets in the candidate merged motion information unit set.

For example, when motion vectors whose prediction directions are a first prediction direction in a candidate merged motion information unit set i (such as a merged motion information unit set i) correspond to different reference frame indexes, scaling processing may be performed on the candidate merged motion information unit set, so that the motion vectors whose prediction directions are the first prediction direction in the candidate merged motion information unit set are scaled down to a same reference frame, where the first prediction direction is forward or backward.

For another example, when motion vectors whose prediction directions are forward in a candidate merged motion information unit set i (such as the merged motion information unit set i) correspond to different reference frame indexes and motion vectors whose prediction directions are backward in the candidate merged motion information unit set correspond to different reference frame indexes, scaling processing is performed on the candidate merged motion information unit set, so that the motion vectors whose prediction directions are forward in the merged motion information unit set i are scaled down to a same reference frame and that the motion vectors whose prediction directions are backward in the merged motion information unit set i are scaled down to a same reference frame.

When motion information units of different pixel samples in a candidate merged motion information unit set correspond to different prediction directions and/or correspond to different reference frame indexes, the different prediction directions and/or different reference frame indexes corresponding to the motion information units in the corresponding candidate merged motion information unit set may be further adjusted.

A prediction direction may be adjusted in the following manner. For example, if all motion information units in a candidate merged motion information unit set z in the N candidate merged motion information unit sets correspond to a same prediction direction, the prediction direction of each motion information unit in the candidate merged motion information unit set z may remain unchanged. In addition, if prediction directions of two motion information units in the candidate merged motion information unit set z are the same, prediction directions of remaining motion information units in the candidate merged motion information unit set z may be set to be the same as the prediction directions of the two motion information units.

Specifically, for example, if prediction directions of two motion information units in the candidate merged motion information unit set z are a first prediction direction (the first prediction direction is forward or backward), and prediction directions of remaining motion information units in the candidate merged motion information unit set z are a second prediction direction (the second prediction direction is different from the first prediction direction), the prediction directions of the remaining motion information units in the candidate merged motion information unit set z are adjusted to the first prediction direction. That is, prediction directions of all motion information units in the candidate merged motion information unit set z are all the first prediction direction.

For another example, if prediction directions of two motion information units in the candidate merged motion information unit set z are bidirectional, but prediction directions of remaining motion information units in the candidate merged motion information unit set z are forward, a motion vector whose prediction direction is backward is added to the remaining motion information units in the candidate merged motion information unit set z (a value of the added motion vector whose prediction direction is backward is inverse to a value of an original motion vector whose prediction direction is forward in a corresponding motion information information unit set z are also changed to bidirectional, that is, prediction directions of all motion information units in the candidate merged motion information unit set z are all bidirectional.

For another example, if prediction directions of two motion information units in the candidate merged motion information unit set z are bidirectional, but prediction directions of remaining motion information units in the candidate merged motion information unit set z are backward, a motion vector whose prediction direction is forward is added to the remaining motion information units in the candidate merged motion information unit set z (a value of the added motion vector whose prediction direction is forward is inverse to a value of an original motion vector whose prediction direction is backward in a corresponding motion information unit, and this is equivalent to performing scaling processing according to 1:−1). In this way, the prediction directions of the remaining motion information units in the candidate merged motion information unit set z are also changed to bidirectional, that is, prediction directions of all motion information units in the candidate merged motion information unit set z are all bidirectional.

For another example, if prediction directions of two motion information units in the candidate merged motion information unit set z are forward, but prediction directions of remaining motion information units in the candidate merged motion information unit set z are bidirectional, a motion vector whose prediction direction is backward is deleted from the remaining motion information units in the candidate merged motion information unit set z. In this way, the prediction directions of the remaining motion information units in the candidate merged motion information unit set z are also changed to forward. That is, prediction directions of all motion information units in the candidate merged motion information unit set z are all forward.

For another example, if prediction directions of two motion information units in the candidate merged motion information unit set z are backward, but prediction directions of remaining motion information units in the candidate merged motion information unit set z are bidirectional, a motion vector whose prediction direction is forward is deleted from the remaining motion information units in the candidate merged motion information unit set z. In this way, the prediction directions of the remaining motion information units in the candidate merged motion information unit set z are also changed to backward. That is, prediction directions of all motion information units in the candidate merged motion information unit set z are all backward.

A reference frame index may be adjusted in the following manner. Specifically, if all motion information units in the candidate merged motion information unit set z in the N candidate merged motion information unit sets correspond to a same reference frame index, the reference frame index corresponding to each motion information unit in the candidate merged motion information unit set z remains unchanged. If reference frame indexes corresponding to two motion information units in the candidate merged motion information unit set z are the same, but reference frame indexes corresponding to remaining motion information units are different, the reference frame indexes corresponding to the remaining motion information units in the candidate merged motion information unit set z may be adjusted to be the same as the reference frame indexes corresponding to the two motion information units, but scaling processing is performed on the candidate merged motion information unit set, so that motion vectors whose prediction directions are forward in the candidate merged motion information unit set z are scaled down to a same reference frame and/or that motion vectors whose prediction directions are backward in the candidate merged motion information unit set z are scaled down to a same reference frame.

The candidate merged motion information unit set z may be any candidate merged motion information unit set in the N candidate merged motion information unit sets, that is, scaling processing may be performed on motion vectors in each candidate merged motion information unit set in the N candidate merged motion information unit sets in the illustrated manner.

404. The video decoding apparatus performs decoding processing on a video bit stream to obtain an identifier of a merged motion information unit set i and a prediction residual of the picture block x, and determines, from the N candidate merged motion information unit sets, the merged motion information unit set i including K1 motion information units.

405. The video decoding apparatus performs motion estimation processing on a motion vector in the merged motion information unit set i to obtain a motion-estimated merged motion information unit set i, and the video decoding apparatus performs motion vector prediction on the picture block x by using a non-translational motion model and the motion-estimated merged motion information unit set i.

406. The video decoding apparatus predicts a pixel value of the picture block x based on a computed motion vector of each pixel or each pixel block of the picture block x to obtain the predicted pixel value of the picture block x.

407. The video decoding apparatus reconstructs the picture block x by using the predicted pixel value of the picture block x and the prediction residual of the picture block x. It can be seen that, in the video decoding solution of this embodiment, a pixel value of the picture block x is predicted by using a non-translational motion model and a merged motion information unit set i, where the merged motion information unit set i is selected from N candidate merged motion information unit sets meeting a condition, and each motion information unit in the merged motion information unit set i is selected from at least a part of motion information units in candidate motion information unit sets corresponding to different pixel samples in the K1 pixel samples. Because a selection range of the merged motion information unit set i is relatively small, a mechanism used in a conventional technology for screening out motion information units of K1 pixel samples only by performing a huge amount of computation in all possible candidate motion information unit sets corresponding to the K1 pixel samples is abandoned. This helps improve decoding efficiency, also helps reduce computational complexity of picture prediction performed based on the non-translational motion model, further makes it possible to introduce the non-translational motion model into a video coding standard, and because the non-translational motion model is introduced, helps describe motion of an object more accurately, and therefore helps improve prediction accuracy.

The following describes possible forms of some non-translational motion models.

An affine motion model is a motion model meeting the following condition:

$$\begin{cases} x' = ax + by + e \\ y' = cx + dy + f \\ v_x = x - x' \\ v_y = y - y' \end{cases}$$

where a, b, c, d, e, and f are model parameters; (x, y) are original coordinates of a pixel; (x', y') are coordinates of the pixel after affine transformation; $V_x$ is a motion vector in an x-axis direction; and $V_y$ is a motion vector in a y-axis direction.

A rotational motion model may be shown as follows:

$$\begin{bmatrix} x' \\ y' \end{bmatrix} = \begin{bmatrix} \cos\alpha & \sin\alpha & a \\ -\sin\alpha & \cos\alpha & b \end{bmatrix} = \begin{bmatrix} x \\ y \\ 1 \end{bmatrix}$$

where ? is an angle of rotation, and a and b are parameters.

A perspective motion model may be shown as follows:

$$\begin{bmatrix} x' \\ y' \\ n' \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix}$$

-continued $$\text{where} \begin{bmatrix} h_{11} & h_{12} & h_{13} \\ h_{21} & h_{22} & h_{23} \\ h_{31} & h_{32} & 1 \end{bmatrix}$$

is a perspective matrix.

A shearing motion model may be shown as follows:

$$\begin{bmatrix} x' \\ y' \\ n' \end{bmatrix} = \begin{bmatrix} 1 & b & 0 \\ d & 1 & 0 \\ 0 & 0 & 1 \end{bmatrix} \cdot \begin{bmatrix} x \\ y \\ 1 \end{bmatrix} = \begin{bmatrix} x + by \\ dx + y \\ 1 \end{bmatrix}$$

$$\text{where} \begin{bmatrix} 1 & b & 0 \\ d & 1 & 0 \\ 0 & 0 & 1 \end{bmatrix}$$

is a shearing matrix, and other parameters are model parameters.

A scaling motion model may be shown as follows:

$$\begin{cases} v_x = \rho_x x + \theta_x \\ v_y = \rho_y y + \theta_y \end{cases}$$

where $\rho_x$, $\rho_y$, $\theta_x$, and $\theta_y$ are model parameters.

A quadratic motion model may be shown as follows:

$$\begin{cases} x(u, v) = Au^2 + Bu + Cuv + Dv^2 + Ev + F \\ y(u, v) = Gu^2 + Hu + Kuv + Lv^2 + Mv + N \end{cases}$$

where u and v indicate original coordinates, x and y indicate coordinates after transformation, and other parameters are model parameters.

A bilinear motion model may be shown as follows:

$$\begin{cases} x' = axy + bx + dy + e \\ y' = fxy + gx + hy + i \\ v_x = x - x' \\ v_y = y - y' \end{cases}.$$

When motion vectors of four pixel samples are obtained (for example, FIG. 2-*d* shows a case in which K1 is equal to 4), a motion vector of any pixel may be obtained based on the bilinear motion model, and a function is expressed as follows:

$$(v_x, v_y) = f(\vec{v_0}, \vec{v_1}, \vec{v_2}, \vec{v_3}, x, y)$$

In the function, a, b, c, d, e, f, g, h, and i are model parameters; (x, y) are original coordinates of a pixel; (x', y') are coordinates of the pixel after bilinear motion; $V_x$ is a motion vector in the x-axis direction; and $V_y$ is a motion vector in the y-axis direction.

It may be understood that, the foregoing example illustrates only some possible representation forms of some non-translational motion models. Certainly, other forms of the non-translational motion models may exist.

In some implementation manners of the present application, an affine motion model of a motion vector in a case of multiple reference frames is established, and this helps overcome a disadvantage that the prior art cannot be effectively used in the case of multiple reference frames. In addition, some invalid merged motion information unit sets are screened out by introducing a screening condition, and this further helps improve coding efficiency. Table 1 shows coding performance in a low delay P frame (LDP) mode. Under a standard test condition, a bit rate may be saved by 1.6% on average, and the bit rate may be saved by a maximum of 4.7%.

TABLE 1

| Class | Sequence | Y BD-Rate | U BD-Rate | V BD-Rate |
|---|---|---|---|---|
| Class B | Kimono | −0.5% | 0.1% | 0.5% |
| 1080P | ParkScene | −0.1% | 0.0% | 0.6% |
| | Cactus | −3.6% | −2.1% | −2.0% |
| | BasketballDrive | −1.1% | −0.7% | −0.6% |
| | BQTerrace | −1.1% | 0.3% | 2.6% |
| Class C | BasketballDrill | −0.3% | −0.3% | 0.0% |
| WVGA | BQMall | −1.8% | −1.7% | −1.2% |
| | PartyScene | −2.2% | −1.9% | −1.9% |
| | RaceHorses | −0.9% | −0.5% | −0.3% |
| Class D | BasketballPass | −0.5% | −0.2% | −0.5% |
| WQVGA | BQSquare | −4.7% | −3.8% | −2.4% |
| | BlowingBubbles | −1.5% | −1.2% | −0.7% |
| | RaceHorses | −0.8% | −0.6% | −0.5% |
| Class E | FourPeople | −1.3% | −1.0% | −0.8% |
| 720P | Johnny | −3.2% | −1.6% | −0.7% |
| | KristenAndSara | −2.7% | −1.9% | −2.1% |
| | Average | −1.6% | −1.1% | −0.6% |

The following further provides related apparatuses for implementing the foregoing solutions.

Figure 5:
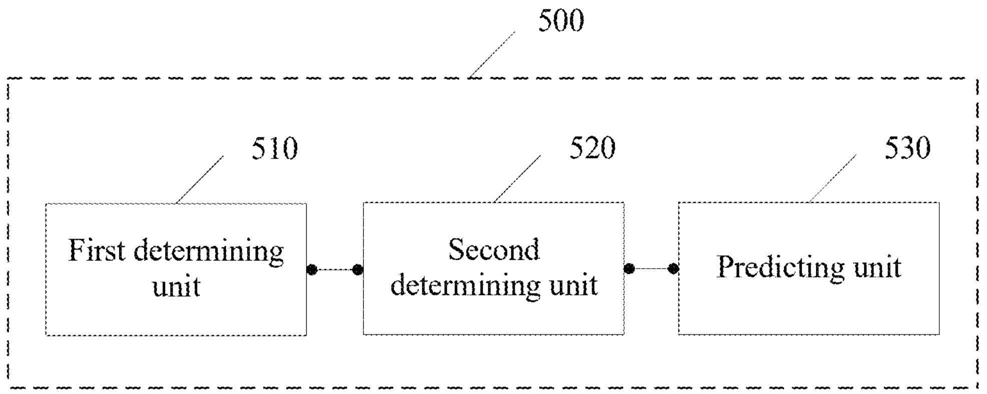
FIG. 5 is a schematic diagram of a picture prediction apparatus according to an embodiment of the present application.

Referring to FIG. 5, an embodiment of the present application further provides a picture prediction apparatus 500. The apparatus may include:

a first determining unit 510, configured to determine K1 pixel samples in a picture block x, and determine a candidate motion information unit set corresponding to each pixel sample in the K1 pixel samples, where the candidate motion information unit set corresponding to each pixel sample includes at least one candidate motion information unit, and K1 is an integer that is greater than or equal to 2;

a second determining unit 520, configured to determine a merged motion information unit set i including K1 motion information units, where each motion information unit in the merged motion information unit set i is selected from at least a part of motion information units in candidate motion information unit sets corresponding to different pixel samples in the K1 pixel samples, and the motion information unit includes a motion vector whose prediction direction is forward and/or a motion vector whose prediction direction is backward; and a predicting unit 530, configured to predict a pixel value of the picture block x by using a non-translational motion model and the merged motion information unit set i.

Optionally, in some possible implementation manners of the present application, the second determining unit 520 is specifically configured to determine, from N candidate merged motion information unit sets, the merged motion information unit set i including the K1 motion information units, where each motion information unit included in each candidate merged motion information unit set in the N candidate merged motion information unit sets is selected from at least a part of constraint-compliant motion information units in the candidate motion information unit sets corresponding to different pixel samples in the K1 pixel samples, N is a positive integer, the N candidate merged motion information unit sets are different from each other, and each candidate merged motion information unit set in the N candidate merged motion information unit sets includes K1 motion information units.

Optionally, in some possible implementation manners of the present application, the N candidate merged motion information unit sets meet at least one of a first condition, a second condition, a third condition, a fourth condition, or a fifth condition.

The first condition includes that a motion mode of the picture block x indicated by a motion information unit in any candidate merged motion information unit set in the N candidate merged motion information unit sets is non-translational motion.

The second condition includes that prediction directions of at least two motion information units in any candidate merged motion information unit set in the N candidate merged motion information unit sets are the same.

The third condition includes that reference frame indexes corresponding to at least two motion information units in any candidate merged motion information unit set in the N candidate merged motion information unit sets are the same.

The fourth condition includes that an absolute value of a difference between horizontal components of two motion information units in any candidate merged motion information unit set in the N candidate merged motion information unit sets is less than or equal to a horizontal component threshold.

The fifth condition includes that an absolute value of a difference between vertical components of two motion information units in any candidate merged motion information unit set in the N candidate merged motion information unit sets is less than or equal to a vertical component threshold.

Optionally, in some possible implementation manners of the present application, the K1 pixel samples include at least two pixel samples in an upper left pixel sample, an upper right pixel sample, a lower left pixel sample, and a central pixel sample a1 of the picture block x.

The upper left pixel sample of the picture block x is an upper left vertex of the picture block x, or a pixel block in the picture block x and including an upper left vertex of the picture block x; the lower left pixel sample of the picture block x is a lower left vertex of the picture block x, or a pixel block in the picture block x and including a lower left vertex of the picture block x; the upper right pixel sample of the picture block x is an upper right vertex of the picture block x, or a pixel block in the picture block x and including an upper right vertex of the picture block x; and the central pixel sample a1 of the picture block x is a central pixel of the picture block x, or a pixel block in the picture block x and including a central pixel of the picture block x.

Optionally, in some possible implementation manners of the present application, a candidate motion information unit set corresponding to the upper left pixel sample of the picture block x includes motion information units of x1 pixel samples, where the x1 pixel samples include at least one pixel sample spatially adjacent to the upper left pixel sample of the picture block x and/or at least one pixel sample temporally adjacent to the upper left pixel sample of the picture block x, and x1 is a positive integer.

Optionally, in some possible implementation manners of the present application, the x1 pixel samples include at least one of a pixel sample that has a same location as the upper left pixel sample of the picture block x, a pixel sample spatially adjacent to a left edge of the picture block x, a pixel sample spatially adjacent to an upper left of the picture block x, or a pixel sample spatially adjacent to an upper edge of the picture block x, in a video frame temporally adjacent to a video frame to which the picture block x belongs.

Optionally, in some possible implementation manners of the present application, a candidate motion information unit set corresponding to the upper right pixel sample of the picture block x includes motion information units of x2 pixel samples, where the x2 pixel samples include at least one pixel sample spatially adjacent to the upper right pixel sample of the picture block x and/or at least one pixel sample temporally adjacent to the upper right pixel sample of the picture block x, and x2 is a positive integer.

Optionally, in some possible implementation manners of the present application, the x2 pixel samples include at least one of a pixel sample that has a same location as the upper right pixel sample of the picture block x, a pixel sample spatially adjacent to a right edge of the picture block x, a pixel sample spatially adjacent to an upper right of the picture block x, or a pixel sample spatially adjacent to the upper edge of the picture block x, in a video frame temporally adjacent to the video frame to which the picture block x belongs.

Optionally, in some possible implementation manners of the present application, a candidate motion information unit set corresponding to the lower left pixel sample of the picture block x includes motion information units of x3 pixel samples, where the x3 pixel samples include at least one pixel sample spatially adjacent to the lower left pixel sample of the picture block x and/or at least one pixel sample temporally adjacent to the lower left pixel sample of the picture block x, and x3 is a positive integer.

Optionally, in some possible implementation manners of the present application, the x3 pixel samples include at least one of a pixel sample that has a same location as the lower left pixel sample of the picture block x, a pixel sample spatially adjacent to the left edge of the picture block x, a pixel sample spatially adjacent to a lower left of the picture block x, or a pixel sample spatially adjacent to a lower edge of the picture block x, in a video frame temporally adjacent to the video frame to which the picture block x belongs.

Optionally, in some possible implementation manners of the present application, a candidate motion information unit set corresponding to the central pixel sample a1 of the picture block x includes motion information units of x5 pixel samples, where one pixel sample in the x5 pixel samples is a pixel sample a2.

A location of the central pixel sample a1 in the video frame to which the picture block x belongs is the same as a location of the pixel sample a2 in a video frame adjacent to the video frame to which the picture block x belongs, and x5 is a positive integer.

Optionally, in some possible implementation manners of the present application, the predicting unit 530 is specifically configured to: when motion vectors whose prediction directions are a first prediction direction in the merged motion information unit set i correspond to different reference frame indexes, perform scaling processing on the merged motion information unit set i, so that the motion vectors whose prediction directions are the first prediction direction in the merged motion information unit set i are scaled down to a same reference frame, and predict the pixel value of the picture block x by using the non-translational motion model and a scaled merged motion information unit set i, where the first prediction direction is forward or backward; or the predicting unit 530 is specifically configured to: when motion vectors whose prediction directions are forward in the merged motion information unit set i correspond to different reference frame indexes and motion vectors whose prediction directions are backward in the merged motion information unit set i correspond to different reference frame indexes, perform scaling processing on the merged motion information unit set i, so that the motion vectors whose prediction directions are forward in the merged motion information unit set i are scaled down to a same reference frame and that the motion vectors whose prediction directions are backward in the merged motion information unit set i are scaled down to a same reference frame, and predict the pixel value of the picture block x by using the non-translational motion model and a scaled merged motion information unit set i.

Optionally, in some possible implementation manners of the present application, the predicting unit 530 is specifically configured to obtain a motion vector of each pixel in the picture block x through computation by using the non-translational motion model and the merged motion information unit set i, and determine a predicted pixel value of each pixel in the picture block x by using the obtained motion vector of each pixel in the picture block x; or the predicting unit 530 is specifically configured to obtain a motion vector of each pixel block in the picture block x through computation by using the non-translational motion model and the merged motion information unit set i, and determine a predicted pixel value of each pixel in each pixel block in the picture block x by using the obtained motion vector of each pixel block in the picture block x.

Optionally, in some possible implementation manners of the present application, the first determining unit 510 is further configured to determine K2 pixel samples in a picture block y, and determine a candidate motion information unit set corresponding to each pixel sample in the K2 pixel samples, where K2 is an integer that is greater than 1, the picture block y is spatially adjacent to the picture block x, and the candidate motion information unit set corresponding to each pixel sample in the K2 pixel samples includes at least one candidate motion information unit;

the second determining unit 520 is further configured to determine a merged motion information unit set j including K2 motion information units, where a candidate motion information unit set corresponding to a pixel sample z1 in the K2 pixel samples includes a motion information unit a2, and the motion information unit a2 is obtained based on a motion information unit of a pixel sample z2, where the pixel sample z2 is a pixel sample in the picture block x and a distance between the pixel sample z2 and the pixel sample z1 is less than a threshold, or the pixel sample z2 is a pixel sample in the picture block x and a distance between the pixel sample z2 and the pixel sample z1 is shortest; and the K2 motion information units in the merged motion information unit set j are respectively selected from at least a part of constraint-compliant motion information units in the candidate motion information unit set corresponding to each pixel sample in the K2 pixel samples; and the predicting unit 530 is further configured to predict a pixel value of the picture block y by using the non-translational motion model and the merged motion information unit set j.

Optionally, in some possible implementation manners of the present application, the non-translational motion model may be any one of the following models: an affine motion model, a parabolic motion model, a rotational motion model, a perspective motion model, a shearing motion model, a scaling motion model, or a bilinear motion model.

The picture prediction apparatus 500 may be applied to a video coding apparatus, or the picture prediction apparatus 500 may be applied to a video decoding apparatus.

Optionally, in some possible implementation manners of the present application, when the picture prediction apparatus is applied to the video coding apparatus, the second determining unit 520 may be specifically configured to determine, from the N candidate merged motion information unit sets, according to distortion or a rate distortion cost, the merged motion information unit set i including the K1 motion information units.

Optionally, in some possible implementation manners of the present application, when the picture prediction apparatus is applied to the video coding apparatus, the predicting unit 530 is further configured to write an identifier of the merged motion information unit set i into a video bit stream.

Optionally, in some possible implementation manners of the present application, when the picture prediction apparatus is applied to the video decoding apparatus, the second determining unit is specifically configured to determine, from the N candidate merged motion information unit sets, based on an identifier that is of the merged motion information unit set i and is obtained from a video bit stream, the merged motion information unit set i including the K1 motion information units.

It may be understood that, functions of each functional module of the picture prediction apparatus 500 in this embodiment may be specifically implemented according to the method in the foregoing method embodiment. For a specific implementation process thereof, reference may be made to the related description in the foregoing method embodiment, and details are not described again herein. The picture prediction apparatus 500 may be any apparatus that needs to output and play a video, for example, a device such as a notebook computer, a tablet computer, a personal computer, or a mobile phone.

It can be seen that, a picture prediction apparatus 500 of this embodiment predicts a pixel value of the picture block x by using a non-translational motion model and a merged motion information unit set i, where each motion information unit in the merged motion information unit set i is selected from at least a part of motion information units in candidate motion information unit sets corresponding to different pixel samples in the K1 pixel samples. Because a selection range of the merged motion information unit set i is relatively small, a mechanism used in a conventional technology for screening out motion information units of K1 pixel samples only by performing a huge amount of computation in all possible candidate motion information unit sets corresponding to the K1 pixel samples is abandoned. This helps improve coding efficiency, also helps reduce computational complexity of picture prediction performed based on the non-translational motion model, further makes it possible to introduce the non-translational motion model into a video coding standard, and because the non-translational motion model is introduced, helps describe motion of an object more accurately, and therefore helps improve prediction accuracy.

Figure 6:
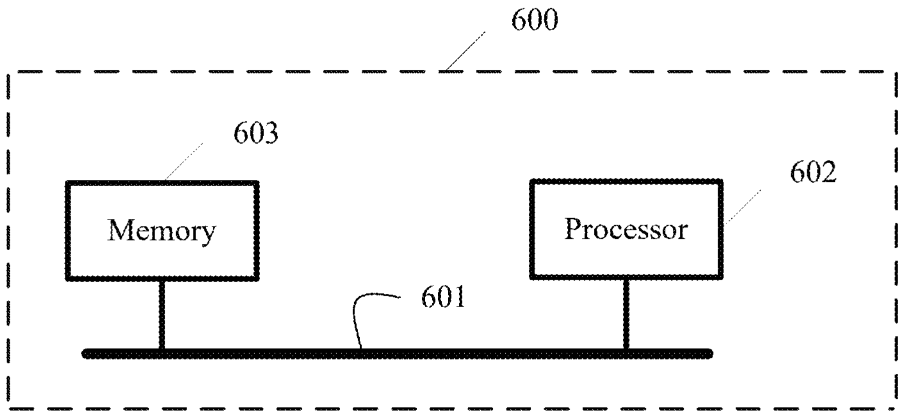
FIG. 6 is a schematic diagram of another picture prediction apparatus according to an embodiment of the present application.

Referring to FIG. 6, FIG. 6 is a schematic diagram of a picture prediction apparatus 600 according to an embodiment of the present application. The picture prediction apparatus 600 may include at least one bus 601, at least one processor 602 connected to the bus 601, and at least one memory 603 connected to the bus 601.

The processor 602 invokes, by using the bus 601, code stored in the memory 603, so that the processor 602 is configured to: determine K1 pixel samples in a picture block x, and determine a candidate motion information unit set corresponding to each pixel sample in the K1 pixel samples, where the candidate motion information unit set corresponding to each pixel sample includes at least one candidate motion information unit, and K1 is an integer that is greater than or equal to 2; determine a merged motion information unit set i including K1 motion information units, where each motion information unit in the merged motion information unit set i is selected from at least a part of motion information units in candidate motion information unit sets corresponding to different pixel samples in the K1 pixel samples, and the motion information unit includes a motion vector whose prediction direction is forward and/or a motion vector whose prediction direction is backward; and predict a pixel value of the picture block x by using a non-translational motion model and the merged motion information unit set i.

Optionally, in some possible implementation manners of the present application, the processor 602 may be configured to determine, from N candidate merged motion information unit sets, the merged motion information unit set i including the K1 motion information units, where each motion information unit included in each candidate merged motion information unit set in the N candidate merged motion information unit sets is selected from at least a part of constraint-compliant motion information units in the candidate motion information unit sets corresponding to different pixel samples in the K1 pixel samples, N is a positive integer, the N candidate merged motion information unit sets are different from each other, and each candidate merged motion information unit set in the N candidate merged motion information unit sets includes K1 motion information units.

Optionally, in some possible implementation manners of the present application, the N candidate merged motion information unit sets meet at least one of a first condition, a second condition, a third condition, a fourth condition, or a fifth condition.

The first condition includes that a motion mode of the picture block x indicated by a motion information unit in any candidate merged motion information unit set in the N candidate merged motion information unit sets is non-translational motion.

The second condition includes that prediction directions of at least two motion information units in any candidate merged motion information unit set in the N candidate merged motion information unit sets are the same.

The third condition includes that reference frame indexes corresponding to at least two motion information units in any candidate merged motion information unit set in the N candidate merged motion information unit sets are the same.

The fourth condition includes that an absolute value of a difference between horizontal components of two motion information units in any candidate merged motion information unit set in the N candidate merged motion information unit sets is less than or equal to a horizontal component threshold.

The fifth condition includes that an absolute value of a difference between vertical components of two motion information units in any candidate merged motion information unit set in the N candidate merged motion information unit sets is less than or equal to a vertical component threshold.

Optionally, in some possible implementation manners of the present application, the K1 pixel samples include at least two pixel samples in an upper left pixel sample, an upper right pixel sample, a lower left pixel sample, and a central pixel sample a1 of the picture block x.

The upper left pixel sample of the picture block x is an upper left vertex of the picture block x, or a pixel block in the picture block x and including an upper left vertex of the picture block x; the lower left pixel sample of the picture block x is a lower left vertex of the picture block x, or a pixel block in the picture block x and including a lower left vertex of the picture block x; the upper right pixel sample of the picture block x is an upper right vertex of the picture block x, or a pixel block in the picture block x and including an upper right vertex of the picture block x; and the central pixel sample a1 of the picture block x is a central pixel of the picture block x, or a pixel block in the picture block x and including a central pixel of the picture block x.

Optionally, in some possible implementation manners of the present application, a candidate motion information unit set corresponding to the upper left pixel sample of the picture block x includes motion information units of x1 pixel samples, where the x1 pixel samples include at least one pixel sample spatially adjacent to the upper left pixel sample of the picture block x and/or at least one pixel sample temporally adjacent to the upper left pixel sample of the picture block x, and x1 is a positive integer.

Optionally, in some possible implementation manners of the present application, the x1 pixel samples include at least one of a pixel sample that has a same location as the upper left pixel sample of the picture block x, a pixel sample spatially adjacent to a left edge of the picture block x, a pixel sample spatially adjacent to an upper left of the picture block x, or a pixel sample spatially adjacent to an upper edge of the picture block x, in a video frame temporally adjacent to a video frame to which the picture block x belongs.

Optionally, in some possible implementation manners of the present application, a candidate motion information unit set corresponding to the upper right pixel sample of the picture block x includes motion information units of x2 pixel samples, where the x2 pixel samples include at least one pixel sample spatially adjacent to the upper right pixel sample of the picture block x and/or at least one pixel sample temporally adjacent to the upper right pixel sample of the picture block x, and x2 is a positive integer.

Optionally, in some possible implementation manners of the present application, the x2 pixel samples include at least one of a pixel sample that has a same location as the upper right pixel sample of the picture block x, a pixel sample spatially adjacent to a right edge of the picture block x, a pixel sample spatially adjacent to an upper right of the picture block x, or a pixel sample spatially adjacent to the upper edge of the picture block x, in a video frame temporally adjacent to the video frame to which the picture block x belongs.

Optionally, in some possible implementation manners of the present application, a candidate motion information unit set corresponding to the lower left pixel sample of the picture block x includes motion information units of x3 pixel samples, where the x3 pixel samples include at least one pixel sample spatially adjacent to the lower left pixel sample of the picture block x and/or at least one pixel sample temporally adjacent to the lower left pixel sample of the picture block x, and x3 is a positive integer.

Optionally, in some possible implementation manners of the present application, the x3 pixel samples include at least one of a pixel sample that has a same location as the lower left pixel sample of the picture block x, a pixel sample spatially adjacent to the left edge of the picture block x, a pixel sample spatially adjacent to a lower left of the picture block x, or a pixel sample spatially adjacent to a lower edge of the picture block x, in a video frame temporally adjacent to the video frame to which the picture block x belongs.

Optionally, in some possible implementation manners of the present application, a candidate motion information unit set corresponding to the central pixel sample a1 of the picture block x includes motion information units of x5 pixel samples, where one pixel sample in the x5 pixel samples is a pixel sample a2.

A location of the central pixel sample a1 in the video frame to which the picture block x belongs is the same as a location of the pixel sample a2 in a video frame adjacent to the video frame to which the picture block x belongs, and x5 is a positive integer.

Optionally, in some possible implementation manners of the present application, the processor 602 may be configured to: when motion vectors whose prediction directions are a first prediction direction in the merged motion information unit set i correspond to different reference frame indexes, perform scaling processing on the merged motion information unit set i, so that the motion vectors whose prediction directions are the first prediction direction in the merged motion information unit set i are scaled down to a same reference frame, and predict the pixel value of the picture block x by using the non-translational motion model and a scaled merged motion information unit set i, where the first prediction direction is forward or backward; or the processor 602 may be configured to: when motion vectors whose prediction directions are forward in the merged motion information unit set i correspond to different reference frame indexes and motion vectors whose prediction directions are backward in the merged motion information unit set i correspond to different reference frame indexes, perform scaling processing on the merged motion information unit set i, so that the motion vectors whose prediction directions are forward in the merged motion information unit set i are scaled down to a same reference frame and that the motion vectors whose prediction directions are backward in the merged motion information unit set i are scaled down to a same reference frame, and predict the pixel value of the picture block x by using the non-translational motion model and a scaled merged motion information unit set i.

Optionally, in some possible implementation manners of the present application, the processor 602 may be configured to obtain a motion vector of each pixel in the picture block x through computation by using the non-translational motion model and the merged motion information unit set i, and determine a predicted pixel value of each pixel in the picture block x by using the obtained motion vector of each pixel in the picture block x; or the processor 602 may be configured to obtain a motion vector of each pixel block in the picture block x through computation by using the non-translational motion model and the merged motion information unit set i, and determine a predicted pixel value of each pixel in each pixel block in the picture block x by using the obtained motion vector of each pixel block in the picture block x.

Optionally, in some possible implementation manners of the present application, the processor 602 is further configured to: determine K2 pixel samples in a picture block y, and determine a candidate motion information unit set corresponding to each pixel sample in the K2 pixel samples, where K2 is an integer that is greater than 1, the picture block y is spatially adjacent to the picture block x, and the candidate motion information unit set corresponding to each pixel sample in the K2 pixel samples includes at least one candidate motion information unit; determine a merged motion information unit set j including K2 motion information units, where a candidate motion information unit set corresponding to a pixel sample z1 in the K2 pixel samples includes a motion information unit a2, and the motion information unit a2 is obtained based on a motion information unit of a pixel sample z2, where the pixel sample z2 is a pixel sample in the picture block x and a distance between the pixel sample z2 and the pixel sample z1 is less than a threshold, or the pixel sample z2 is a pixel sample in the picture block x and a distance between the pixel sample z2 and the pixel sample z1 is shortest; and the K2 motion information units in the merged motion information unit set j are respectively selected from at least a part of constraint-compliant motion information units in the candidate motion information unit set corresponding to each pixel sample in the K2 pixel samples; and predict a pixel value of the picture block y by using the non-translational motion model and the merged motion information unit set j.

Optionally, in some possible implementation manners of the present application, the non-translational motion model may be any one of the following models: an affine motion model, a parabolic motion model, a rotational motion model, a perspective motion model, a shearing motion model, a scaling motion model, or a bilinear motion model.

The picture prediction apparatus 600 may be applied to a video coding apparatus, or the picture prediction apparatus 600 may be applied to a video decoding apparatus.

Optionally, in some possible implementation manners of the present application, when the picture prediction apparatus is applied to the video coding apparatus, the processor 602 may be specifically configured to determine, from the N candidate merged motion information unit sets, according to distortion or a rate distortion cost, the merged motion information unit set i including the K1 motion information units.

Optionally, in some possible implementation manners of the present application, when the picture prediction apparatus is applied to the video coding apparatus, the processor 602 may be further configured to write an identifier of the merged motion information unit set i into a video bit stream.

Optionally, in some possible implementation manners of the present application, when the picture prediction apparatus is applied to the video decoding apparatus, the processor 602 may be specifically configured to determine, from the N candidate merged motion information unit sets, based on an identifier that is of the merged motion information unit set i and is obtained from a video bit stream, the merged motion information unit set i including the K1 motion information units.

It may be understood that, functions of each functional module of the picture prediction apparatus 600 in this embodiment may be specifically implemented according to the method in the foregoing method embodiment. For a specific implementation process thereof, reference may be made to the related description in the foregoing method embodiment, and details are not described again herein. The picture prediction apparatus 600 may be any apparatus that needs to output and play a video, for example, a device such as a notebook computer, a tablet computer, a personal computer, or a mobile phone.

It can be seen that, a picture prediction apparatus 600 of this embodiment predicts a pixel value of the picture block x by using a non-translational motion model and a merged motion information unit set i, where each motion information unit in the merged motion information unit set i is selected from at least a part of motion information units in candidate motion information unit sets corresponding to different pixel samples in the K1 pixel samples. Because a selection range of the merged motion information unit set i is relatively small, a mechanism used in a conventional technology for screening out motion information units of K1 pixel samples only by performing a huge amount of computation in all possible candidate motion information unit sets corresponding to the K1 pixel samples is abandoned. This helps improve coding efficiency, also helps reduce computational complexity of picture prediction performed based on the non-translational motion model, further makes it possible to introduce the non-translational motion model into a video coding standard, and because the non-translational motion model is introduced, helps describe motion of an object more accurately, and therefore helps improve prediction accuracy.

Figure 7:
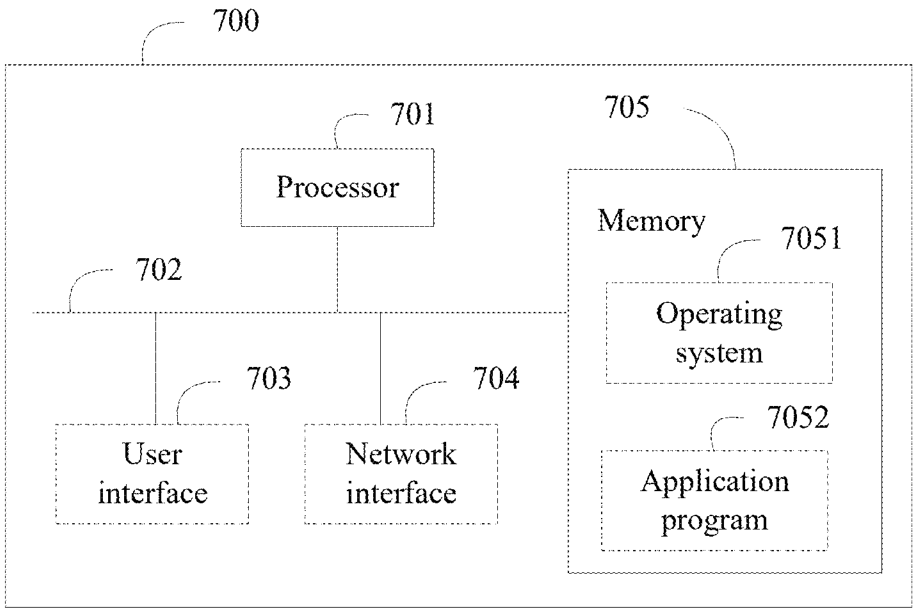
FIG. 7 is a schematic diagram of another picture prediction apparatus according to an embodiment of the present application.

Referring to FIG. 7, FIG. 7 is a structural block diagram of a picture prediction apparatus 700 according to another embodiment of the present application. The picture prediction apparatus 700 may include at least one processor 701, a memory 705, and at least one communications bus 702. The communications bus 702 is configured to implement connections and communication between the components. The picture prediction apparatus 700 may optionally include at least one network interface 704 and/or a user interface 703. The user interface 703 may include a display (for example, a touchscreen, an LCD, a holographic imaging device, a CRT, or a projector), a pointer device (for example, a mouse, a trackball, a touchpad, or a touchscreen), a camera, and/or a pickup apparatus, and the like.

The memory 705 may include a read-only memory and a random access memory, and provide an instruction and data to the processor 701. A part of the memory 705 may further include a non-volatile random access memory.

In some implementation manners, the memory 705 stores the following elements: executable modules or data structures, or a subset thereof, or an extended set thereof:

an operating system 7051, including various system programs, configured to implement various basic services and process hardware-based tasks; and an application program module 7052, including various application programs, configured to implement various application services.

In this embodiment of the present application, by invoking a program or an instruction stored in the memory 705, the processor 701 is configured to: determine K1 pixel samples in a picture block x, and determine a candidate motion information unit set corresponding to each pixel sample in the K1 pixel samples, where the candidate motion information unit set corresponding to each pixel sample includes at least one candidate motion information unit, and K1 is an integer that is greater than or equal to 2; determine a merged motion information unit set i including K1 motion information units, where each motion information unit in the merged motion information unit set i is selected from at least a part of motion information units in candidate motion information unit sets corresponding to different pixel samples in the K1 pixel samples, and the motion information unit includes a motion vector whose prediction direction is forward and/or a motion vector whose prediction direction is backward; and predict a pixel value of the picture block x by using a non-translational motion model and the merged motion information unit set i.

Optionally, in some possible implementation manners of the present application, the processor 701 may be configured to determine, from N candidate merged motion information unit sets, the merged motion information unit set i including the K1 motion information units, where each motion information unit included in each candidate merged motion information unit set in the N candidate merged motion information unit sets is selected from at least a part of constraint-compliant motion information units in the candidate motion information unit sets corresponding to different pixel samples in the K1 pixel samples, N is a positive integer, the N candidate merged motion information unit sets are different from each other, and each candidate merged motion information unit set in the N candidate merged motion information unit sets includes K1 motion information units.

Optionally, in some possible implementation manners of the present application, the N candidate merged motion information unit sets meet at least one of a first condition, a second condition, a third condition, a fourth condition, or a fifth condition.

The first condition includes that a motion mode of the picture block x indicated by a motion information unit in any candidate merged motion information unit set in the N candidate merged motion information unit sets is non-translational motion.

The second condition includes that prediction directions of at least two motion information units in any candidate merged motion information unit set in the N candidate merged motion information unit sets are the same.

The third condition includes that reference frame indexes corresponding to at least two motion information units in any candidate merged motion information unit set in the N candidate merged motion information unit sets are the same.

The fourth condition includes that an absolute value of a difference between horizontal components of two motion information units in any candidate merged motion information unit set in the N candidate merged motion information unit sets is less than or equal to a horizontal component threshold.

The fifth condition includes that an absolute value of a difference between vertical components of two motion information units in any candidate merged motion information unit set in the N candidate merged motion information unit sets is less than or equal to a vertical component threshold.

Optionally, in some possible implementation manners of the present application, the K1 pixel samples include at least two pixel samples in an upper left pixel sample, an upper right pixel sample, a lower left pixel sample, and a central pixel sample a1 of the picture block x.

The upper left pixel sample of the picture block x is an upper left vertex of the picture block x, or a pixel block in the picture block x and including an upper left vertex of the picture block x; the lower left pixel sample of the picture block x is a lower left vertex of the picture block x, or a pixel block in the picture block x and including a lower left vertex of the picture block x; the upper right pixel sample of the picture block x is an upper right vertex of the picture block x, or a pixel block in the picture block x and including an upper right vertex of the picture block x; and the central pixel sample a1 of the picture block x is a central pixel of the picture block x, or a pixel block in the picture block x and including a central pixel of the picture block x.

Optionally, in some possible implementation manners of the present application, a candidate motion information unit set corresponding to the upper left pixel sample of the picture block x includes motion information units of x1 pixel samples, where the x1 pixel samples include at least one pixel sample spatially adjacent to the upper left pixel sample of the picture block x and/or at least one pixel sample temporally adjacent to the upper left pixel sample of the picture block x, and x1 is a positive integer.

Optionally, in some possible implementation manners of the present application, the x1 pixel samples include at least one of a pixel sample that has a same location as the upper left pixel sample of the picture block x, a pixel sample spatially adjacent to a left edge of the picture block x, a pixel sample spatially adjacent to an upper left of the picture block x, or a pixel sample spatially adjacent to an upper edge of the picture block x, in a video frame temporally adjacent to a video frame to which the picture block x belongs.

Optionally, in some possible implementation manners of the present application, a candidate motion information unit set corresponding to the upper right pixel sample of the picture block x includes motion information units of x2 pixel samples, where the x2 pixel samples include at least one pixel sample spatially adjacent to the upper right pixel sample of the picture block x and/or at least one pixel sample temporally adjacent to the upper right pixel sample of the picture block x, and x2 is a positive integer.

Optionally, in some possible implementation manners of the present application, the x2 pixel samples include at least one of a pixel sample that has a same location as the upper right pixel sample of the picture block x, a pixel sample spatially adjacent to a right edge of the picture block x, a pixel sample spatially adjacent to an upper right of the picture block x, or a pixel sample spatially adjacent to the upper edge of the picture block x, in a video frame temporally adjacent to the video frame to which the picture block x belongs.

Optionally, in some possible implementation manners of the present application, a candidate motion information unit set corresponding to the lower left pixel sample of the picture block x includes motion information units of x3 pixel samples, where the x3 pixel samples include at least one pixel sample spatially adjacent to the lower left pixel sample of the picture block x and/or at least one pixel sample temporally adjacent to the lower left pixel sample of the picture block x, and x3 is a positive integer.

Optionally, in some possible implementation manners of the present application, the x3 pixel samples include at least one of a pixel sample that has a same location as the lower left pixel sample of the picture block x, a pixel sample spatially adjacent to the left edge of the picture block x, a pixel sample spatially adjacent to a lower left of the picture block x, or a pixel sample spatially adjacent to a lower edge of the picture block x, in a video frame temporally adjacent to the video frame to which the picture block x belongs.

Optionally, in some possible implementation manners of the present application, a candidate motion information unit set corresponding to the central pixel sample a1 of the picture block x includes motion information units of x5 pixel samples, where one pixel sample in the x5 pixel samples is a pixel sample a2.

A location of the central pixel sample a1 in the video frame to which the picture block x belongs is the same as a location of the pixel sample a2 in a video frame adjacent to the video frame to which the picture block x belongs, and x5 is a positive integer.

Optionally, in some possible implementation manners of the present application, the processor 701 may be configured to: when motion vectors whose prediction directions are a first prediction direction in the merged motion information unit set i correspond to different reference frame indexes, perform scaling processing on the merged motion information unit set i, so that the motion vectors whose prediction directions are the first prediction direction in the merged motion information unit set i are scaled down to a same reference frame, and predict the pixel value of the picture block x by using the non-translational motion model and a scaled merged motion information unit set i, where the first prediction direction is forward or backward; or the processor 701 may be configured to: when motion vectors whose prediction directions are forward in the merged motion information unit set i correspond to different reference frame indexes and motion vectors whose prediction directions are backward in the merged motion information unit set i correspond to different reference frame indexes, perform scaling processing on the merged motion information unit set i, so that the motion vectors whose prediction directions are forward in the merged motion information unit set i are scaled down to a same reference frame and that the motion vectors whose prediction directions are backward in the merged motion information unit set i are scaled down to a same reference frame, and predict the pixel value of the picture block x by using the non-translational motion model and a scaled merged motion information unit set i.

Optionally, in some possible implementation manners of the present application, the processor 701 may be configured to obtain a motion vector of each pixel in the picture block x through computation by using the non-translational motion model and the merged motion information unit set i, and determine a predicted pixel value of each pixel in the picture block x by using the obtained motion vector of each pixel in the picture block x; or the processor 701 may be configured to obtain a motion vector of each pixel block in the picture block x through computation by using the non-translational motion model and the merged motion information unit set i, and determine a predicted pixel value of each pixel in each pixel block in the picture block x by using the obtained motion vector of each pixel block in the picture block x.

Optionally, in some possible implementation manners of the present application, the processor 701 is further configured to determine K2 pixel samples in a picture block y, and determine a candidate motion information unit set corresponding to each pixel sample in the K2 pixel samples, where K2 is an integer that is greater than 1, the picture block y is spatially adjacent to the picture block x, and the candidate motion information unit set corresponding to each pixel sample in the K2 pixel samples includes at least one candidate motion information unit; determine a merged motion information unit set j including K2 motion information units, where a candidate motion information unit set corresponding to a pixel sample z1 in the K2 pixel samples includes a motion information unit a2, and the motion information unit a2 is obtained based on a motion information unit of a pixel sample z2, where the pixel sample z2 is a pixel sample in the picture block x and a distance between the pixel sample z2 and the pixel sample z1 is less than a threshold, or the pixel sample z2 is a pixel sample in the picture block x and a distance between the pixel sample z2 and the pixel sample z1 is shortest; and the K2 motion information units in the merged motion information unit set j are respectively selected from at least a part of constraint-compliant motion information units in the candidate motion information unit set corresponding to each pixel sample in the K2 pixel samples; and predict a pixel value of the picture block y by using the non-translational motion model and the merged motion information unit set j.

Optionally, in some possible implementation manners of the present application, the non-translational motion model may be any one of the following models: an affine motion model, a parabolic motion model, a rotational motion model, a perspective motion model, a shearing motion model, a scaling motion model, or a bilinear motion model.

The picture prediction apparatus 700 may be applied to a video coding apparatus, or the picture prediction apparatus 700 may be applied to a video decoding apparatus.

Optionally, in some possible implementation manners of the present application, when the picture prediction apparatus is applied to the video coding apparatus, the processor 701 may be specifically configured to determine, from the N candidate merged motion information unit sets, according to distortion or a rate distortion cost, the merged motion information unit set i including the K1 motion information units.

Optionally, in some possible implementation manners of the present application, when the picture prediction apparatus is applied to the video coding apparatus, the processor 701 may be further configured to write an identifier of the merged motion information unit set i into a video bit stream.

Optionally, in some possible implementation manners of the present application, when the picture prediction apparatus is applied to the video decoding apparatus, the processor 701 may be specifically configured to determine, from the N candidate merged motion information unit sets, based on an identifier that is of the merged motion information unit set i and is obtained from a video bit stream, the merged motion information unit set i including the K1 motion information units.

It may be understood that, functions of each functional module of the picture prediction apparatus 700 in this embodiment may be specifically implemented according to the method in the foregoing method embodiment. For a specific implementation process thereof, reference may be made to the related description in the foregoing method embodiment, and details are not described again herein. The picture prediction apparatus 700 may be any apparatus that needs to output and play a video, for example, a device such as a notebook computer, a tablet computer, a personal computer, or a mobile phone.

It can be seen that, a picture prediction apparatus 700 of this embodiment predicts a pixel value of the picture block x by using a non-translational motion model and a merged motion information unit set i, where each motion information unit in the merged motion information unit set i is selected from at least a part of motion information units in candidate motion information unit sets corresponding to different pixel samples in the K1 pixel samples. Because a selection range of the merged motion information unit set i is relatively small, a mechanism used in a conventional technology for screening out motion information units of K1 pixel samples only by performing a huge amount of computation in all possible candidate motion information unit sets corresponding to the K1 pixel samples is abandoned. This helps improve coding efficiency, also helps reduce computational complexity of picture prediction performed based on the non-translational motion model, further makes it possible to introduce the non-translational motion model into a video coding standard, and because the non-translational motion model is introduced, helps describe motion of an object more accurately, and therefore helps improve prediction accuracy.

It should be noted that, to make the description brief, the foregoing method embodiments are expressed as a series of actions. However, a person skilled in the art should appreciate that the present application is not limited to the described action sequence, because according to the present application, some steps may be performed in other sequences or performed simultaneously. In addition, a person skilled in the art should also appreciate that all the embodiments described in the specification are exemplary embodiments, and the related actions and modules are not necessarily mandatory to the present application.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

The invention claimed is:

1. A method for use in a case of multiple reference frames in video decoding, the method comprising:

performing entropy decoding processing on a video bit stream to obtain an identifier of a merged motion information unit set i and a prediction residual of a picture block x;

determining, from N candidate merged motion information unit sets, the merged motion information unit set i including K1 motion information units; and wherein the merged motion information unit set i of the N candidate merged motion information unit sets is derived as follows:

determining K1 pixel samples of the picture block x;

determining a candidate motion information unit set associated with each pixel sample in the K1 pixel samples, wherein the candidate motion information unit set associated with each pixel sample comprises one candidate motion information unit, and wherein K1 is an integer greater than or equal to 2; and determining the merged motion information unit set i comprising K1 motion information units, wherein the K1 motion information units in the merged motion information unit set i are selected from the candidate motion information units of the candidate motion information unit sets associated with the K1 pixel samples, wherein each motion information unit comprises a motion vector whose prediction direction is forward and/or a motion vector whose prediction direction is backward, wherein the merged motion information unit set i meets a condition that reference frame indexes associated with the K1 motion information units in the merged motion information unit set i are the same, and wherein the merged motion information unit set i is associated with an identifier.

2. The method according to claim 1, wherein the K1 pixel samples comprise at least two pixel samples in an upper left pixel sample, an upper right pixel sample and a lower left pixel sample of the picture block x, wherein the upper left pixel sample of the picture block x is one of: an upper left vertex of the picture block x, and a pixel block in the picture block x comprising an upper left vertex of the picture block x, wherein the lower left pixel sample of the picture block x is one of: a lower left vertex of the picture block x, and a pixel block in the picture block x comprising a lower left vertex of the picture block x, and wherein the upper right pixel sample of the picture block x is one of: an upper right vertex of the picture block x, and a pixel block in the picture block x comprising an upper right vertex of the picture block x.

3. The method according to claim 2, wherein a candidate motion information unit set associated with the upper left pixel sample of the picture block x comprises one of the motion information units of x1 pixel samples, wherein x1 is a positive integer, wherein the x1 pixel samples comprise at least one pixel sample spatially adjacent to the upper left pixel sample of the picture block x, and wherein the x1 pixel samples comprise at least one of: a pixel sample spatially adjacent to a left edge of the picture block x, a pixel sample spatially adjacent to an upper left of the picture block x, and a pixel sample spatially adjacent to an upper edge of the picture block x.

4. The method according to claim 2, wherein a candidate motion information unit set associated with the upper right pixel sample of the picture block x comprises one of the motion information units of x2 pixel samples, wherein x2 is a positive integer, wherein the x2 pixel samples comprise at least one pixel sample spatially adjacent to the upper right pixel sample of the picture block x, and wherein the x2 pixel samples comprise at least one of: a pixel sample spatially adjacent to a right edge of the picture block x, a pixel sample spatially adjacent to an upper right of the picture block x, and a pixel sample spatially adjacent to an upper edge of the picture block x.

5. The method according to claim 2, wherein a candidate motion information unit set associated with the lower left pixel sample of the picture block x comprises one of the motion information units of x3 pixel samples, wherein x3 is a positive integer, wherein the x3 pixel samples comprise at least one pixel sample spatially adjacent to the lower left pixel sample of the picture block x, and wherein the x3 pixel samples comprise at least one of: a pixel sample spatially adjacent to a left edge of the picture block x, a pixel sample spatially adjacent to a lower left of the picture block x, and a pixel sample spatially adjacent to a lower edge of the picture block x.

6. The method according to claim 1, wherein the merged motion information unit set i is used for prediction of the picture block x.

7. The method according to claim 6, wherein the picture block x is predicted using an affine motion model.

8. The method according to claim 7, further comprising:

obtaining a motion vector of each pixel block in the picture block x based on the affine motion model and the merged motion information unit set i; and determining a predicted pixel value of each pixel in each pixel block in the picture block x by using the obtained motion vector of each pixel block in the picture block x.

9. The method according to claim 8, wherein the pixel block is a 4×4 pixel block.

10. The method according to claim 1, wherein K1=3, coordinates of three pixel samples are (0,0) ($S_1$, 0), and (0,$S_2$), wherein a size of the picture block x is $S_1$x$S_2$, and $S_1$ represents a width of the picture block x, and $S_2$ represents a height of the picture block x.

11. The method according to claim 1, wherein each motion information unit of the K1 motion information units comprises:

a motion vector whose prediction direction is forward, but does not include a motion vector whose prediction direction is backward, and the merged motion information unit set i meets the condition that reference frame indices associated with the motion vectors whose prediction directions are forward in all the K1 motion information units in the merged motion information unit set i are the same; or wherein each motion information unit of the K1 motion information units comprises:

a motion vector whose prediction direction is backward, but does not include a motion vector whose prediction direction is forward, and the merged motion information unit set i meets the condition that reference frame indices associated with the motion vectors whose prediction directions are backward in all the K1 motion information units in the merged motion information unit set i are the same; or wherein each motion information unit of the K1 motion information units comprises:

a motion vector whose prediction direction is forward, and a motion vector whose prediction direction is backward, and the merged motion information unit set i meets the condition that reference frame indices associated with the motion vectors whose prediction directions are forward in all the K1 motion information units in the merged motion information unit set i are the same, and reference frame indices associated with the motion vectors whose prediction directions are backward in all the K1 motion information units in the merged motion information unit set i are the same.

12. An apparatus for use in video decoding, the apparatus comprising:

one or more processors; and one or more memories coupled to the one or more processors and storing computer-executable programs for execution by the one or more processors to cause the apparatus to:

perform entropy decoding processing on a video bit stream to obtain an identifier of a merged motion information unit set i and a prediction residual of a picture block x;

determine, from N candidate merged motion information unit sets, the merged motion information unit set i including K1 motion information units; and wherein the merged motion information unit set i of the N candidate merged motion information unit sets is derived as follows:

determine K1 pixel samples of the picture block x;

determine a candidate motion information unit set associated with each pixel sample in the K1 pixel samples, wherein the candidate motion information unit set associated with each pixel sample comprises one candidate motion information unit, and wherein K1 is an integer that is greater than or equal to 2; and determine the merged motion information unit set i comprising K1 motion information units, wherein the K1 motion information units in the merged motion information unit set i are selected from the candidate motion information units of the candidate motion information unit sets associated with the K1 pixel samples, wherein each motion information unit comprises a motion vector whose prediction direction is forward and/or a motion vector whose prediction direction is backward, wherein the merged motion information unit set i meets a condition that reference frame indexes associated with the K1 motion information units in the merged motion information unit set i are the same, and wherein the merged motion information unit set i is associated with an identifier.

13. The apparatus according to claim 12, wherein the K1 pixel samples comprise at least two pixel samples in an upper left pixel sample, an upper right pixel sample and a lower left pixel sample of the picture block x, wherein the upper left pixel sample of the picture block x is one of an upper left vertex of the picture block x, and a pixel block in the picture block x comprising an upper left vertex of the picture block x, wherein the lower left pixel sample of the picture block x is one of a lower left vertex of the picture block x, and a pixel block in the picture block x comprising a lower left vertex of the picture block x, and wherein the upper right pixel sample of the picture block x is one of an upper right vertex of the picture block x, and a pixel block in the picture block x comprising an upper right vertex of the picture block x.

14. The apparatus according to claim 13, wherein a candidate motion information unit set associated with the upper left pixel sample of the picture block x comprises one of the motion information units of x1 pixel samples, wherein x1 is a positive integer, wherein the x1 pixel samples comprise at least one pixel sample spatially adjacent to the upper left pixel sample of the picture block x, and wherein the x1 pixel samples comprise at least one of: a pixel sample spatially adjacent to a left edge of the picture block x, a pixel sample spatially adjacent to an upper left of the picture block x, and a pixel sample spatially adjacent to an upper edge of the picture block x.

15. The apparatus according to claim 14, wherein a candidate motion information unit set associated with the upper right pixel sample of the picture block x comprises one of the motion information units of x2 pixel samples, wherein x2 is a positive integer, wherein the x2 pixel samples comprise at least one pixel sample spatially adjacent to the upper right pixel sample of the picture block x, and wherein the x2 pixel samples comprise at least one of: a pixel sample spatially adjacent to a right edge of the picture block x, a pixel sample spatially adjacent to an upper right of the picture block x, and a pixel sample spatially adjacent to an upper edge of the picture block x.

16. The apparatus according to claim 14, wherein a candidate motion information unit set associated with the lower left pixel sample of the picture block x comprises one of the motion information units of x3 pixel samples, wherein x3 is a positive integer, wherein the x3 pixel samples comprise at least one pixel sample spatially adjacent to the lower left pixel sample of the picture block x, and wherein the x3 pixel samples comprise at least one of: a pixel sample spatially adjacent to a left edge of the picture block x, a pixel sample spatially adjacent to a lower left of the picture block x, and a pixel sample spatially adjacent to a lower edge of the picture block x.

17. The apparatus according to claim 13, wherein in response to the apparatus being a video encoding apparatus, the one or more processors further executes the computer-executable programs to determine, from the N candidate merged motion information unit sets, the merged motion information unit set i based on the identifier obtained from the video bit stream.

18. The apparatus according to claim 13, wherein K1=3, coordinates of three pixel samples are (0,0) $(S_1,0)$ and $(0,S_2)$, wherein a size of the picture block x is $S_1xS_2$, and $S_1$ represents a width of the picture block x, and $S_2$ represents a height of the picture block x.

19. A non-transitory computer-readable medium carrying computer instructions which, when executed by one or more processors, cause the one or more processors to perform operations of:

performing entropy decoding processing on a video bit stream to obtain an identifier of a merged motion information unit set i and a prediction residual of a picture block x;

determining, from N candidate merged motion information unit sets, the merged motion information unit set i including K1 motion information units; and wherein the merged motion information unit set i of the N candidate merged motion information unit sets is derived as follows:

determining K1 pixel samples of the picture block x;

determining a candidate motion information unit set associated with each pixel sample in the K1 pixel samples, wherein the candidate motion information unit set associated with each pixel sample comprises one candidate motion information unit, and wherein K1 is an integer that is greater than or equal to 2; and determining the merged motion information unit set i comprising K1 motion information units, wherein the K1 motion information units in the merged motion information unit set i are selected from the candidate motion information units of the candidate motion information unit sets associated with the K1 pixel samples, wherein each motion information unit comprises a motion vector whose prediction direction is forward and/or a motion vector whose prediction direction is backward, wherein the merged motion information unit set i meets a condition that reference frame indexes associated with the K1 motion information units in the merged motion information unit set i are the same, and wherein the merged motion information unit set i is associated with an identifier.

* * * * *